US006658527B1

(12) United States Patent
Hiroyasu

(10) Patent No.: US 6,658,527 B1
(45) Date of Patent: Dec. 2, 2003

(54) RECORDING AND/OR REPRODUCTION APPARATUS AND DATA COMMUNICATION SYSTEM WITH DISPLAY OF MAIN AND AUXILIARY DATA RECORDED CAPACITY INFORMATION

(75) Inventor: Shoko Hiroyasu, Tokyo (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 09/660,304

(22) Filed: Sep. 12, 2000

(30) Foreign Application Priority Data

Sep. 24, 1999 (JP) .......................... P11-270585

(51) Int. Cl.[7] .......................... G06F 12/00; G11B 27/36
(52) U.S. Cl. .................. 711/112; 369/53.24; 369/32.01
(58) Field of Search ............................... 711/112, 154; 369/53.24, 53.44, 32.01

(56) References Cited

U.S. PATENT DOCUMENTS

| 5,392,265 | A | * | 2/1995 | Takezawa | 369/53.24 |
| 5,432,768 | A | | 7/1995 | Terashima et al. | 369/53.24 |
| 5,576,840 | A | * | 11/1996 | Fukushima | 386/46 |
| 6,288,990 | B1 | * | 9/2001 | Fujiie et al. | 369/47.21 |

FOREIGN PATENT DOCUMENTS

| EP | 0 571 191 | | 11/1993 |
| EP | 0 686 974 | | 12/1995 |
| JP | 11-232849 | * | 8/1999 |

* cited by examiner

Primary Examiner—Glenn Gossage
(74) Attorney, Agent, or Firm—Oblon, Spivak, McClelland, Maier & Neustadt, P.C.

(57) ABSTRACT

A data recording/reproduction apparatus being connected to a data communication system via a data bus conforming to a predetermined communication format enabling execution of data communication between them. In dealing with a mini-disc™ system capable of recording main data accompanied with auxiliary data, in addition to consumed capacity of audio data, consumed capacity of auxiliary data can also be displayed to enable a user to identify the actually available recording capacity to promote user's handling convenience. Concretely, based on a main data control information, such as a user table of contents (UTOC), and an auxiliary data control information, such as an auxiliary table of contents (AUX-TOC), recorded on the recording medium, actually consumed capacity of the main and the auxiliary data can individually be displayed via a proportional display shown against individual total recording capacity.

15 Claims, 34 Drawing Sheets

FIG. 6A

| CLUSTER | SECTOR | SOUND GROUP |
|---|---|---|
| 0 0 3 2 h | 0 0 h | 0 h |
| 0 0 0 0 0 0 0 0 1 1 0 0 1 0 | 0 0 0 0 0 0 0 0 | 0 0 0 0 |

| (CONTRACTED ADDRESS) | 0 0 0 0 0 0 0 0 1 1 0 0 1 0 | 0 0 0 0 0 0 0 0 | 0 0 0 0 |
|---|---|---|---|
| | 0 0 h | C 8 h | 0 0 h |

FIG. 6B

| CLUSTER | SECTOR | SOUND GROUP |
|---|---|---|
| 0 0 3 2 h | 0 4 h | 0 h |
| 0 0 0 0 0 0 0 0 1 1 0 0 1 0 | 0 0 0 0 0 1 0 0 | 0 0 0 0 |

| (CONTRACTED ABSOLUTE ADDRESS) | 0 0 0 0 0 0 0 0 1 1 0 0 1 0 | 0 0 0 1 0 0 | 0 0 0 0 |
|---|---|---|---|
| | 0 0 h | C 8 h | 4 0 h |
| (CONTRACTED OFFSET ADDRESS) | 0 0 0 0 0 0 0 0 0 0 0 0 0 0 | 0 0 0 1 0 0 | 0 0 0 0 |
| | 0 0 h | 0 0 h | 4 0 h |

FIG. 6C

| CLUSTER | SECTOR | SOUND GROUP |
|---|---|---|
| 0 0 3 2 h | 1 3 h | 9 h |
| 0 0 0 0 0 0 0 0 1 1 0 0 1 0 | 0 0 0 1 0 0 1 1 | 1 0 0 1 |

| (CONTRACTED ABSOLUTE ADDRESS) | 0 0 0 0 0 0 0 0 1 1 0 0 1 0 | 0 1 0 0 1 1 | 1 0 0 1 |
|---|---|---|---|
| | 0 0 h | C 9 h | 3 9 h |
| (CONTRACTED OFFSET ADDRESS) | 0 0 0 0 0 0 0 0 0 0 0 0 0 0 | 0 1 0 0 1 1 | 1 0 0 1 |
| | 0 0 h | 0 1 h | 3 9 h |

FIG. 8

| | 16-bit | | 16-bit | | |
|---|---|---|---|---|---|
| | MSB      LSB | MSB      LSB | MSB      LSB | MSB      LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (00h) | MODE (02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used sectors | 8 |
| | 00000000 | 00000000 | 00000000 | 00000000 | 9 |
| | 00000000 | 00000000 | 00000000 | Disc Serial No | 10 |
| POINTER PORTION { | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | ～ | ～ | ～ | ～ | |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| TABLE PORTION (255 PARTS TABLE) { | (01h) START ADDRESS | (TRACK ADDRESS) | | TRACK MODE | 78 |
| | END ADDRESS | | | LINK INFORMATION | 79 |
| | (02h) START ADDRESS | (TRACK ADDRESS) | | TRACK MODE | 80 |
| | END ADDRESS | | | LINK INFORMATION | 81 |
| | (03h) START ADDRESS | (TRACK ADDRESS) | | TRACK MODE | 82 |
| | END ADDRESS | | | LINK INFORMATION | 83 |
| | ～ | ～ | ～ | ～ | |
| | (FCh) START ADDRESS | (TRACK ADDRESS) | | TRACK MODE | 580 |
| | END ADDRESS | | | LINK INFORMATION | 581 |
| | (FDh) START ADDRESS | (TRACK ADDRESS) | | TRACK MODE | 582 |
| | END ADDRESS | | | LINK INFORMATION | 583 |
| | (FEh) START ADDRESS | (TRACK ADDRESS) | | TRACK MODE | 584 |
| | END ADDRESS | | | LINK INFORMATION | 585 |
| | (FFh) START ADDRESS | (TRACK ADDRESS) | | TRACK MODE | 586 |
| | END ADDRESS | | | LINK INFORMATION | 587 |

FIG. 13

| | 16-bit even m | | 16-bit odd m | | |
|---|---|---|---|---|---|
| | Wm B | Wm A | Wm B | Wm A | |
| | MSB    LSB | MSB    LSB | MSB    LSB | MSB    LSB | |
| | d1    d8 | d1    d8 | d1    d8 | d1    d8 | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (00h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | (00h) | (00h) | 7 |
| | Used Sector3 | Used Sector2 | Used Sector1 | Used Sector0 | 8 |
| | (00h) | (00h) | (00h) | (00h) | 9 |
| | (00h) | (00h) | (00h) | (00h) | 10 |
| POINTER { PORTION | (00h) | (00h) | (00h) | (P-EMPTY) | 11 |
| | (P-BLANK) | (00h) | (00h) | (00h) | 12 |
| | (00h) | (00h) | (00h) | (00h) | 13 |
| | (00h) | (00h) | (00h) | (00h) | 14 |
| | (00h) | (00h) | (00h) | (00h) | 15 |
| | (00h) | (00h) | (00h) | (00h) | 16 |
| | ... | ... | ... | ... | |
| | (00h) | (00h) | (00h) | (00h) | 74 |
| | (00h) | (00h) | (00h) | (00h) | 75 |
| | (00h) | (00h) | (00h) | (00h) | 76 |
| | (00h) | (00h) | (00h) | (00h) | 77 |
| (01h) | Start address | | | (00h) | 78 |
| | End address | | | LINK INFORMATION | 79 |
| (02h) | Start address | | | (00h) | 80 |
| | End address | | | LINK INFORMATION | 81 |
| (03h) | Start address | | | (00h) | 82 |
| | End address | | | LINK INFORMATION | 83 |
| (04h) | Start address | | | (00h) | 84 |
| | End address | | | LINK INFORMATION | 85 |
| TABLE PORTION (99 PARTS TABLE) | . | | | | 86 |
| | . | | | | |
| | . | | | | |
| (63h) | Start address | | | (00h) | 274 |
| | End address | | | LINK INFORMATION | 275 |
| (64h) | Start address | | | | 276 |
| | End address | | | | 277 |
| | (zeros) | | | | |
| | (zeros) | | | | |
| | (zeros) | | | | |
| (FFh) | (zeros) | | | | 586 |
| | (zeros) | | | | 587 |

FIG. 14

| | 16-bit even m | | 16-bit odd m | | |
|---|---|---|---|---|---|
| | Wm B | Wm A | Wm B | Wm A | |
| | MSB      LSB | MSB      LSB | MSB      LSB | MSB      LSB | |
| | d1      d8 | d1      d8 | d1      d8 | d1      d8 | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (01h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First PNO | Last PNO | 7 |
| | (00h) | (00h) | (00h) | (00h) | 8 |
| | (00h) | (00h) | (00h) | (00h) | 9 |
| | (00h) | (00h) | (00h) | (00h) | 10 |
| | (00h) | (00h) | (00h) | (P-EMPTY) | 11 |
| | (P-PFRA) | P-PNO1 | P-PNO2 | P-PNO3 | 12 |
| POINTER PORTION { | P-PNO4 | P-PNO5 | P-PNO6 | P-PNO7 | 13 |
| | P-PNO92 | P-PNO93 | P-PNO94 | P-PNO95 | 35 |
| | P-PNO96 | P-PNO97 | P-PNO98 | P-PNO99 | 36 |
| | (00h) | (00h) | (00h) | (00h) | 37 |
| | (00h) | (00h) | (00h) | (00h) | 74 |
| | (00h) | (00h) | (00h) | (P-PNO255) | 75 |
| (00h) | Start address (cover picture) | | | S.Pict. MODE | 76 |
| | End address | | | (00h) | 77 |
| (01h) | Start address | | | S.Pict. MODE | 78 |
| | End address | | | (00h) | 79 |
| (02h) | Start address | | | S.Pict. MODE | 80 |
| | End address | | | (00h) | 81 |
| (03h) | Start address | | | S.Pict. MODE | 82 |
| | End address | | | (00h) | 83 |
| TABLE PORTION (04h) | Start address | | | S.Pict. MODE | 84 |
| | End address | | | (00h) | 85 |
| (99 + 1 PARTS TABLE) | | | | | 86 |
| (63h) | Start address | | | (00h) | 274 |
| | End address | | | LINK INFORMATION | 275 |
| (64h) | (zeros) | | | | 276 |
| | (zeros) | | | | 277 |
| | (zeros) | | | | |
| (FFh) | (zeros) | | | | 586 |
| | (zeros) | | | | 587 |

FIG. 15

| | 16-bit even_m | | 16-bit odd_m | | |
|---|---|---|---|---|---|
| | Wm B | Wm A | Wm B | Wm A | |
| | MSB　　LSB | MSB　　LSB | MSB　　LSB | MSB　　LSB | |
| | d1　　　d8 | d1　　　d8 | d1　　　d8 | d1　　　d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (02h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First PIF | Last PIF | 7 |
| | (00h) | (00h) | (00h) | (00h) | 8 |
| | (00h) | (00h) | (00h) | (00h) | 9 |
| | (00h) | (00h) | (00h) | char. code | 10 |
| POINTER PORTION | (00h) | (00h) | (00h) | (P-EMPTY) | 11 |
| | (00h) | P-PIF1 | P-PIF2 | P-PIF3 | 12 |
| | P-PIF4 | P-PIF5 | P-PIF6 | P-PIF7 | 13 |
| | | | | | |
| | P-PIF92 | P-PIF93 | P-PIF94 | P-PIF95 | 35 |
| | P-PIF96 | P-PIF97 | P-PIF98 | P-PIF99 | 36 |
| | (00h) | (00h) | (00h) | (00h) | 37 |
| | | | | | |
| | (00h) | (00h) | (00h) | (00h) | 74 |
| | (00h) | (00h) | (00h) | (P-PIF255) | 75 |
| TABLE PORTION (255+1 SLOTS) | (00h) Cover Picture information | | | | 76 |
| | Cover Picture information | | | LINK INFORMATION | 77 |
| | (01h) Cover Picture or still Picture information | | | | 78 |
| | Cover Picture or still Picture information | | | LINK INFORMATION | 79 |
| | (02h) Cover Picture or still Picture information | | | | 80 |
| | Cover Picture or still Picture information | | | LINK INFORMATION | 81 |
| | (03h) Cover Picture or still Picture information | | | | 82 |
| | Cover Picture or still Picture information | | | LINK INFORMATION | 83 |
| | (04h) Cover Picture or still Picture information | | | | 84 |
| | Cover Picture or still Picture information | | | LINK INFORMATION | 85 |
| | | | | | 86 |
| | (63h) Cover Picture or still Picture information | | | | 274 |
| | Cover Picture or still Picture information | | | LINK INFORMATION | 275 |
| | (64h) Cover Picture or still Picture information | | | | 276 |
| | Cover Picture or still Picture information | | | LINK INFORMATION | 277 |
| | | | | | |
| | (FFh) Cover Picture or still Picture information | | | | 586 |
| | Cover Picture or still Picture information | | | LINK INFORMATION | 587 |

FIG. 16

| | 16-bit even m | | 16-bit odd m | | |
|---|---|---|---|---|---|
| | Wm B | Wm A | Wm B | Wm A | |
| | MSB　　LSB | MSB　　LSB | MSB　　LSB | MSB　　LSB | |
| | d1　　　d8 | d1　　　d8 | d1　　　d8 | d1　　　d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (03h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TNP | Last TNP | 7 |
| | (00h) | (00h) | (00h) | (00h) | 8 |
| | (00h) | (00h) | (00h) | (00h) | 9 |
| | (00h) | (00h) | (00h) | (00h) | 10 |
| POINTER PORTION | (00h) | (00h) | (00h) | (P-EMPTY) | 11 |
| | (00h) | P-TNP1 | P-TNP2 | P-TNP3 | 12 |
| | P-TNP4 | P-TNP5 | P-TNP6 | P-TNP7 | 13 |
| | P-TNP92 | P-TNP93 | P-TNP94 | P-TNP95 | 35 |
| | P-TNP96 | P-TNP97 | P-TNP98 | P-TNP99 | 36 |
| | (00h) | (00h) | (00h) | (00h) | 37 |
| | (00h) | (00h) | (00h) | (00h) | 74 |
| | (00h) | (00h) | (00h) | (P-TNP255) | 75 |
| TABLE PORTION (99+1 SLOTS) | (00h) | zeros | | P-PNOj | 76 |
| | | zeros | | LINK INFORMATION | 77 |
| | (01h) | Start offset address | | P-PNOj | 78 |
| | | End offset address | | LINK INFORMATION | 79 |
| | (02h) | Start offset address | | P-PNOj | 80 |
| | | End offset address | | LINK INFORMATION | 81 |
| | (03h) | Start offset address | | P-PNOj | 82 |
| | | End offset address | | LINK INFORMATION | 83 |
| | (04h) | Start offset address | | P-PNOj | 84 |
| | | End offset address | | LINK INFORMATION | 85 |
| | : | | | | 86 |
| | (63h) | Start offset address | | P-PNOj | 274 |
| | | End offset address | | LINK INFORMATION | 275 |
| | (64h) | (zeros) | | | 276 |
| | : | (zeros) | | | 277 |
| | (FFh) | (zeros) | | | 586 |
| | | (zeros) | | | 587 |

FIG. 17

| | 16-bit even m | | 16-bit odd m | | |
|---|---|---|---|---|---|
| | Wm B | Wm A | Wm B | Wm A | |
| | MSB　　LSB | MSB　　LSB | MSB　　LSB | MSB　　LSB | |
| | d1　　　d8 | d1　　　d8 | d1　　　d8 | d1　　　d8 | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (04h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TXNO | Last TXNO | 7 |
| | (00h) | (00h) | (00h) | (00h) | 8 |
| | (00h) | (00h) | (00h) | (00h) | 9 |
| | (00h) | (00h) | (00h) | (00h) | 10 |
| POINTER PORTION { | (00h) | (00h) | (00h) | (P-EMPTY) | 11 |
| | (P-PFRA) | P-TXNO1 | P-TXNO2 | P-TXNO3 | 12 |
| | P-TXNO4 | P-TXNO5 | P-TXNO6 | P-TXNO7 | 13 |
| | ... | ... | ... | ... | |
| | P-TXNO92 | P-TXNO93 | P-TXNO94 | P-TXNO95 | 35 |
| | P-TXNO96 | P-TXNO97 | P-TXNO98 | P-TXNO99 | 36 |
| | (00h) | (00h) | (00h) | (00h) | 37 |
| | ... | ... | ... | ... | |
| | (00h) | (00h) | (00h) | (00h) | 74 |
| | (00h) | (00h) | (00h) | (P-TXNO255) | 75 |
| TABLE PORTION (99+1 PARTS TABLE) { (00h) | Start address (cover text) | | | Text MODE | 76 |
| | End address | | | LINK INFORMATION | 77 |
| (01h) | Start address | | | Text MODE | 78 |
| | End address | | | LINK INFORMATION | 79 |
| (02h) | Start address | | | Text MODE | 80 |
| | End address | | | LINK INFORMATION | 81 |
| (03h) | Start address | | | Text MODE | 82 |
| | End address | | | LINK INFORMATION | 83 |
| (04h) | Start address | | | Text MODE | 84 |
| | End address | | | LINK INFORMATION | 85 |
| | | | | | 86 |
| (63h) | Start address | | | Text MODE | 274 |
| | End address | | | LINK INFORMATION | 275 |
| (64h) | (zeros) | | | | 276 |
| | (zeros) | | | | 277 |
| | (zeros) | | | | |
| (FFh) | (zeros) | | | | 586 |
| | (zeros) | | | | 587 |

FIG. 18

| | 16-bit even m | | 16-bit odd m | |
|---|---|---|---|---|
| | Wm B | Wm A | Wm B | Wm A |
| | MSB　　　LSB | MSB　　　LSB | MSB　　　LSB | MSB　　　LSB |
| | d1　　　　d8 | d1　　　　d8 | d1　　　　d8 | d1　　　　d8 |

| Section | Col1 (Wm B even) | Col2 (Wm A even) | Col3 (Wm B odd) | Col4 (Wm A odd) | Row |
|---|---|---|---|---|---|
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (05h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TXIF | Last TXIF | 7 |
| | (00h) | (00h) | (00h) | (00h) | 8 |
| | (00h) | (00h) | (00h) | (00h) | 9 |
| | (00h) | (00h) | (00h) | char. code | 10 |
| POINTER PORTION | (00h) | (00h) | (00h) | (P-EMPTY) | 11 |
| | (00h) | P-TXIF1 | P-TXIF2 | P-TXIF3 | 12 |
| | P-TXIF4 | P-TXIF5 | P-TXIF6 | P-TXIF7 | 13 |
| | P-TXIF92 | P-TXIF93 | P-TXIF94 | P-TXIF95 | 35 |
| | P-TXIF96 | P-TXIF97 | P-TXIF98 | P-TXIF99 | 36 |
| | (00h) | (00h) | (00h) | (00h) | 37 |
| | (00h) | (00h) | (00h) | (00h) | 74 |
| | (00h) | (00h) | (00h) | (P-TXIF255) | 75 |

| TABLE PORTION (255+1 SLOTS) | Slot | Content | Row |
|---|---|---|---|
| | (00h) | Cover text information | 76 |
| | | Cover text information　　　LINK INFORMATION | 77 |
| | (01h) | Cover text or text information | 78 |
| | | Cover text or text information　　　LINK INFORMATION | 79 |
| | (02h) | Cover text or text information | 80 |
| | | Cover text or text information　　　LINK INFORMATION | 81 |
| | (03h) | Cover text or text information | 82 |
| | | Cover text or text information　　　LINK INFORMATION | 83 |
| | (04h) | Cover text or text information | 84 |
| | | Cover text or text information　　　LINK INFORMATION | 85 |
| | : | | 86 |
| | (63h) | Cover text or text information | 274 |
| | | Cover text or text information　　　LINK INFORMATION | 275 |
| | (64h) | Cover text or text information | 276 |
| | | Cover text or text information　　　LINK INFORMATION | 277 |
| | (FFh) | Cover text or text information | 586 |
| | | Cover text or text information　　　LINK INFORMATION | 587 |

FIG. 19

| | 16-bit even m | | 16-bit odd m | |
|---|---|---|---|---|
| | Wm B | Wm A | Wm B | Wm A |
| | MSB　　LSB | MSB　　LSB | MSB　　LSB | MSB　　LSB |
| | d1　　　d8 | d1　　　d8 | d1　　　d8 | d1　　　d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector | MODE (02h) | 3 |
| Reserved | (00h) | (00h) | (00h) | (00h) | 4 |
| | (00h) | (00h) | (00h) | (00h) | 5 |
| DATA AREA | DP0 | DP1 | DP2 | DP3 | 6 |
| | DP4 | DP5 | DP6 | DP7 | 7 |
| | | | | | 57 |
| | | | | | 58 |
| | | | | | 110 |
| | | | | | 111 |
| | | | | | 163 |
| | | | | | 164 |
| | | | | | 216 |
| | | | | | 217 |
| | | | | | 269 |
| | | | | | 270 |
| | | | | | 322 |
| | | | | | 323 |
| | | | | | 375 |
| | | | | | 376 |
| | | | | | 428 |
| | | | | | 429 |
| | | | | | 481 |
| | | | | | 482 |
| | | | | | 534 |
| | | | | | 535 |
| | DP2320 | DP2321 | DP2322 | DP2323 | 586 |
| | (00h) | (00h) | (00h) | (00h) | 587 |

FIG. 21A

| | | |
|---|---|---|
| d1 ⎫<br>d2 ⎭<br>(COPY STATUS) | 0h | COPY APPROVED |
| | 1h | COPY APPROVED ONLY FOR ONCE |
| | 2h | COPY APPROVED ONLY FOR ONCE VIA VERIFIED BUS (COPY INHIBITED VIA NON-VERIFIED BUS) |
| | 3h | COPY INHIBITED |
| d3 ~ d8 | | RESERVED (NOT BEING DEFINED) |

FIG. 21B

| | BEFORE COPYING | AFTER COPYING |
|---|---|---|
| COPY STATUS | 0h<br>(COPY APPROVED) | 0h<br>(COPY APPROVED) |
| | 1h<br>(COPY APPROVED ONLY FOR ONCE) | 3h<br>(COPY INHIBITED) |
| | 2h<br>(COPY APPROVED ONLY FOR ONCE VIA VERIFIED BUS) | 3h<br>(COPY INHIBITED) |
| | 3h<br>(COPY INHIBITED) | — |

FIG. 23

| | | |
|---|---|---|
| d1 ⌐<br>d2 ⌐<br>(COPY STATUS) | 0h | COPY APPROVED |
| | 1h | COPY APPROVED ONLY FOR ONCE |
| | 2h | COPY APPROVED ONLY FOR ONCE VIA VERIFIED BUS (COPY INHIBITED VIA NON-VERIFIED BUS) |
| | 3h | COPY INHIBITED |
| d3 ⌐<br>d4 ⌐ | 0h | LYRICS TEXT |
| | 1h | ARTIST DATA |
| | 2h | LINER NOTES |
| | 3h | OTHERS |
| d5 | 0 | TIME STAMP IS ABSENT |
| | 1 | TIME STAMP IS PRESENT |
| d6 ⌐<br>d7 ⌐<br>d8 ⌐ | 0h | ASCII |
| | 1h | MODIFIED ISO 8859-1 |
| | 2h | MUSIC SHIFTED JIS |
| | 3h | KS C 5601-1989 |
| | 4h | GB2312-80 |
| | 5h | RESERVED |
| | 6h | RESERVED |
| | 7h | PLAIN TEXT |

RECORDING AND/OR REPRODUCTION APPARATUS AND DATA COMMUNICATION SYSTEM WITH DISPLAY OF MAIN AND AUXILIARY DATA RECORDED CAPACITY INFORMATION

BACKGROUND OF THE INVENTION

1. Field of the Invention

The present invention relates to a recording and/or reproduction apparatus which executes recording and reproduction by way of dealing with a recording medium used for recording main data such as audio data and auxiliary data such as picture image information or character information. The invention further relates to a data or information communication system which is connected to this recording and/or reproduction apparatus and a data processing equipment such as a personal computer or the like via a data bus which conforms to a predetermined communication format.

2. Discussion of the Background

In terms of a recording and reproduction apparatus capable of recording and reproducing a music audio signal, there has been such a known recording and reproducing apparatus utilizing a recording medium composed of an optical magnetic disc capable of recording an audio signal with a digital format or a magnetic tape for example.

In the case of such a recording and reproduction system using an optical magnetic disc (being known as "mini-disc", trade-mark), not only enabling a user to record and reproduce an audio signal of a music piece as a program, but it is also possible to record a disc title (disc name) of this disc and a music title (track name) per program of the music piece being recorded as character information. For example, in the reproduction mode, it is so arranged that the disc title, the music title, and a name of artist, can be displayed on the display unit installed in the recording and reproduction system.

In this description, the term "program" is used to express units of audio data such as music pieces recorded on a recording disc as the main data. For example, audio data per tune makes up one program. In the description the term "track" express the same meaning as the term "program".

A structure of the above-referred mini-disc™ system comprising a recording domain enabling recording of auxiliary data accompanying the main audio data independently of the recording domain usable for recording the main audio data has been previously proposed. The auxiliary data domain enables recording of still picture image data and character data (including symbols and marks or the like) as well.

For example, even in any conventional mini-disc™ system, it is also possible to record character information such as the disc name and the track name by way of recording them in correspondence with individual programs within the "User Table Of Contents" (U-TOC). However, inasmuch as the U-TOC itself is not composed of substantial capacity, as cited above, the U-TOC merely records such a character size corresponding to that of the titles.

On the other hand, by providing a domain for recording auxiliary data, not only character information, but it is also easily realizable to record picture image data such as a still picture image that consumes a large capacity, for example.

In the case of the above-referred mini-disc™ system solely being capable of recording and reproducing audio data, it is so arranged that consumed recording capacity of audio data on the recording disc can be displayed via total recording time thus far spent. Accordingly, a user can be aware of the amount remaining for the disc recording, and yet, he can estimate amount of data (the number of programs) that can be recorded on the recording disc thenceforth.

Taking the above arrangement into consideration, when composing such a mini-disc system enabling recording of the main audio data together with auxiliary data, in order to promote utility of the mini-disc system, it is thus preferred that, not only the capacity actually consumed for the recording of audio data, but the capacity actually consumed for the recording of auxiliary data be also displayed so that a user can be aware of this.

SUMMARY OF THE INVENTION

In order to solve the above problem, the invention provides a recording and/or reproduction apparatus which is capable of executing recording and reproduction by way of dealing with such a recording medium usable for recording the following: main data comprising a single program or a plurality of programs; main data control information which controls recording or reproduction or editing operation pertaining to the main data comprising a single program or a plurality of programs; and auxiliary data comprising a single data file or a plurality of data files being independent of respective programs functioning as the main data; and auxiliary data control information which controls recording or reproduction or editing operation pertaining to the auxiliary data comprising a single data file or a plurality of data files.

The reproduction apparatus related to the invention comprises the following: a first capacity computing means which, based on the main data control information, computes consumed capacity of the main data corresponding to the capacity of the main data that is actually recorded on the recording means; a second capacity computing means which, based on the auxiliary data control information, computes consumed capacity of the auxiliary data corresponding to the capacity of the auxiliary data that is actually recorded on the recording means; and a display means which, based on the capacity of the main data computed by the first capacity computing means and the other capacity of the auxiliary data computed by the second capacity computing means, externally displays the main data recorded capacity and the auxiliary data recorded capacity.

According to the invention, by way of connecting a recording and/or reproduction apparatus to an information processing system via a data bus conforming to a predetermined format, a data communication system is provided, which enables mutual data communication between the recording and/or reproduction apparatus and the information processing system related to the invention.

The recording and/or reproduction apparatus is capable of executing recording and/or reproduction of data recorded on a recording medium usable for recording the following: main data comprising a single program or a plurality of programs; main data control information which controls recording or reproduction or editing operation of the main data comprising a single program or a plurality of programs; auxiliary data comprising a single data file or a plurality of data files being independent of respective programs for composing the main data; and auxiliary-data control information which controls recording or reproduction or editing operation of a single data file or a plurality of data files for composing the auxiliary data.

Further, the recording and/or reproduction apparatus according to the invention comprises the following:

a first capacity computing means which, based on the main data control information, computes consumed capacity of the main data complete with recording corresponding to the capacity of main data that is actually recorded on the recording medium; a second capacity computing means which, based on the auxiliary-data control information, computes consumed capacity of the auxiliary data complete with recording corresponding to the capacity of the auxiliary data that is actually recorded on the recording medium; and a display means which, based on the capacity complete with recording of the main data computed by the first capacity computing means and the other capacity complete with recording of the auxiliary data computed by the second capacity computing means, externally displays the main-data recorded capacity and the auxiliary-data recorded capacity on part of the information processing system.

According to the above-described structural arrangement, it becomes possible to externally display the consumed capacity of the main data and the consumed capacity of the auxiliary data via a predetermined display mode based on the main data control information and the auxiliary-data control information recorded on a recording medium. As a result, a user can visually be aware of the capacity of the recorded main data and the capacity of the auxiliary data recorded on the recording medium.

In another aspect of the present invention, a method for displaying the recorded capacity and the recordable capacity about the main data and the auxiliary data of the recording medium is disclosed.

BRIEF DESCRIPTION OF THE DRAWINGS

FIGS. 6A, 6B and 6C are block diagrams illustrating an example of addresses formed in a recording disc in accordance with an embodiment of the invention;

FIG. 8 is a block diagram illustrating a U-TOC sector "0" in accordance with an embodiment of the invention;

FIG. 13 is a block diagram illustrating an AUX-TOC sector "0" in accordance with an embodiment of the invention;

FIG. 14 is a block diagram illustrating an AUX-TOC sector "1" in accordance with an embodiment of the invention;

FIG. 15 is a block diagram illustrating a AUX-TOC sector "2" in accordance with an embodiment of the invention;

FIG. 16 is a block diagram illustrating a AUX-TOC sector "3" in accordance with an embodiment of the invention;

FIG. 17 is a block diagram illustrating a AUX-TOC sector "4" in accordance with an embodiment of the invention;

FIG. 18 is a block diagram illustrating a AUX-TOC sector "5" in accordance with an embodiment of the invention;

FIG. 19 is a block diagram illustrating a picture file sector in accordance with an embodiment of the invention;

FIGS. 21A and 21B are charts illustrating a copy status and copy status renewal table in accordance with an embodiment of the invention;

FIG. 23 is a block diagram illustrating the contents of the definition of text mode;

DESCRIPTION OF THE PREFERRED EMBODIMENTS

Practical modes for the embodiment of the invention are described below by way of rendering the description based on the sequence specified below.

1. Digital format satellite broadcast receiving system:
1-1: Overall composition
1-2: Mini-disc (Trade Mark) recording and/or reproduction apparatus
1-2-1: Structure of a Mini-disc™ recorder and player
1-2-2: Sector format and address format
1-2-3: Area structure
1-2-4: U-TOC (User Table Of Contents):
1-2-4-1: U-TOC sector "0"
1-2-4-2: U-TOC sector "1"
1-2-4-3: U-TOC sector "2"
1-2-4-4: U-TOC sector "4"
1-2-5: AUX-TOC:
1-2-5-1: AUX-TOC sector "0"
1-2-5-2: AUX-TOC sector "1"
1-2-5-3: AUX-TOC sector "2"
1-2-5-4: AUX-TOC sector "3"
1-2-5-5: AUX-TOC sector "4"
1-2-5-6: AUX-TOC sector "5"
1-2-6: Data-file:
1-2-6-1: Picture-file sector
1-2-6-2: Text-file sector
1-3: Personal computer
2. Data communication according to practical mode of the embodiment of the invention in conformity with the IEEE-1394:
2-1: Summary
2-2: Transaction rule
3: Edit window:
3-1: Display condition
3-2: Reading of AUX-data
3-3: Processing operation
3-3-1: Display of recording-capacity display area
3-3-2: Selection of reading file

1: Digital Format Satellite Broadcast Receiving System

1-1: Overall Composition

It is so defined that the editing unit pertaining to a practical embodiment of the invention is mounted on a Mini-Disc™ recorder/player which is capable of recording and reproducing audio data on a Mini-Disc™ (MD) substantially being an optical magnetic disc itself.

It is also defined that the above-specified MD recorder/player forms an AV system which executes transmission and reception of data signals by utilizing the Institute of Electrical and Electronic Engineers (IEEE)-1394 data-bus. The above-specified AV (Audio Visual) system comprises such a system capable of receiving digital format satellite broadcast data signal and down-loading the received data signal.

Initially, outline of the digital format satellite broadcast data transmission and reception system including the above-specified AV system as a practical form of the embodiment of the invention is described below.

Figure 1:
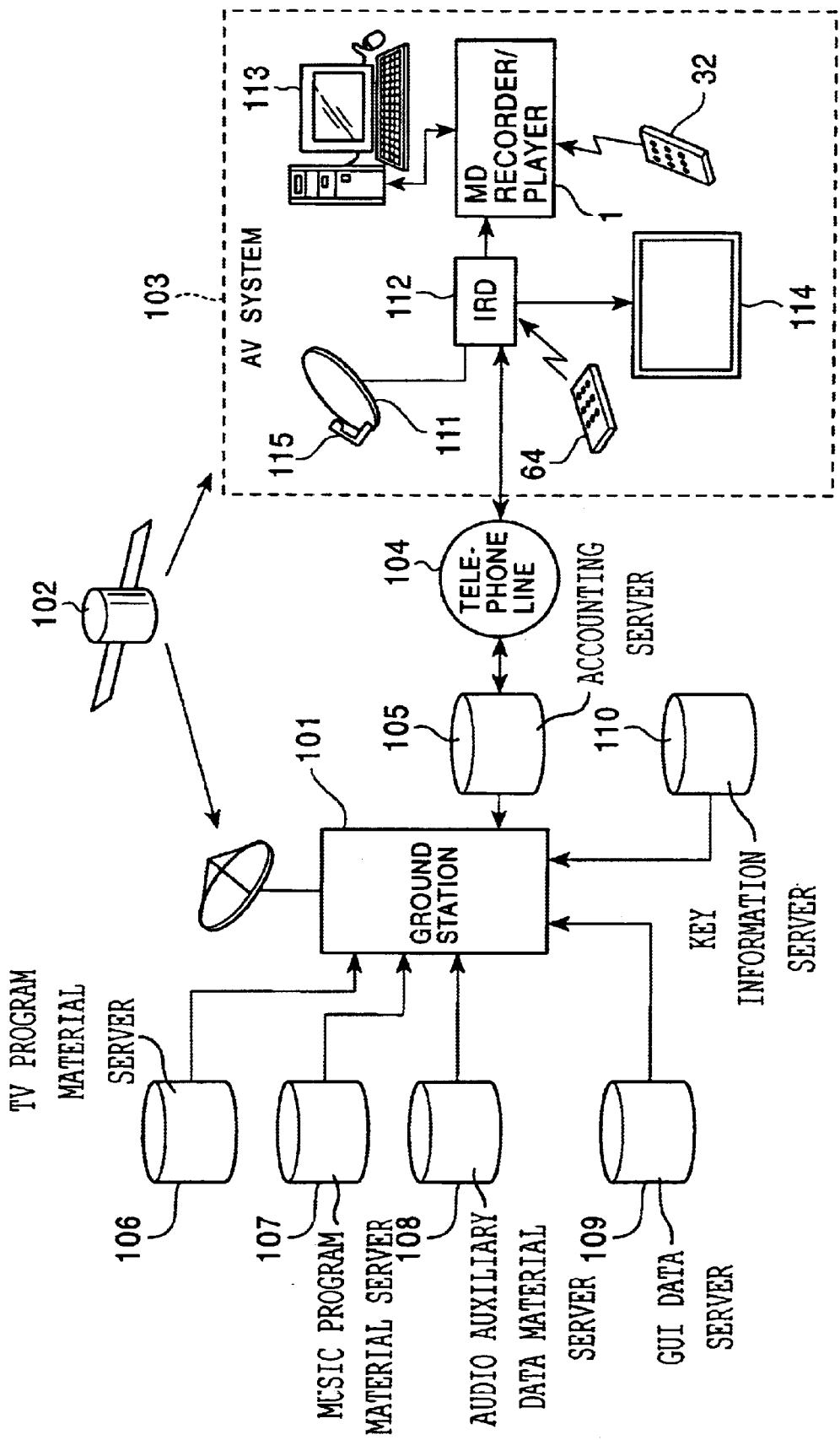
FIG. 1 is an overall schematic block diagram exemplifying a composition of digital-format satellite broadcast receiving system in accordance with a practical mode of an embodiment of the invention.

FIG. 1 is an overall schematic block diagram of a digital format satellite broadcast data transmission and reception system as a practical mode for embodying the invention. As shown in FIG. 1, a variety of data signals are transmitted to a ground broadcast station 101 provided for receiving digital format satellite broadcast data, which include data material for broadcasting television (TV) programs rendered from a TV program material server 106, musical-piece data material from a musical-piece material server 107, audio auxiliary data from an audio auxiliary data material server 108, and Graphic User Interface (GUI) data material rendered from a GUI data server 109.

Such TV-program material server 106 renders data material for composing conventional broadcasting programs. Data material for musical broadcasting transmitted from the TV-program material server 106 comprises moving pictures and an audio signal. For example, when broadcasting a musical program transmitted from the TV program data material server 106, moving pictures and audio data can also be broadcast in order to promote new tunes for example.

The musical-piece material server 107 renders audio programs by applying audio channels. Data material for the audio program solely comprises audio signal. The musical-piece material server 107 provides the ground station 101 with material of audio programs by way of covering plural audio channels.

In the case of broadcasting audio programs via audio channels, an identical tune is repeatedly broadcast based on a predetermined time unit. Audio channels are individually independent, and thus, a variety of methods are taken into consideration for utilizing them. For example, it is so arranged that one of the audio channels repeatedly broadcasts a certain number of Japanese popular tunes for a certain duration, whereas another audio channel repeatedly broadcasts a certain number of the latest foreign popular tunes for a certain duration for example.

The audio auxiliary data server 108 renders time information of musical pieces being delivered from the musical-piece data material server 107.

The GUI data server 109 renders "GGUI data" in order to form GUI picture being used for implementing operation by a user. For example, in the case of such GUI picture pertaining to down-loading of the musical pieces that will be described later on, the GUI data server 109 renders such a data for forming picture-image data, text data, and still picture of album jacket needed for composing list pages of the musical pieces to be distributed or information pages of the respective musical pieces. In addition, the GUI data server 109 also provides an Electrical Program Guide (EPG) used for displaying EPG program table on the part of the AV system 103.

In order to compose the "GUI data", for example, MHEG format (Multi-media Hyper-media Information Coding Experts Group) is introduced. In order to implement the MHEG format, it is so arranged that multi-media information, procedure, operation and combination of these are secured as an object, and then, the object is encoded before being defined as a scenario-describing international standard required for composing title of the GUI picture for example. It is so defined that the practical form of the embodiment of the invention introduces the "MHEG-5" format.

The ground station 101 multiplexes all the data transmitted from the above-referred TV program material server 106, musical-piece material server 107, audio auxiliary data material server 108, and the GUI data server 109 before executing transmission of multiplexed data signal.

According to a practical form of the embodiment of the invention, initially, video data transmitted from the TV program material server 106 is compressed and encoded into the MPEG-2 format, whereas audio data signal is compressed and encoded into the MPEG-2 audio format, where the term MPEG stands for "Motion Picture Experts Group". Further, audio data signal transmitted from the musical-piece material server 107 is compressed and encoded into the MPEG-2 audio format or the ATRAC™ format relative to the corresponding audio channels, where the terms ATRAC stands for "Adoptive Transform Acoustic Coding".

When being multiplexed, all the above-referred data are ciphered by way of utilizing key information rendered from a key-information server 110.

An example of internal structure of the ground station 101 will be described later on.

An Audio Visual (AV) signal transmitted from the ground station 101 is received by the AV reception system 103 installed in every household via satellite station 102. A plurality of transponders are mounted on the satellite station 102. Each of the transponders contains 30 Mbps of transmission capability. On the part of the AV system 103 in a household, a parabolic antenna 111, an IRD (Integrated Receiver Decoder) 112, a TV monitor unit 114, an MD recorder/player 1, and a personal computer 113, are prepared.

In FIG. 1, a remote controller 64 for controlling operation of the IRD 112 and another remote controller 32 for controlling operation of the MD recorder/player 1 are respectively provided.

AV data signal broadcast via the satellite station 102 is received by the parabolic antenna 111. The AV data signal received by the parabolic antenna 111 is then converted into a predetermined frequency by a LNB (Low-Noise Block-down converter) 115 before being delivered to the IRD 112.

Briefly speaking, based on the received data signal, the IRD 112 selects signal of a predetermined channel, and then, based on the channel-selected signal, the IRD 112 demodulates programmed video data and audio data, and then outputs video signal in conjunction with audio data signal. Further, based on the input GUI data signal being multiplexed in conjunction with programmed data, the IRD 112 outputs the GUI picture for delivery to a TV monitor 114 for example. As a result, picture-image and audio signal of a certain program received via a selected broadcast station can be displayed and heard via the TV monitor 114. In addition, it is also possible to display the GUI picture on the TV monitor 114 via user's operation to be described later on.

It is so arranged that the MD recorder/player 1 is capable of recording and reproducing audio data signal on the loaded mini-disc. Further, it is so arranged that the MD recorder/player is capable of recording audio data (musical-piece data) signal, still picture image data (picture file) such as album jacket related to musical-piece data, and text data (text file) such as the words and liner-notes on the MD disc, and yet, being capable of reproducing the recorded data such as picture file and text file to be output by way of synchronization with audio-data reproducing time.

In regard to processing operation to be performed thenceforth, for explanatory convenience, in conformity with handling of the MD recorder/player 1 to be described later on, data such as the picture file and the text file accompanying the above-referred audio data will be referred to as "AUX-data" in the following description.

It is possible for the personal computer 113 to execute a variety of editing processes as required by way of utilizing data input via the IRD 112 or such a data reproduced via the MD recorder/player 1. Further, it is also possible to control operation of the IRD 112 and the MD recorder/player 1 via the command from the personal computer 113 operated by a user.

Figure 2:
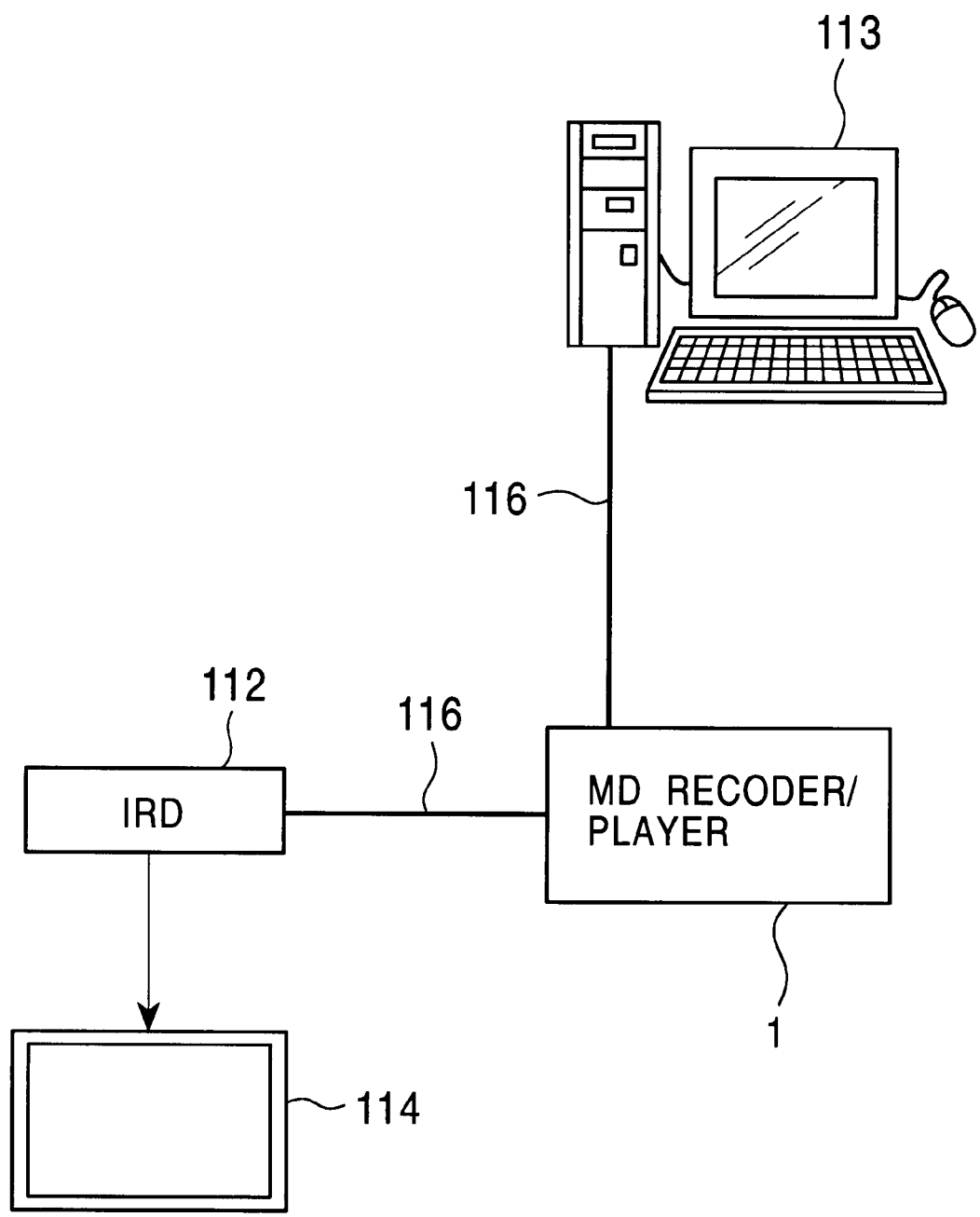
FIG. 2 is a simplified block diagram exemplifying a structure of a data receiving system (Audio Visual (AV) system) in accordance with a practical mode of an embodiment of the invention.

In the AV system 103 conforming to a practical mode for embodying the invention, as shown in FIG. 2, it is so arranged that the above-referred IRD 112, MD recorder/player 1, and the personal computer 113, are connected to each other via an IEEE-1394 format data bus 116.

In other words, the above-referred IRD 112, the MD recorder/player 1, and the personal computer 113 jointly forming the AV system 103 respectively incorporate such a data interface exactly corresponding to the IEEE-1394 format which is a prescribed data-transmission standard.

Owing to the above arrangement, it is possible for the AV system 103 based on the practical mode of the invention to directly input audio data (down-loaded data) of the musical pieces received via the IRD 112 as of the state being compressed via the ATRAC system. Further, it is also possible for the AV system 103 to record the AUX data up-loaded from transmitter in conjunction with the above-described audio data via down-loading.

As shown in FIG. 1 for example, the IRD 112 is arranged to be capable of communicating with an accounting server 105 via telephone line 104. As will be described later on, an IC (Integrated Circuit) card storing a variety of information is inserted in the IRD 112. For example, when audio data signal of a certain music piece is down-loaded, history information pertaining to the down-loaded music piece is memorized in the IC card. The IC card information is then transmitted to the accounting server 105 via the telephone line 104 based on a predetermined occasion and timing. Based on the delivered history information, the accounting server 105 sums up chargeable amount and then demands a user to settle the account.

As is apparent from the above description, in the AV system 103 conforming to practical form of the invention, the ground station 101 transmits a variety of video and audio. data signals by way of multiplexing the video data signal and the audio data signal for making up material for broadcasting musical programs supplied from the TV program material server 106, the audio data signal for covering audio channels supplied from the musical-piece material server 107, the audio data supplied from the audio auxiliary data server 108, and the GUI data supplied from the GUI data server 109.

By receiving the above multiplexed broadcast data signals via the AV system 103 installed in a household, it is possible to view the picture-image and listen to the audio information of programs broadcast via a selected station via the TV monitor 114. Further, it is also possible to search any program by initially displaying "Electrical Program Guide" EPG frame as the GUI frame availing of the GUI data transmitted in conjunction with the program data. Secondly, in practical form of the invention, it is possible to receive services other than viewing and hearing normal programs presented by broadcast system by way of executing a predetermined operation by utilizing a usable GUI frame or specific service other than programs normally being broadcast.

For example, when executing operation by utilizing the GUI frame-picture while displaying the GUI frame picture usable for down-loading of the audio data that makes up the musical pieces, it is possible to down-load the audio data desired by a user and then record the down-loaded audio data via the MD recorder/player 1 so that it can properly be preserved.

1-2: Mini-disc™ Recording and/or Reproducing Apparatus:
1-2-1: Composition of MD recorder/player:
In the AV system 103 shown in FIG. 2 the MD recorder/player 1 and the personal computer 113 individually characterize the form of embodying the invention. First, composition of the MD recorder/player 1 is described below.

Figure 3:
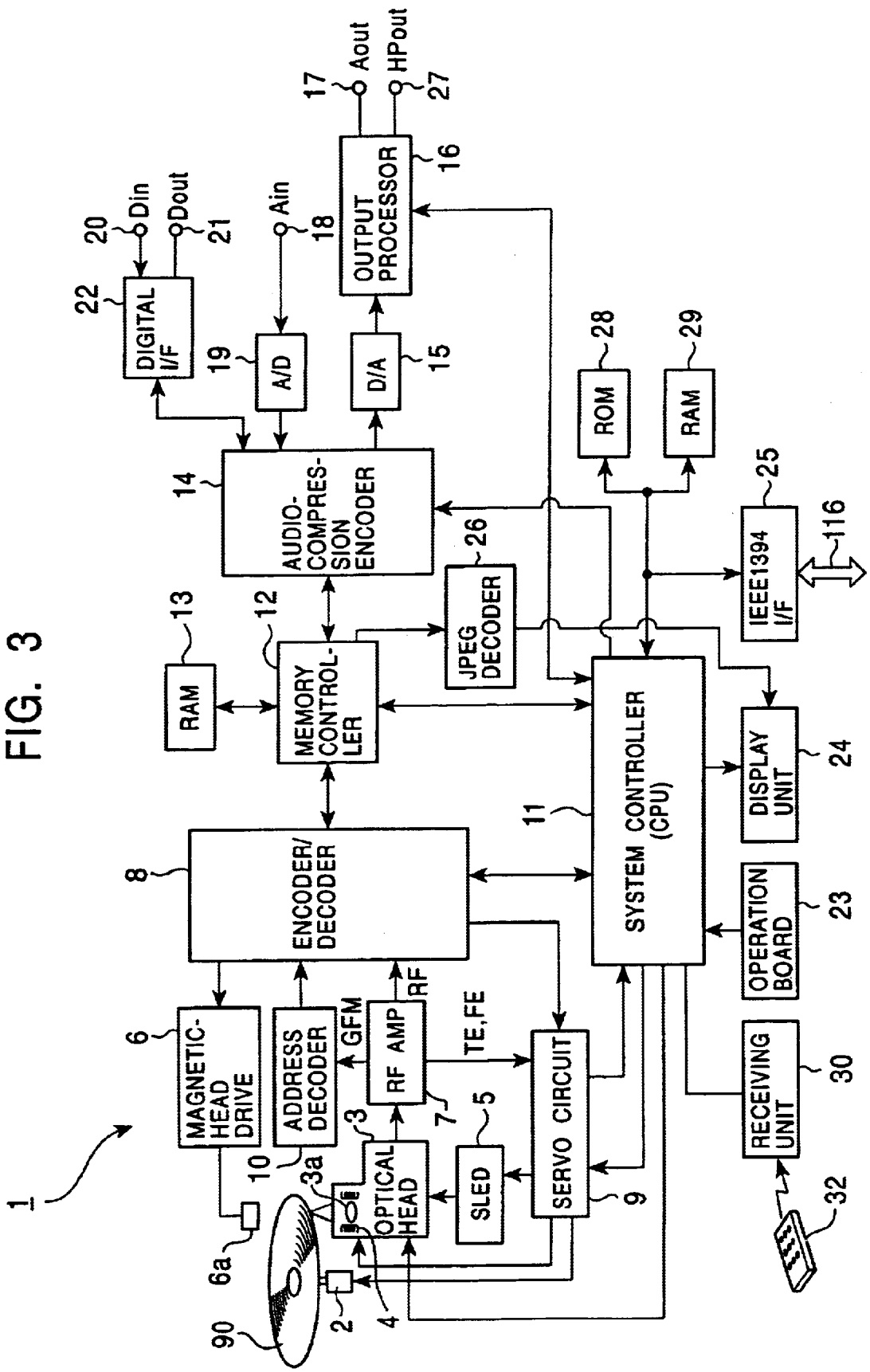
FIG. 3 is an overall block diagram of the recording and/or reproduction system in accordance with a practical mode of an embodiment of the invention.

FIG. 3 is a schematic block diagram designating internal structure of the recording and reproducing apparatus (i.e., the MD recorder/player) 1 provided for the AV system 103 for embodying the invention.

An optical-magnetic disc (mini-disc™) 90 for recording audio data signal is rotatably driven by a spindle motor 2. During recording and reproducing modes, an optical head 3 irradiates the optical-magnetic disc 90 with laser beam.

In order to heat a recording track up to the Curie point, the optical head 3 outputs a high-level laser beam during recording mode. On the other hand, in order to detect data via reflected light by availing of the magnetic Kerr effect, the optical head 3 outputs a relatively low-level laser beam during reproducing mode.

To secure the above effect, the optical head 3 is fitted with a laser diode as laser-output means, an optical system comprising a polarized-light-beam splitter and an object lens, and a detector for detecting reflected light. Owing to a two-axis mechanism 4, the object lens 3a is displaceably held in the radial direction of the optical-magnetic disc 90 and in the direction to be moved apart from or moved into contact with the disc 90.

A magnetic head 6a is disposed at a position being opposite from the optical head 3 across the disc 90. The magnetic head 6a causes magnetic field modulated by supplied data signal to be added to the optical-magnetic disc 90.

A sled mechanism 5 causes the whole unit of the optical head 3 and the magnetic head 6a to shift themselves in the radial direction of the disc 90.

Information is detected from the optical-magnetic disc 90 via the optical head 3 during reproduction mode and then delivered to a RF (Radio Frequency) amplifier 7. The RF amplifier 7 executes computing process against the delivered information and then extracts a variety of signals including the following: a reproduction RF signal, a tracking-error signal TE, a focus-error signal FE, and groove information GFM comprising absolute-positional information recorded on the optical-magnetic disc 90 as pre-groove (wobbling groove).

Extracted reproduction signal RF is delivered to an encoder/decoder unit 8. On the other hand, the tracking-error signal TE and the focus-error signal FE are delivered to a servo circuit 9. The groove information GFM is delivered to an address decoder 10.

The servo circuit 9 generates a variety of servo-drive signals in response to the received tracking-error signal TE and the focus-error signal FE, and by way of responding to a track-jump command and an access command from a system controller 11 comprising a micro-computer or central processing unit (CPU), and also in response to speed-detect information related to the spindle motor 2, controlling the two-axis mechanism 4 and the sled mechanism 5 to properly control focus and tracking operation. The servo circuit 9 controls the spindle motor 2 to rotate itself at a constant linear velocity (CLV).

Address decoder 10 decodes groove information GFM being supplied, and then extracts address information. The address information is delivered via the encoder/decoder 8 to the system controller 11, in which the address information is utilized for executing a variety of control operations.

In the encoder/decoder unit 8, reproduced RF signal is treated with EFM (Eight to Fourteen Modulation) demodulation and CIRC (Cyclic Redundancy Code) decoding process. Simultaneously, address data and sub-coding data are also extracted before being delivered to the system controller 11.

After being subject to EFM demodulation and CIRC decoding process via the encoder/decoder unit 8, audio data (sector data) signal is provisionally written into a buffer random access memory (RAM) 13 by a memory controller 12. Reading of data from the optical-magnetic disc 90 via the optical head 3 and transfer of reproduced data through a system ranging from the optical head 3 to the buffer memory 13 are normally executed on the intermittent basis at 1.41 Mbit per second of speed.

Data written into the buffer RAM 13 is read out based on the timing corresponding to 0.3 Mbit per second of the speed for transferring reproduced data, and then the read-out data is delivered to another encoder/decoder unit 14. The encoder/decoder unit 14 executes decoding process of the reproduced signal against audio-signal compression process before converting the decoded reproduced signal into digital audio signal containing 44.1 KHz of sampling frequency with 16 bit resolution. The digital-converted audio signal is then converted into analog signal via a D/A (Digital to Analog) converter 15, and then, analog-converted signal is subject to adjustment of output level and adjustment of impedance via an output processor 16. Adjustment-completed signal is then delivered to an external equipment from a line-output terminal 17 in the form of analog audio signal Aout. Simultaneously, the adjustment-completed signal is also delivered to a head-phone output terminal 27 in the form of head-phone output HPout before being output to a head-phone being connected thereto.

It is also possible for the digital audio signal decoded by the encoder/decoder unit 14 to be delivered to an external equipment from a digital output terminal 21 in the form of digital audio signal Dout after being delivered to a digital interface unit 22. For example, the digital audio signal Dout is output to the external equipment via optical-cable transmission.

When executing a recording operation on the optical-magnetic disc 90, the recording signal (analog audio signal Ain) delivered to a line input terminal 18 is converted into digital audio signal by an A/D (Analog to Digital) converter 19. The digital-converted audio signal is then delivered to the encoder/decoder unit 14, in which the digital audio signal is treated with audio compression-encoding process.

On the other hand, when digital audio signal Din is delivered to a digital input terminal 20 via external equipment, the digital interface unit 22 extracts control code, and then, the control-code-extracted digital audio signal is delivered to the encoder/decoder unit 14 before being subject to audio compression-encoding process.

After being compressed by the encoder/decoder unit 17, the recorded data is provisionally written into the buffer RAM 13 by the memory controller 12 to be stored therein, and then the recorded data is read out per a predetermined amount of data before being delivered to the encoder/decoder unit 8. After being treated with the CIRC encoding and the EFM demodulation processes by the encoder/decoder unit 8, the recorded data is delivered to a magnetic-head drive circuit 6.

In response to the recorded data complete with encoding process, the magnetic head drive circuit 6 provides the magnetic head 6a with magnetic-head drive signal. In other words, the magnetic-head drive circuit 6 causes the magnetic head 6a to execute addition of North (N) or South (S) magnetic field onto the optical-magnetic disc 90. Simultaneously, the system controller 11 delivers control signal to the optical head 3 in order that it can output laser beam corresponding to the recording level.

An operation board 23 enables a user to operate the whole of the AV system 103 via a variety of operating elements in the form of operating keys and dials, where the operating elements comprise the following: those operating elements pertaining to recording and reproducing operations such as reproduction, recording, pause, stop, FF (Fast Forward), REW (Rewind), and AMS (Automatic Music Sensor) mode for example; those operating elements normally related to play mode such as reproduction, program reproduction, and shuffle reproduction; those operating elements used for operating display mode for switching display condition in the display unit 24; and those operating elements used for program-editing operation including track (program) division, track to track connection, track erasure, entry of track name and disc name, for example.

Operating information via the operating keys and dials is transmitted to the system controller 11, which then executes control operation in correspondence with the received operating information.

Further, in the practical form for embodying the invention, a data receiving unit 30 is provided. For example, after receiving a command signal via infra-red ray transmitted from a remote controller 32, the data receiving unit 30 decodes the received signal, and then outputs the decoded command code (operating information) to the system controller 11. Even when receiving the command code output from the data receiving apparatus 30, the system controller 11 executes control operation based on the received command code that makes up the operating information.

Display operation of the display unit 24 is controlled by the system controller 11 as well. Whenever activating display operation, the system controller 11 transmits data subject to display to a display driver disposed inside of the display unit 24. Based on the delivered data, the display driver drives display operation of the display unit comprising a LCD (Liquid Crystal Display) panel, for example, in order to execute display of required numerals, characters, and marks or the like.

The display unit 24 displays the actual operation mode, the track number, recording and the reproducing time of the disc 90 under execution of recording or playback operation, and yet, the display unit 24 also displays the condition of editing operation.

Character information such as the track name being subject to control accompanying programs comprising the main data can be recorded on the disc 90. In this case, display of input character at the input of character information and display of character information read out of the disc 90 are also executed.

Further, it is possible for this embodiment to record the AUX-data (Auxiliary data) for composing the data file on the disc 90 independently of the musical-piece data that makes up the program.

Data file in the form of the AUX-data can be formed into information such as character and a still picture image. Characters and a still picture image can be output from the display unit 24 for display.

According to the practical form for embodying the invention, a JPEG decoder 26 is provided for the recording and reproducing system for displaying characters and the still picture image sharing part of the AUX-data, where the term JPEG stands for "Joint Photographic Coding Experts Group".

According to practical form for embodying the invention, the still picture image comprising the AUX-data files is subject to recording via file format compressed by the JPEG decoding process. The JPEG decoder 26 receives file of the still picture image stored in the buffer RAM 13 for example after reproduction via the disc 90 from the memory controller 12, and then, treats the input files of the still picture image with expansion process before delivering them to the display unit 24. As a result, the still picture image data comprising the AUX-data is displayed on the display unit 24.

However, in many cases, a full-dot display or a CRT (Cathode Ray Tube) display respectively being capable of generating relatively sizable picture image and capable of freely using the screen is suited for the output of character information and the still picture image comprising the AUX-data. Taking this into account, it is conceivable to execute display of the AUX-data by means of an external TV monitor via the interface unit 25.

It is also possible for a user to record the AUX-data file on the disc 90. In this case, it may become necessary to utilize an image scanner, a personal computer, and a keyboard as the input means, whereby it is conceivable to effect input of information comprising the AUX-data files from these units via the interface unit 25.

It should be understood that the practical form of the invention introduces the IEEE-1394 format interface unit 25. Accordingly, the following description expresses the interface unit 25 in terms of the "IEEE-1394 interface 25". Thus, the IEEE-1394 interface 25 is linked with a variety of the external equipment via the IEEE-1394 bus 116.

The system controller 11 comprises a micro-computer loaded with a CPU (Central Processing Unit) and internal interface units for example, which executes a variety of control operations as have been described above.

A program ROM (Read Only Memory) 28 stores programs for realizing a variety of operations for functioning the recording and reproducing apparatus 1 pertaining to practical form of the invention. A work RAM (Random Access Memory) 29 properly retains a variety of data and programs needed for enabling the system controller 11 to properly execute predetermined operations.

Whenever executing recording and reproduction of data on and from the disc 90, it is essential that control information including a P-TOC (Pre-mastered Table Of Contents) and U-TOC (User Table Of Contents) recorded on the disc 90 be read out. In response to the read-out control information, the system controller 11 identifies address of such an area that should be recorded on the disc 90 and address of such an area that should be reproduced from the disc 90. The above control information is retained in the buffer memory 13.

Whenever the disc 90 is loaded in the MD recording and reproducing apparatus 1, the system controller 11 reads out the above control information by activating reproducing operation at the innermost circumference portion of the disc 90 retaining the recorded control information. The read-out control information is stored in the buffer memory 13, which is thenceforth subject to reference whenever executing recording, reproduction, and editing of programs on and from the disc 90.

Depending on the recorded program data and a variety of editing processes to be executed, the U-TOC may be rewritten, Whenever executing recording and editing operations, the system controller 11 executes renewal of the U-TOC information stored in the buffer RAM 13, and yet, in correspondence with the rewriting operation, the system controller 11 also rewrites information of the U-TOC area of the disc 90 based on a predetermined timing.

Independently of programs, the AUX-data files are recorded on the disc 90. In order to control the recorded AUX-data files, an AUX-TOC is formed on the disc 90.

Simultaneous with the reading of the U-TOC, the system controller 11 also reads the AUX-TOC, which is then stored in the buffer memory 13. The system controller 11 refers to the actual control condition of the AUX-data whenever deemed necessary.

Depending on the need, the system controller 11 reads the AUX-data file based on a predetermined timing or simultaneous with the reading of the AUX-TOC data, and then stores the read-out data in the buffer memory 13. Thenceforth, in correspondence with output timing controlled by the AUX-TOC data, the system controller 11 activates output operation of the display unit 24 or an external unit via the IEEE-1394 interface 25 to display characters and the picture image.

Even when executing the above-referred operation, depending on the format of the IEEE-1394 interface, it is possible to transmit and receive audio data as well. In other words, it is possible for the MD recorder/player 1 based on practical form of the invention to receive audio data transferred via the IEEE-1394 interface 25 and then record the received audio data on the disc 90.

If the transmitted audio data comprises digital audio data containing 44.1 KHz of sampling frequency with 16 bit resolution for example, then, the received digital audio data is transferred to the encoder/decoder unit 14 via the system controller 11, and then, the digital audio data is treated with data-compression process.

On the other hand, if the transmitted audio data comprises compressed audio data treated with compression process based on the format compatible with the MD recorder/player 1 pertaining to the invention, then, the compressed audio data is transferred to the memory controller 12 via the system controller 11.

Figure 4:
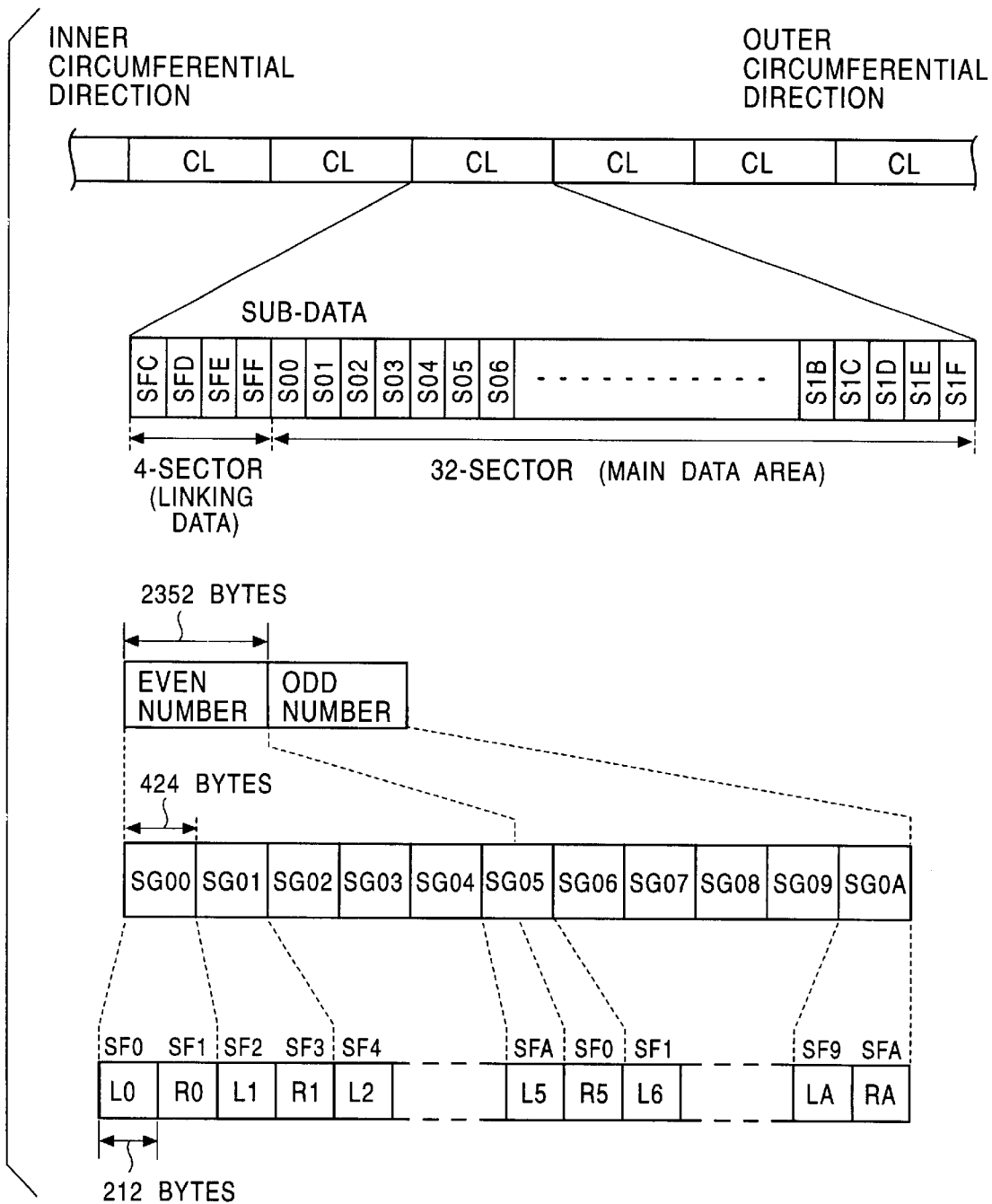
FIG. 4 is a block diagram illustrating a sector format of a recording disc in accordance with an embodiment of the invention.

1-2-2: Sector format and address format:

Referring to FIG. 4, data unit called sector and cluster is described below.

As shown in FIG. 4, clusters CL are continuously formed on each recording track of the mini disc system. One cluster corresponds to the minimum unit while recording mode is underway. One cluster corresponds to 2 to 3 rounds of track.

Each cluster CL comprises a sub-data area (linking area) comprising 4 sectors SFC through SFF and a main-data area comprising 32 sectors shown as sectors S00 through S1F.

One sector designates such a data unit formed with 2352 bytes.

Among 4 sectors of the sub-data area, the sector SFF corresponds to a sub-data sector usable for recording the sub-data, whereas three sectors SFC through SFE among 4 sectors are not used for recording data.

On the other hand, recording of the TOC data, the audio data, and the AUX-data is executed on the main-data area corresponding to 32 sectors.

Address is recorded at every sector.

Further, each sector is split into a plurality of sound-group units, in which two sectors are split into 11 sound-groups.

In other words, as shown in FIG. 4, sound-groups SG00 through SG0A are included in a pair of continuous sectors comprising an even-number sector such as the sector S00 and an odd-number sector such as the sector S01. Each sound-group is formed with 424 bytes, which generates such an audio-data amount corresponding to 11.61 milliseconds (msec) of duration.

The audio data is recorded on a single sound-group SG via division into a L (Left)-channel and a R (Right)-channel. For example, a sound-group SG00 is composed of a L-channel data L0 and a R-channel data R0, whereas a sound-group SG01 is composed of a L-channel data L1 and a R-channel data R1.

The portion corresponding to 212 bytes for composing data area of the L-channel or the R-channel is called a sound-frame.

Figure 5:
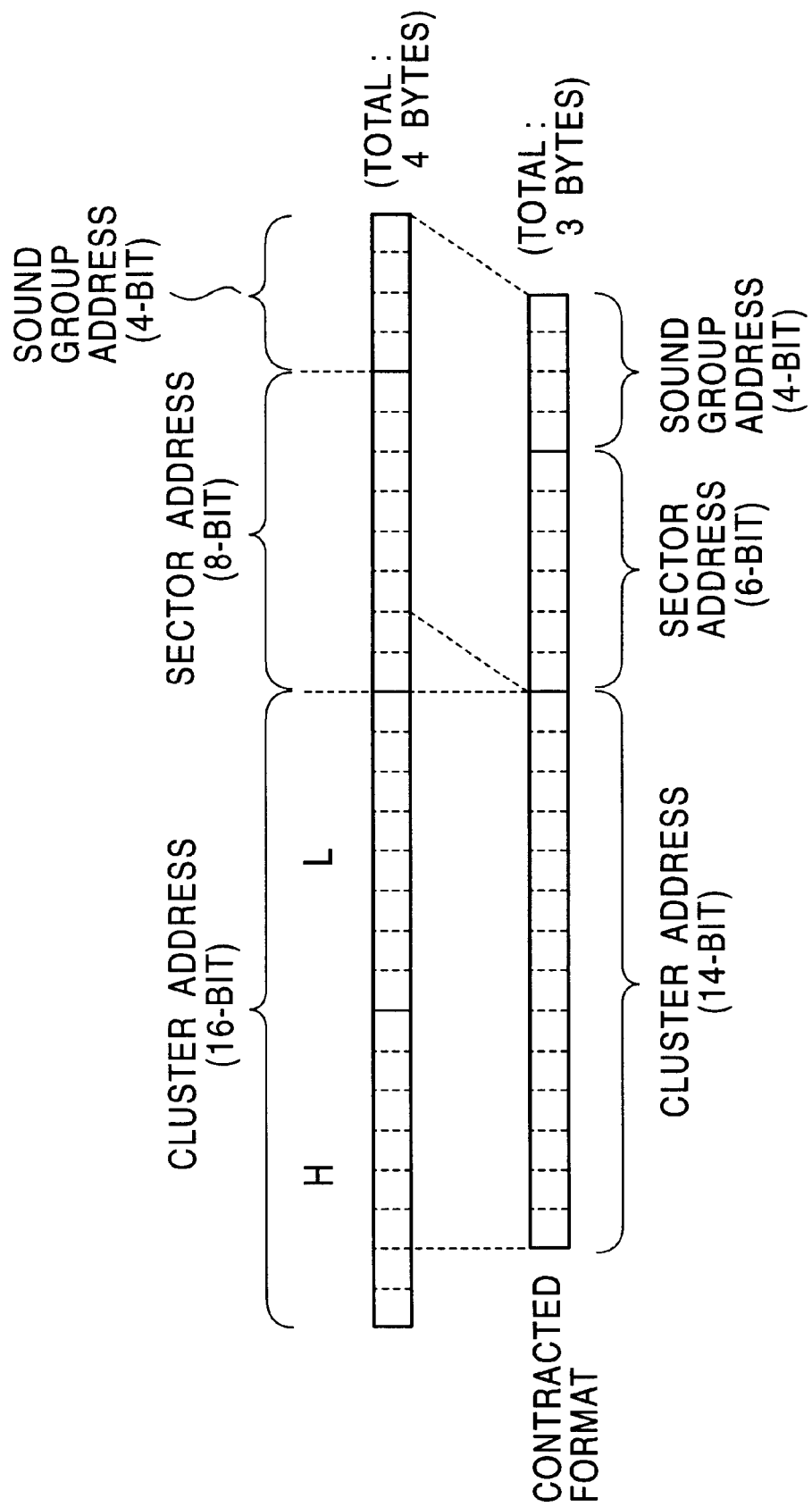
FIG. 5 is a block diagram illustrating address format of a recording disc in accordance with an embodiment of the invention.

Referring to FIG. 5, address format of the mini-disc system is described below.

Address is designated in each sector by means of cluster address and sector address. As shown in FIG. 5 in the upper bit row, the cluster address conforms to 16-bits corresponding to 2 bytes of numeric value, whereas the sector address conforms to 8-bits corresponding to 1 byte of numeric value.

Address of the sound-group within each sector can also be designated by further adding 4-bit sound-group address. For example, by way of designating the sound-group address for controlling the U-TOC data for example, it is possible to set reproduction position per sound-group unit.

In the case of dealing with the U-TOC data and the AUX-TOC data, in order to express the cluster address, the sector address, and the sound-group address based on 3-bytes, such a contracted-type address format as shown in the lower rank of FIG. 5 is applied to the U-TOC data and the AUX-TOC data.

Since each cluster comprises 36 sectors, each sector can be expressed by means of 6-bit unit. Accordingly, the upper 2 bits of the sector address can be deleted. Likewise, inasmuch as the cluster can be expressed by means of 14-bits up to the outermost circumference of the disc 90, the upper 2-bits of the cluster address can also be deleted. Accordingly, by way of deleting the upper 2-bits from the sector address and the cluster address, the address capable of designating up to the sound-group can be expressed by means of 3-bytes.

Address for controlling reproducing position and- reproducing timing of the U-TOC data and the AUX-TOC data is designated by the above-referred contacted type address shown in FIG. 5. Except for an example shown via absolute-address format, such an example shown by means of offset-address is also conceivable. The term "offset-address" designates such a relative address that designates a position in program by way of setting initial positions of individual programs of the musical pieces to be the address-0 position for example. An example of the offset-address is described by referring to FIGS. 6A–6B.

Method of recording program pertaining to the musical pieces will be described by referring to FIG. 7 later on. The recording program comprises the fiftieth cluster on the disc 90. The fiftieth cluster corresponds to the cluster 32h based on hexadecimal notation. Note that such a numeral added with "h" expressed in the following description designates a numerical value based on hexadecimal notation.

For example, as shown in FIG. 6(*a*) at the upper rank, address value of the address at the foremost position of the first program is designated as shown below: Concretely, the address value becomes 0032h, 00h, and 0h. When designating the address value based on the contracted format, as shown in FIG. 6(*a*) in the lower rank, the address value is designated as shown below:

Concretely, the address value becomes 00h, C8h, and 00h.

Based on the foremost address shown in FIG. 6(*a*) as the origin, for example, the addresses of the cluster 0032h, the sector 04h, and the sound-group 0h being present at certain positions inside of the first program respectively correspond to of the contracted-format absolute address shown in FIG. 6(*b*). On the other hand, inasmuch as the cluster 0032h, the sector 04h, and the sound-group 0h may be expressed by means of the difference based on the foremost address as the origin, the offset address becomes Likewise, based on the foremost address shown in FIG. 6(*a*) as the origin, for example, the addresses of the cluster 0032h, the sector 13h, and the sound-group 9h being present at certain positions inside of the first program respectively correspond to of the contracted-format absolute address shown in FIG. 6(*c*). On the other hand, the offset address becomes. For example, like the above example, a specific position inside of program can be designated by means of the absolute addresses or the offset addresses

Figure 7:
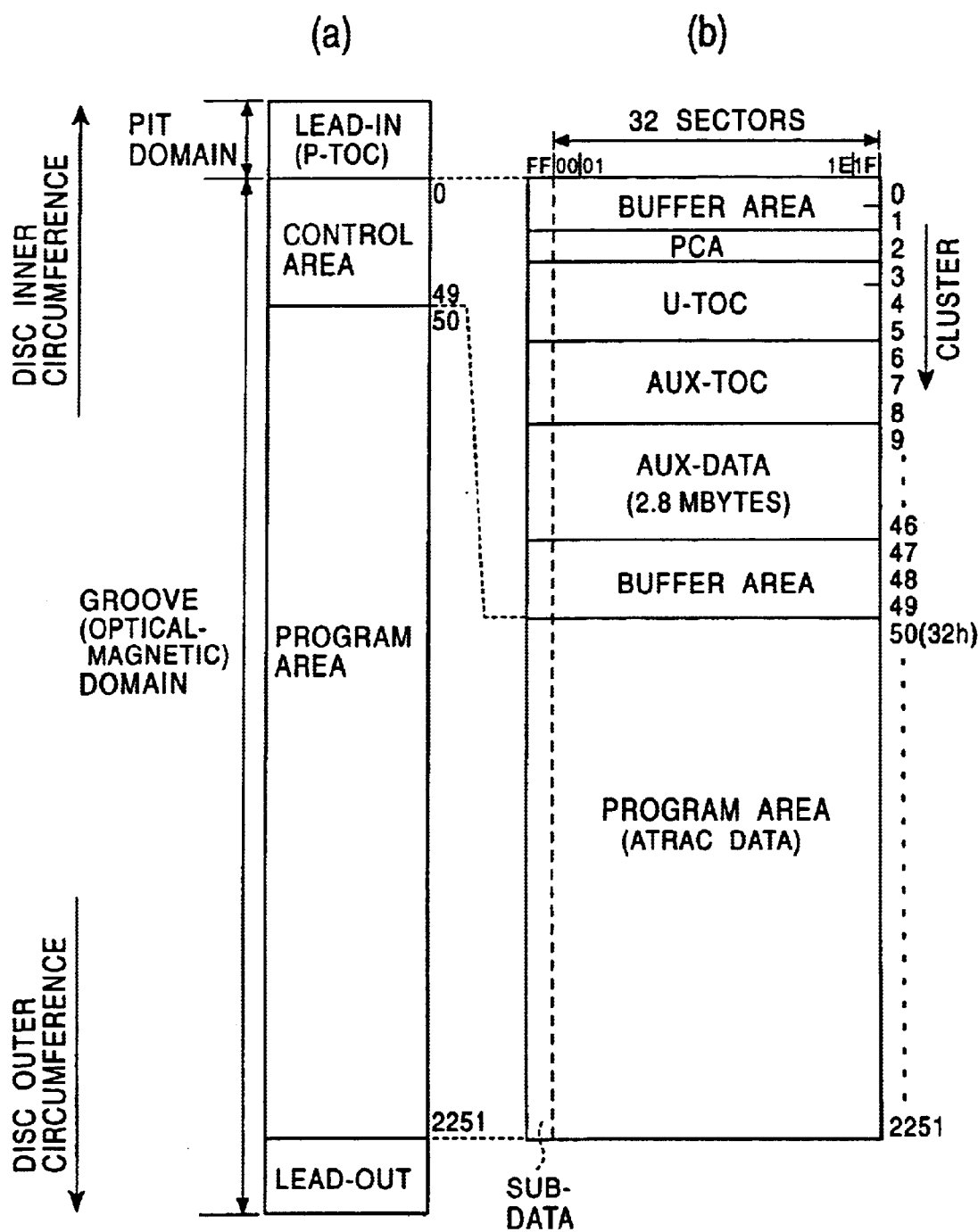
FIG. 7 is a block diagram illustrating a structure of areas formed in a recording disc in accordance of an embodiment of the invention.

1-2-3: Area composition:

Referring now to FIG. 7 area composition of the disc 90 prepared for operating the MD recorder/player 1 conforming to practical form of the invention is described below.

FIG. 7(a) designates an overall operating area of the disc 90 ranging from the innermost circumference to the outermost circumference thereof. The disc 90 made from an optical-magnetic disc contains a pit-domain corresponding to the innermost circumference part, which solely enables generation of reproducing data thereon by means of emboss-pit. Read only information P-TOC is recorded on the pit domain.

Outer area further from the pit domain corresponds to optical-magnetic domain. The optical-magnetic domain itself makes up the data-recording and data-reproducing area on which groove for guiding recording track is formed.

The section ranging from cluster 0 to cluster 49 at the innermost circumference of the optical-magnetic domain corresponds to the control area. Accordingly, such a program pertaining to an actual musical piece is solely recorded on the program area ranging from the cluster 50 to the cluster 2251. Outer circumference beyond the program area corresponds to lead-out area.

FIG. 7(b) illustrates the detailed composition of the control area, in which sectors are illustrated in the horizontal direction, whereas clusters are illustrated in the vertical direction.

In the control area, the clusters 0 and 1 correspond to a buffer area against the pit area. The cluster 2 corresponds to a power-calibration area PCA, which is used for adjusting power output level of the laser beam.

The clusters 3, 4, and 5 respectively enable recording of the U-TOC data thereon. Contents of the U-TOC data will be described later on. Data format is prescribed for each sector contained in each cluster. Predetermined control data are recorded on each sector. Such a cluster containing a sector making up the U-TOC data is repeatedly recorded three times on the clusters 3, 4, and 5.

The clusters 6, 7, and 8 respectively enables recording of the AUX-TOC data thereon. Contents of the AUX-TOC will be described later on. Data format is prescribed for each sector contained in each cluster. Predetermined control data are recorded on each sector. Such a cluster containing a sector for making up the AUX-TOC data is repeatedly recorded three times on the clusters 6, 7, and 8.

Such a domain ranging from the cluster 9 to the cluster 46 makes up the domain for recording the AUX data thereon. The AUX-data file is formed per sector unit, whereby enabling formation of a picture file sector comprising a still-picture file, a text-file sector comprising a character data file, and a "karaoke" text-file sector comprising such a character file being synchronous with program, which will be described later on individually.

The AUX-data files and the domain enabling recording of the AUX-data files within the AUX-data area are respectively subject to control by the AUX-TOC data.

When considering application of the error-correction format, each data file in the AUX-data area may be provided with 2.8 Mbytes of recording capacity.

Further, it is also conceivable to expand recording capacity of each data file by forming the second AUX-data area in the domain corresponding to the rear-half portion of the program area or in such a domain being outer from the program area (at the lead-out portion for example).

The clusters 47, 48, and 49 respectively make up a buffer area. The audio data comprising a single tune or a plurality of musical pieces are recorded on the program area in clusters 50 (=32h) and above based on the ATRAC data-compression format.

Recorded programs and the recording-enable domain are subject to control by the U-TOC data.

Note that, as described earlier, the sector FFh may be used for recording of any sub-data information in respective clusters present in the program domain.

In the mini-disc™ system, it is also possible to use such a reproduction-only disc recorded with programs in the pit-form containing reproduction-only data. Whole surface of this reproduction-only disc solely comprises the pit-area. Recorded program is subject to control by the P-TOC (read-only) data via such a form substantially being identical to the control form of the U-TOC data to be described later on. In this case, the U-TOC data is not formed.

Note that, when recording reproduction-only data file related to the AUX-data, the AUX-TOC data for controlling the reproduction-only data file is also recorded.

1-2-4: U-TOC
1-2-4-1: U-TOC sector 0

As described earlier, in order to execute recording and reproduction of the program data (track data) onto and from the disc 90, the system controller 11 reads out control data including the P-TOC and U-TOC data which have previously been recorded on the disc 90, and then, refers to these data whenever deemed necessary.

Next, a U-TOC sector is described below. The U-TOC sector makes up such a control information for controlling recording and reproduction of the tracks (musical pieces) onto and from the disc 90.

As described by referring to FIG. 7, the P-TOC data comprises read-only data which is formed on the innermost pit-area on the disc 90. The recordable-user area, the lead-out area, and the U-TOC area of the disc 90 are respectively subject to control by the P-TOC data. Note that, in the case of such a reproduction-only optical disc which fully contains the pit-form-recorded data, it is also possible to control the musical pieces recorded thereon via ROM operable by the P-TOC data, and thus, the U-TOC data is not formed.

Detailed description of the P-TOC is deleted. Next, the U-TOC sector provided on the optical-magnetic disc 90 capable of executing recording is described below.

FIG. 8 illustrates the data format of the U-TOC sector 0. Note that the U-TOC sector can be provided with the sector 0 up to a maximum of the sector 32. Of these, the sector 1 and the sector 4 respectively make up such an area for recording the character data, whereas the sector 2 makes up an area for recording the time and the date of recording.

First, the U-TOC sector 0 absolutely being required for executing recording and reproduction of data onto and from the disc 90 is described below.

The U-TOC sector 0 itself makes up a data domain containing control data being recorded in regard to the musical program mainly recorded by a user and free area on which recording of a new program can be performed.

For example, when performing recording of a certain musical piece onto the disc 90, the system controller 11 detects free area on the disc 90 from the U-TOC sector 0 to subsequently enable recording of audio data on the detected free area. When reproduction mode is entered, the system controller 11 identifies the area on which a reproducible musical piece is recorded by referring to the U-TOC sector 0, and then accesses the identified area before activating playback of the designated musical piece.

The foremost position of the data domain (4-bytes×588= 2352 bytes) of the U-TOC sector 0 is recorded with a synchronized pattern formed with an array of 1-byte data totally comprising 0 or 1.

Next, addresses for composing upper and lower cluster addresses (Cluster H and Cluster L) and sector address (Sector) are recorded across 3-bytes. Further, mode data (MODE) is added by 1 byte, thus forming up a "header". The above-referred 3-byte address corresponds to the address of the sector itself.

Not only the above-referred U-TOC sector 0, but the header being recorded with the synchronized pattern and the addresses are also provided for the P-TOC sector, the AUX-TOC sector, the AUX file sector, and the program sector, as well. Note that description of the header pertaining to respective sectors shown in the drawings further from FIG. 10 (which will be described later on) is deleted. However, the address and the synchronized pattern of relevant sector are also recorded per sector.

Cluster address being the addresses of sectors themselves are respectively designated by way of 2-bytes comprising the upper address (Cluster H) and the lower address (Cluster L), whereas the sector address (Sector) is designated by way of 1-byte. This in turn means that this address is not of the contracted form.

Next, predetermined data are recorded on the predetermined byte positions, where the recorded data include the following: a maker code, a model code, a first track number (First TNO), a last track number (Last TNO), sector-using condition (Used sectors), a disc serial number, and a disc identification.

In addition to the above, such a domain for recording a variety of pointers (including P-DFA, P-EMPTY, P-FRA, P-TNO-1~P-TNO-255) are prepared in order to identify domains and free area of track (containing music pieces for example) on which a user executed recording by referring to tables to be described later on.

In order to deal with the pointers (P-DFA through P-TNO-255), a total of 255 units of parts tables ranging from (01h) to (FFh) are provided. Each of the parts tables contains records of a starting address that becomes the origin for certain parts, a terminating end address, and track-mode information of the relevant parts. Further, since there may be such a case in which the parts shown by respective parts tables can be linked with other parts, it is so arranged that linkage information can also be recorded for designating a specific parts table in which the starting address and the ending address of the linked parts are recorded. Note that the terms "parts" corresponds to a track portion on which time-continuous data is physically continuously recorded.

The address designated in terms of the starting address and the ending address turns into such an address designating a single unit or a plurality of parts for composing a single musical piece (track).

These addresses are recorded in the contracted format, which respectively specify the cluster, the sector, and a sound-group.

In this kind of a recording and reproducing apparatus, even when physically and discontinuously recording data of a single tune (program/track), in other words, even when discontinuously executing recording covering plural parts, reproduction can be executed by way of accessing parts to parts without generating obstacle in the reproducing operation, and thus, regarding music pieces being recorded by a user, for the purpose of effective utilization of the recordable area, recording may be executed by way of splitting said area into plural parts.

Because of the above reason, the linkage information is provided. For example, it is so arranged that, by way of specifying the parts tables that should be connected to each other, the parts tables can be linked with each other via the numbers (01h) through (FFh) given to respective parts tables.

In other words, regarding the control tables in dealing with the U-TOC sector 0, each parts table expresses a single unit of parts. For example, in regard to such a musical piece comprising three linked parts, control of the parts positions is executed by means of three parts tables being linked with each other by the linkage data.

In actual cases, the linkage data is designated by numerical values corresponding to byte positions within the U-TOC sector 0 via a predetermined arithmetic operation. More particularly, the position of the parts table is specified based on a formula.

Contents of the parts stored in respective parts tables (01h) through (FFh) in the U-TOC sector 0 are shown by means of pointers (P-DFA, P-EMPTY, P-FRA, and P-TNO1 through P-TNO225) as described below.

The pointer P-DFA points out defective areas on the optical-magnetic disc 90 by way of specifying the foremost parts table among a single unit or a plurality of parts tables showing such a track portion (i.e., parts) that make up a defective area caused by damage or the like. In other words, whenever defective parts are present, any of the parts group (01h) through (FFh) are recorded by the pointer P-DFA, and yet, the defective parts are shown in the corresponding parts table by means of the starting and the ending addresses. If another defective parts were present, another parts table is designated as the linkage information in the corresponding parts table. Defective parts are specified in this parts table. If there is no other defective parts, the linkage data becomes to identify that no linkage is present thenceforth.

The pointer P-EMPTY points out the foremost parts table among a single unit or a plurality of parts tables not yet being used in the control table section. If there is any parts table not yet being used, any of the parts group (01h) through (FFh) is recorded by the pointer P-EMPTY.

If there are a plurality of parts tables not yet being used, those parts tables are sequentially designated by the linkage information out from those parts tables designated by the pointer P-EMPTY to cause all the not-yet-used parts tables to be linked with each other on the control table section.

The pointer P-FRA points out free area (including the data-erased portion) enabling writing of data on the optical-magnetic disc 90. The pointer P-FRA specifies the foremost parts table among a single unit or a plurality of parts tables showing such a track portion (i.e., parts) that becomes free area. In other words, when free area is present, any of the parts group (01h) through (FFh) is recorded by the pointer P-FRA. Parts corresponding to free area is specified by means of the starting and the ending addresses in the corresponding parts table.

If there are a plurality of parts tables, these tables are sequentially designated by the linkage information up to the last one that causes the linkage information to eventually become.

Figure 9:
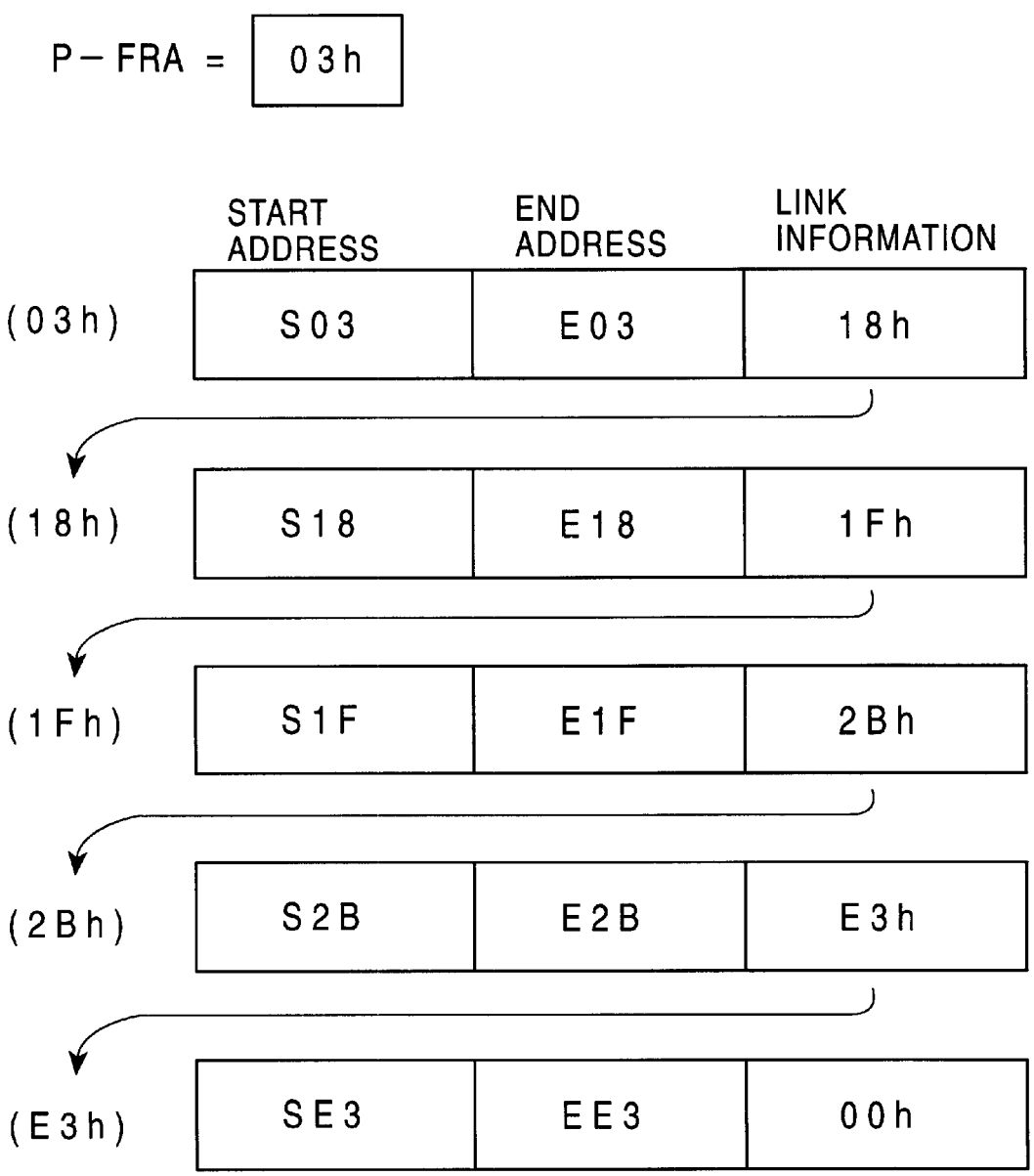
FIG. 9 is a block diagram illustrating a linking form of U-TOC sector "0" in accordance with an embodiment of the invention.

FIG. 9 schematically designates the state of the controlling parts that can be formed into free area by the parts table. FIG. 9 designates such a condition in which the state of the parts (03h) (18h) (1Fh) (2Bh) (E3h) respectively being free areas is expressed by the linkage between the parts (03h) (18h) (1Fh) (2Bh) (E3h) in succession to the pointer P-FRA. The same applies to the form of controlling the above-described defective area and the parts tables not yet being used.

The pointers P-TNO1 through P-TNO255 respectively designate the track of the musical piece recorded on the optical-magnetic disc 90 by a user. For example, the pointer TO1 specifies such a part table showing the part that becomes the foremost via time among one or a plurality of parts recorded with data of the first track.

For example, in such a case in which a musical piece specified as the first track (i.e., the first program) is recorded by means of a single part without causing the track to be split on the disc 90, the first-track recorded area is recorded as the starting and the ending address in the parts table shown by the pointer P-TNO1.

Further, in such a case in which a musical piece specified as the second track (i.e., the second program) is discretely recorded on a plurality of parts on the disc 90 for example, respective parts specifying recorded position of the second track are designated in accordance with timewise sequence. In other words, beginning with a parts table designated by the pointer P-TNO2, other parts tables are sequentially designated by the linkage information based on timewise sequence, and then, these parts tables are linked with each other up to the last one that causes the linkage information to eventually become . The above process form is similar to the one shown in FIG. 9.

As described above, since all the parts recorded with data for composing the second tune have been recorded via sequential designation for example, when reproducing the second tune or executing recording on the second-tune domain via superscription by applying data of the U-TOC sector 0, it is possible to cause the optical head 3 and the magnetic head 6a to access data to extract continuous musical information from the discrete parts and execute recording via effective utilization of the recording area.

As described above, control of area on the data-rewritable optical-magnetic disc 90 is executed by applying the P-TOC (read-only data), whereas control of the musical pieces recorded on the user-recordable area and control of the free area are executed by applying the U-TOC (User Table Of Contents).

1-2-4-2: U-TOC Sector 1

Figure 10:
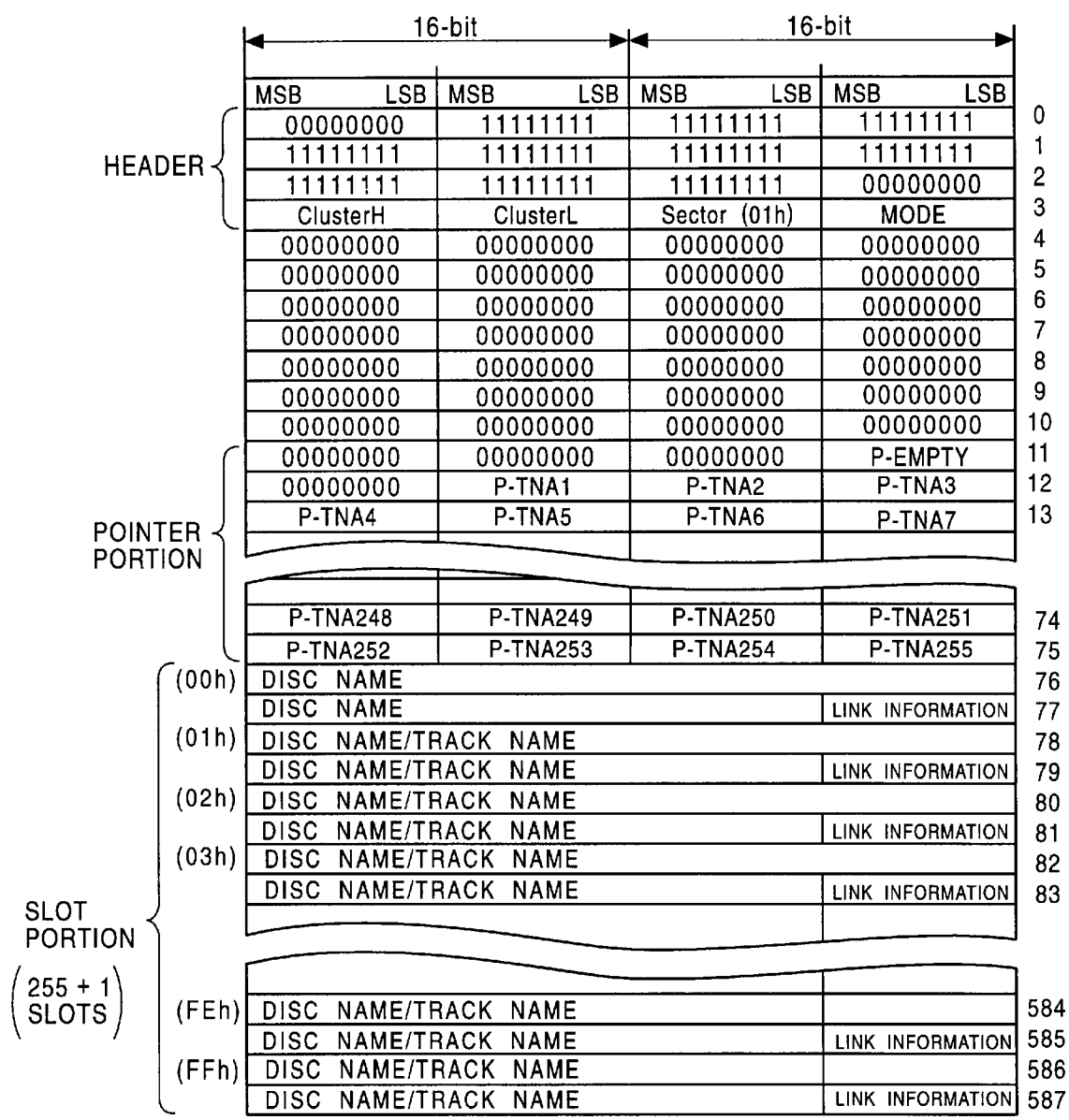
FIG. 10 is a block diagram illustrating a U-TOC sector "1" in accordance with an embodiment of the invention.

FIG. 10 illustrates the format of the U-TOC sector 1. When providing each of the recorded tracks with the track name or the disc name that make up data of the title of the disc itself, the U-TOC sector 1 functions as the data area for recording input character information.

The U-TOC sector 1 is prepared with pointers P-TNA1 through P-TNA255 in correspondence with the recorded tracks. A slot portion designated by the pointers P-TNA1 through P-TNA255 is prepared with 255 units of slots (01h) through (FFh) each comprising 8-bytes and a single slot (00h) comprising 8-bytes. The U-TOC sector 1 controls the character data based on the format substantially being identical to that of the above-described U-TOC sector 0.

Character data such as a disc title and a track name is recorded on slots ranging from (01h) to (FFh) by means of the "ASCII (American Standard Code for Information Interchange)" code.

For example, the character data input by a user is recorded on a slot designated by the pointer P-TAN1 in correspondence with the first track. Further, since the slots are linked with each other via the linkage information, even when the input character corresponding to a single track outgrows 7-bytes (7 characters), this can also be managed properly.

The 8-bytes for forming the slot (00h) make up exclusive area for recording the disc name, where the slot (00h) is not subject to designation by a pointer P-TNA(x).

Even in the U-TOC sector 1, the pointer P-EMPTY controls any of those slots not being used.

1-2-4-3: U-TOC Sector 2

Figure 11:
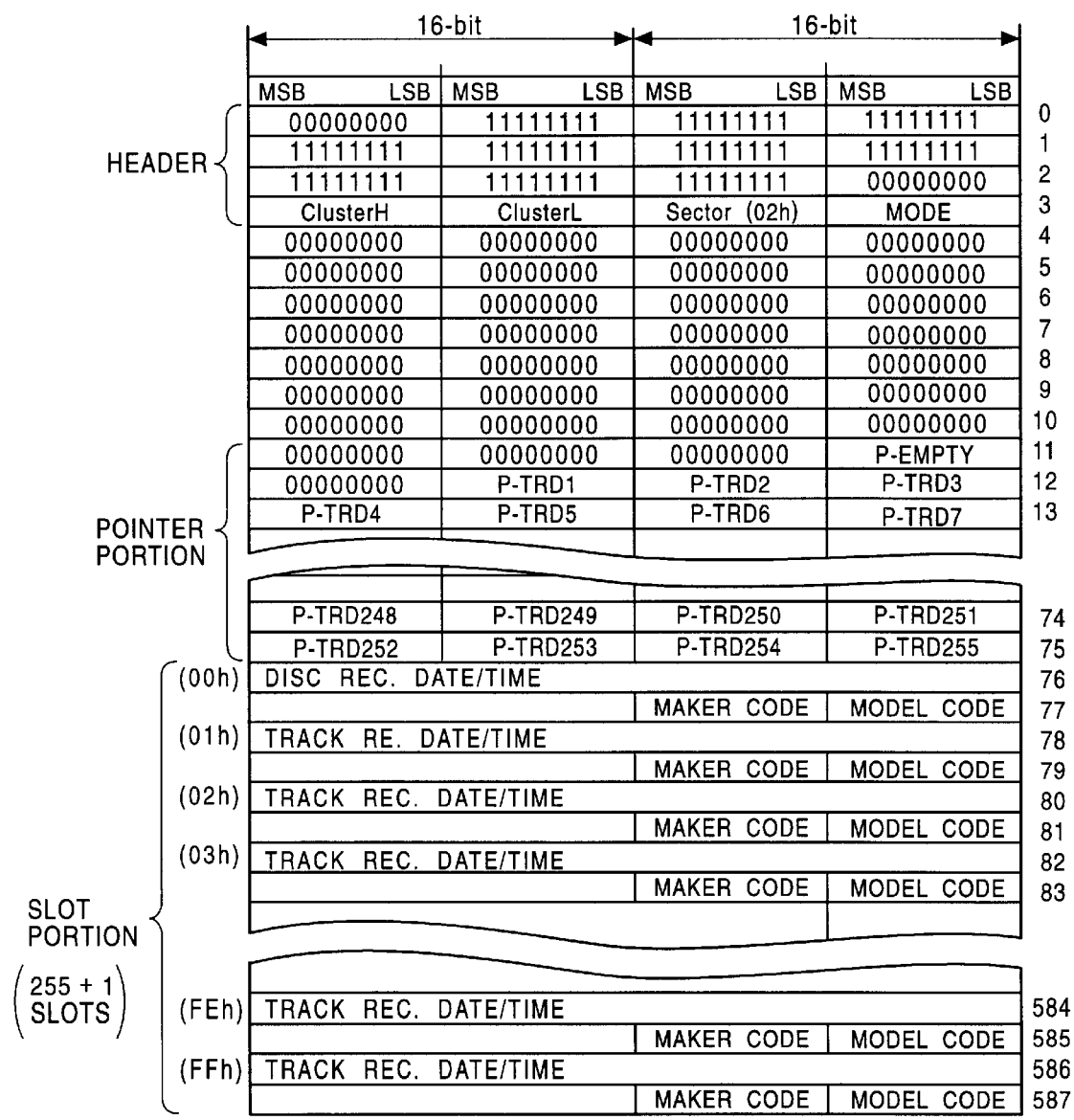
FIG. 11 is a block diagram illustrating a U-TOC sector "2" in accordance with an embodiment of the invention.

FIG. 11 designates the format of U-TOC sector 2. The U-TOC sector 2 makes up such a data domain for mainly enabling a user to record date and time of the recording of a certain musical piece executed by himself.

The U-TOC sector 2 is prepared with pointers P-TRD1 through P-TRD255 corresponding to the recorded tracks. Further, slot portion to be designated by the pointers P-TRD1 through P-TRD255 is also provided for the U-TOC sector 2. The slot portion is provided with a total of 255 units of slots (01h) through (FFh) each being composed of 8-bytes. The slot portion controls data of the date and the time according to the format substantially being identical to that of the above-referred U-TOC sector 0.

The date and the time of the recording of a music piece (track) are recorded on each of the slots (01h) through (FFh) per 6 bytes. Numerical value corresponding to the year, month, date, hour, minute, and second, is recorded per byte in the 6-byte data. The remaining 2 bytes respectively records the maker code and the model code. Concretely, code data specifying the manufacturer of the recording unit used for recording the relevant musical piece and the other code data specifying the kind of the operated recording unit are respectively recorded.

For example, when track being the first tune is recorded, the date and the time of the recording, the maker code related to the recording unit, and the model code of the recording unit are recorded on the slots designated by the pointer P-TRD1. By referring to a built-in clock, the system controller 11 automatically records data of the date and the time of the recording.

The 8-bytes for making up slot (00h) correspond to an exclusive area for recording the date and the time per disc unit, where the slot (00h) is not subject to designation by the pointer P-TRD(x).

Even in the U-TOC sector 2, the slot pointer P-EMPTY controls any of those slots not being used. In place of the model code, the linkage information records any of those slits not being used. Beginning with the slot pointer P-EMPTY, all the not-yet-used slots are controlled in linkage with the linkage information.

1-2-4-4: U-TOC Sector 4

Figure 12:
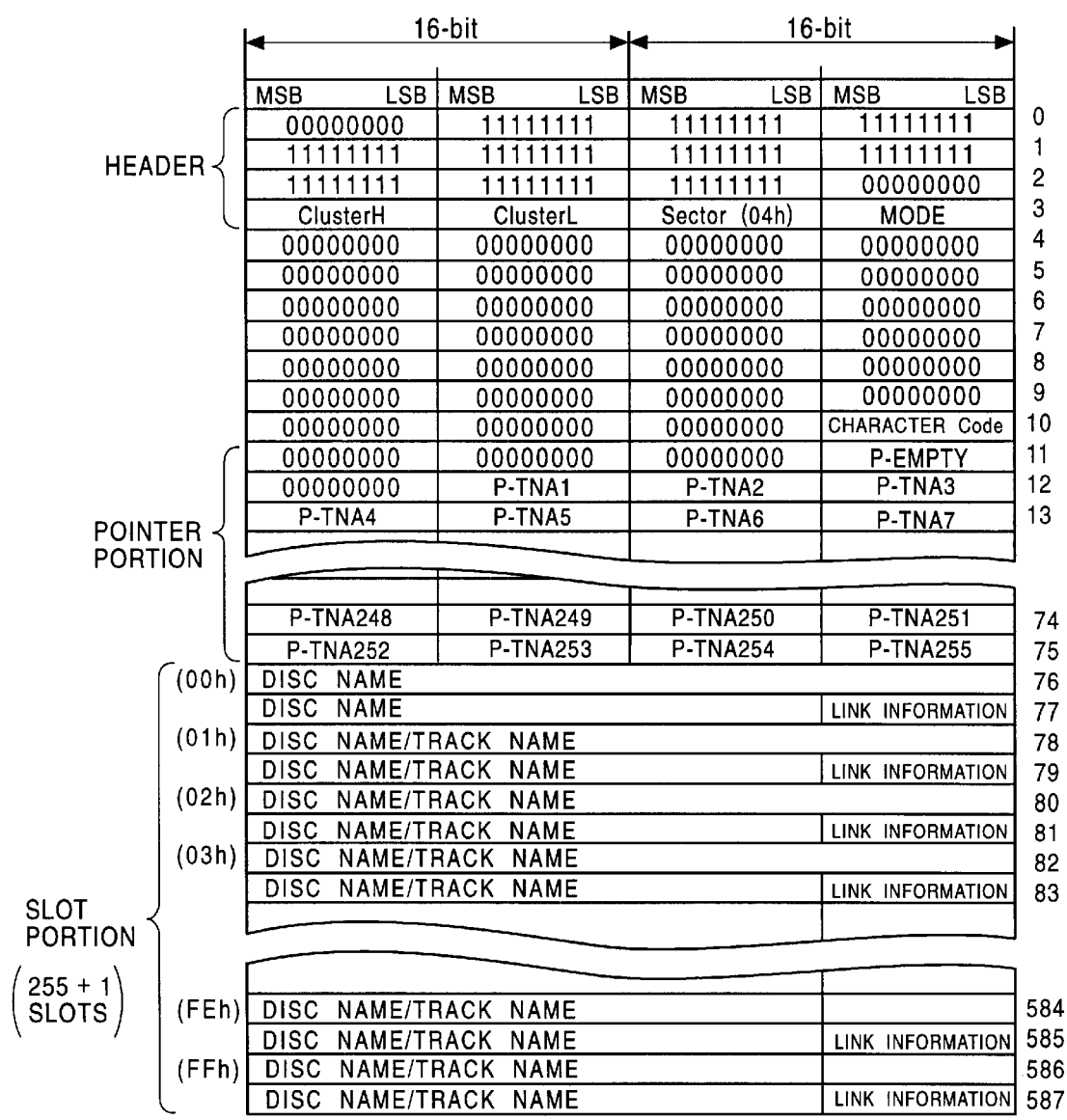
FIG. 12 is a block diagram illustrating a U-TOC sector "4" in accordance with an embodiment of the invention.

FIG. 12 designates a U-TOC sector 4. Like the above-referred U-TOC sector 1, the U-TOC sector 4 makes up such a data area for recording the input character data in the case of putting a tune name (track name) to the track recorded by a user or putting a disc name to the disc 90. As is apparent via comparison between FIG. 10 and FIG. 12, the format of the U-TOC sector 4 is substantially identical to that of the U-TOC sector 1.

However, the U-TOC sector 4 is designed to record two-byte code capable of dealing with Chinese characters and Roman letters. As is done for the sector 1, the U-TOC sector 4 executes control of character data via the pointers P-TNA1 through P-TNA255 and the 255 units of slots (01h) through (FFh) specified by the pointers P-TNA1 through P-TNA255.

The recording and reproducing apparatus 1 pertaining to the invention can deal with a reproduction-only disc being devoid of the U-TOC data. However, when dealing with such a reproduction-only disc, availing of the P-TOC (read-only data), it is also possible for the recording and reproduction apparatus 1 to record the character data including the disc name and the track name. Concretely, such a sector functioning as a P-TOC sector and having composition substantially being similar to that of the U-TOC sectors 1 and 4 is prepared, thus enabling the disc manufacturers to previously record the disc name and the track name in the P-TOC sector.

1-2-5: AUX-TOC 1-2-5-1: AUX-TOC Sector 0

As described by referring to FIG. 7, such a domain for the recording of the AUX-data files and the AUX-TOC (Auxiliary-data Table Of Contents) is provided for the disc 90 pertaining to the invention. This enables the disc 90 to record the AUX-data files comprising the character data and the picture-image data independently of the tracks (programs) of the musical pieces.

The AUX data files are controlled by the AUX-TOC. The AUX-TOC data are repeatedly recorded for three times across 3 clusters. Accordingly, like the U-TOC, it is possible for the structure of control data to utilize 32 sectors present in each cluster.

In this embodiment, as will be described hereinafter, control of the AUX data file is executed by setting the AUX-TOC sector 0 through sector 5.

First, referring to FIG. 13, format of the AUX-TOC sector 0 is described below.

The AUX-TOC sector 0 is defined as an area-allocation table which executes control of the free area (vacant area) in the entire AUX-data domains.

As shown in FIG. 13, in succession to the header (comprising sector-address Sector=00h and mode-data (MODE)=02h), based on the ASCII code, four characters including "M", "D", "A", and "D", are recorded onto predetermined byte positions of the AUX-TOC sector 0 by utilizing a domain corresponding to four bytes. The above four characters "M", "D", "A", "D", designate identification of the format. These four characters are also recorded on the identical byte positions in common with the AUX-TOC sectors to be described hereinafter.

Further, the maker code and the model code are recorded at a predetermined byte position in succession to the above-referred identification of the format, and in addition, the used-sector data is also recorded at a predetermined byte position that follows the identification of the format.

The state of utilizing sectors in the AUX-TOC is shown in the above-referred used-sector data.

The 8-bit (d8 through d1) data for forming the used sectors 0 respectively deal with sectors 0 through 7. Likewise, the 8-bit data (d8 through d1) for forming the used sectors 1 respectively deal with sectors 8 through 15. Likewise, the 8-bit (d8 through d1) data for forming the used sectors 2 respectively deal with sectors 16 through 23. The 8-bit (d8 through d1) data for forming the used sectors 3 respectively deal with sectors 24 through 31.

In the AUX-TOC sector 0, the pointer P-EMPTY and the pointer P-BLANK jointly compose the pointer portion.

A total of 99 units of the parts tables each comprising 8-bytes are formed in the table portion in order to record the starting address, the ending address, and the linkage data thereon. Based on the form similar to that of the above-referred U-TOC sector 0, the table portion executes control of the AUX data area. However, in this case, only those parts tables ranging from (01h) to (63h) are utilized for the table portion without using the remaining parts tables (64h) through (FFh), whereby causing ALL "0" (zeros) condition to be entered.

Those parts tables further than the parts table (64h) may also be used for the table portion. However, practically, a total of 99 units of the parts tables can suffice the control operation. In the above case, effective table portion solely comprises the parts tables (01h) up to (63h). This range has been determined in order to deal with specific memory capacity of the buffer memory 13.

The pointer P-EMPTY controls the not-yet-used parts tables of the AUX-TOC sector 0 in the condition being linked with each other.

The pointer P-BLANK controls the free area in the AUX data area, in other words, as executed by the pointer P-FRA in the U-TOC sector 0, the pointer P-BLANK controls blank area enabling the recording of the AUX-data file thereon by way of linking the parts tables with each other.

The starting address and the ending address respectively conform to the contracted form, whereby making it possible to designate addresses up to the sound-group position. It is prescribed for the AUX-TOC sector 0 in the embodiment of the invention to designate address based on cluster unit, and thus, ALL "0" is set to the data position designating the sound-group unit in the sector, starting address, and also in the ending address.

The starting address and the ending address to be recorded across 3 bytes in the table portion or the slot portion of the AUX-TOC sectors 1 through sectors 5 to be described hereinafter also conform to the contracted format. Prescription to specify maximum range of data unit applicable to the starting address and the ending address could differ depending on the contents of respective sectors, and thus, this will be explained in the following description as required.

In the case of forming the AUX-TOC data on a reproduction-only disc, the linkage data for the parts tables is deleted from use.

1-2-5-2: AUX-TOC Sector 1

The AUX-TOC sector 1, sector 2, and sector 3, are respectively used for controlling the still-picture file containing the still-picture data.

The AUX-TOC sector 1 shown in FIG. 14 becomes a control sector in the form of a picture-allocation table, whereby executing control of respective data files recorded in the AUX-data area as the picture files.

By way of conforming to the format similar to that of the U-TOC sector 0, the AUX-TOC sector 1 executes control of the picture files.

According to the form of this embodiment, length of file as a picture file per one still picture recorded on the AUX data area is not prescribed in particular. On the other hand, in the form of this embodiment, as will be described later on, including a cover picture image, a maximum of 100 units of the picture files are controllably composed. Accordingly, a maximum of 100 units of the picture files can substantially be recorded.

It is so arranged that the cover picture-image can be formed into a disc jacket for example.

In the case of the AUX-TOC sector 1, sector address (Sector)=01h, and mode data (MODE)=02h, are recorded on the header.

In order to function as the pointer P-PNO(x) used for controlling 99 units of the picture files other than the cover picture-image, the pointers P-PN01 through P-PN099 are formed in the AUX-TOC sector 1. The is recorded at individual byte positions in a range from the pointer P-PN099 to a position immediately before the table portion.

However, in order to deal with such a case in which recording of a greater number of the picture image becomes possible via potential expansion of the AUX-data area and modification of file size, it is possible to provide pointers P-PN0100 through P-PN255 functioning as the pointer PN0(x) in a range from a byte position following the pointers P-PN01 through P-PN099 to a byte position immediately before the pointer P-P0255 shown by means of parenthesis in FIG. 14.

Two-byte domain following the maker code and the model code comprise a pointer First PN0 and Last PN0. Number x of the initial pointer P-PN0(x) being used among the pointers PN01 through P-PN099 is recorded on the First PN0, whereas number x of the last pointer P-PN0(x) being used among the pointers PN01 through P-PN099 is recorded on the Last PN0. For example, assume that pointers P-PN01 through P-PN05 are used among the pointers P-PN01 through P-PN099. In this case, the pointer First PN0=01h and the other pointer Last PN0=05h are recorded on the above-referred 2-byte domain.

Further, the pointer P-PFRA and the pointer P-EMPTY are also formed in the pointer portion. A total of 99 units of 8-byte parts tables (01h) through (63h) respectively corresponding to respective pointers are formed in the table portion in order to record the starting address, the ending address, and the picture-image mode (S.Pict. mode) on the 99 parts tables. Like the AUX-TOC sector 0, in this case, assuming that the remaining parts tables (64h) through (FFh) are deleted from use, ALL "0" (zeros) code is set.

The parts table (00h) is not subject to designation by pointer. However, in this case, the parts table (00h) is solely used for controlling the addresses of the picture files being positioned as the cover picture. The above-referred picture-mage mode (S.Pict. mode) is also provided the parts table (00h) which is usable for the cover picture.

By way of designating specific parts tables, the pointers P-PN01 through P-PN099 respectively control domains on which an individual picture file is recorded. For example, such a parts table designated by the pointer P-PN01 contains the recorded starting address, the ending address, and the picture-image mode (S.Pict. mode) applied to a picture file that becomes the initial-piece picture-image data.

The AUX-TOC sector 1 dispenses with control of files otherwise being executed by linking the parts tables with each other via a linkage data (Link-P). In other words, no recording can be made to an individual picture file by way of being split into physically discrete sections.

However, any of those parts tables not yet being used in the AUX-TOC sector 1 is controlled via the linkage (the eighth byte of each parts table corresponds to the linkage data) starting from the pointer P-EMPTY.

The pointer P-PFRA in the AUX-TOC sector 1 contains the recorded picture data being less than one cluster against one-cluster domain inside of the AUX-data area. Further, in such a case in which any domain deleted with recording of the picture data within one cluster corresponds to the not-yet-recorded (recording-enable) domain, i.e., the free area, the pointer P-PFRA controls this free area. In other words, address for sectioning the free area is recorded on a parts table designated by the pointer P-PFRA.

The picture-image mode (S.Pict. mode) in respective parts tables in the AUX-TOC sector 1 designates the mode information including copy status in relation to the picture files recorded in addresses designated by respective parts tables.

The picture-image mode (S.Pict. mode) is defined as the one shown in FIG. 21(*a*) for example.

The picture-image mode comprises 8-bit data (d1 through d8). Copy status is designated by 2-bit data comprising d1 and d2 bits. The terms "copy status" denotes such a data being set to determine approval or disapproval to effect copy of the corresponding picture file.

In this case, when the copy status is identified as (0h), it means that copy is approved, whereby enabling the corresponding picture file to be copied for indefinite rounds.

When the copy status is identified as (1h), it means that copy of the corresponding picture file is approved only for the remaining one round.

When the copy status is identified as (2h), it means that copy of the corresponding picture file is approved only for one round via a verified data bus. In other words, copy is disapproved if the corresponding picture file is routed via such a data bus not being verified.

When the copy status is identified as (3h), it means that copy of the corresponding picture file is inhibited.

In regard to the remaining 6-bits comprising d3 through d8, no definition is present for now.

In such a case in which copy should be executed against a certain picture-file data, in correspondence with the contents of the copy status given to deal with a picture file that preceded the picture file being subject to this copying operation, it is essential that the copy status to be given to the picture file subsequent to the copying operation be renewed as shown in FIG. 21(*b*).

In other words, in such a case in which the copy status is set to (0h) prior to copying of a picture file, even after executing the copy operation, the copy status (0h) is given to this picture file, whereby enabling the copy operation to be executed for indefinite rounds.

On the other hand, if the copy status remained (1h) or (2h) prior to the copy operation, after completing the copy operation, the copy status is turned into (3h), thus indicating that further copy operation is inhibited.

1-2-5-3: AUX-TOC Sector 2

FIG. 15 designates a block diagram of the format of a AUX-TOC sector 2, which is defined as the picture information table. When putting a picture name, a data and a time of recording, and a URL (Uniform Resource Locators) data used for internet communication, to the recorded picture files (these data are referred to as "picture information" in the following description of this embodiment), the AUX-TOC sector 2 serves as the data domain available for recording a variety of data of the picture information as the character data.

Prior to explanation of the AUX-TOC sector 2, referring now to FIG. 22, composition of a picture-information file recorded in the table portion of the AUX-TOC sector 2 is described below. The picture-information file is defined as data of the picture information corresponding to a single picture frame.

Figure 22:
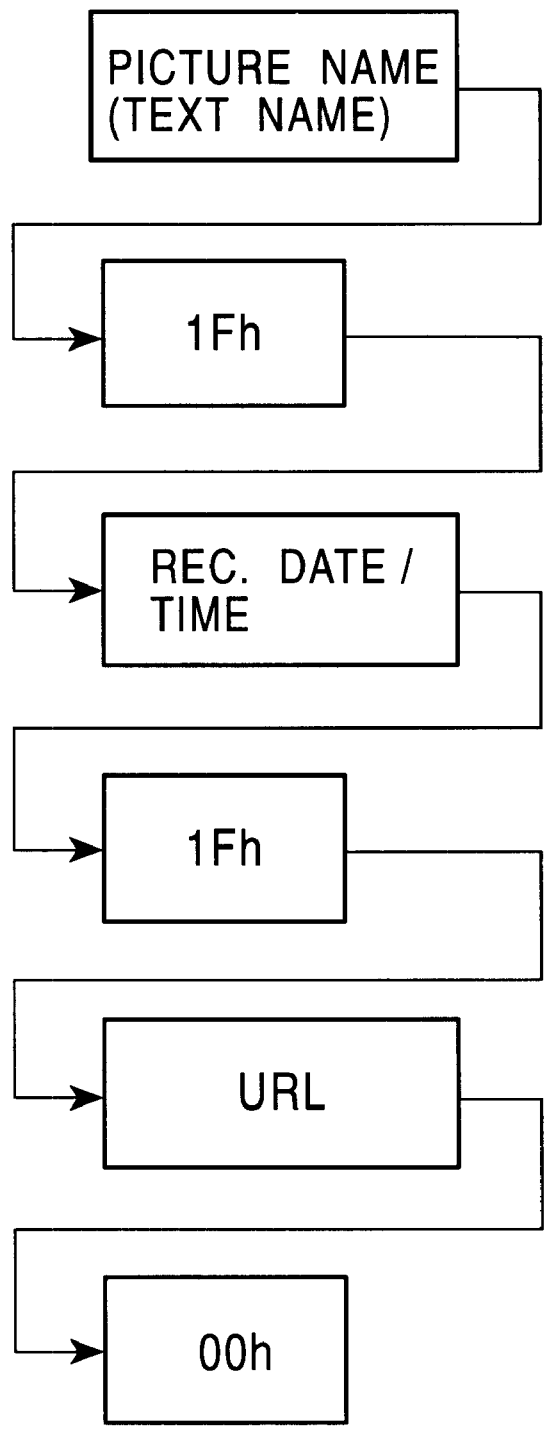
FIG. 22 is a chart illustrating a composition of picture or text information file data.

As shown in FIG. 22, initially, a data unit comprising the picture name is disposed by applying the "ASCII" code and other character codes. This picture code conforms to the format of the character data recorded on the slots of the U-TOC sector 4 shown in FIG. 12.

Following the picture-name data unit, code designating section between data units is disposed, and then, data unit of the recorded date and the time is disposed behind the code. Data of the recorded date and the time conforms to the format of the date and the time recorded on the slot of the U-TOC sector 2 shown in FIG. 11, where the date and the time are recorded by applying 6-bytes described above.

Following the data unit of the recorded date and the time, the above-referred code is also disposed. Character code in the form of the URL is disposed behind the code. It is possible to record the URL character code from a MSB (Most Significant Bit) by applying the "ASCII" code without utilizing "character. code" to be described later on. The end of file is closed by code.

In such a case in which substantial contents are absent from any of the data unit comprising the picture name, the recorded date and the time, and the URL, is also recorded in place of the data unit.

In such a case in which a picture file can be secured by way of down-loading it from a home page shown via internet, the URL of the home page can be added to the picture file.

Back to FIG. 15, function of the AUX-TOC sector 2 is described below.

Initially, the sector address (Sector)=02h and the mode information (MODE)=02h are recorded in the header of the AUX-TOC sector 2.

In order to deal with the recorded picture files, the AUX-TO sector 2 is provided with pointer portion comprising pointers P-PIF1 through P-PIF99, where the scope of the pointer can be expanded up to pointer P-PIF255. On the other hand, slot portion is provided with 255 units of slots (01h) through (FFh) per 8-byte unit and the other slot (00h) per 8-byte unit, where any of these slots can be designated by the pointers P-PIF1 through P-PIF99.

Two-byte domains following the maker code and the model code respectively comprise the pointer First PIF and the pointer Last PIF. Among the pointers P-PIF1 through P-PIF99, the number of the first pointer P-PIF in use is recorded on the pointer First PIF, whereas the number of the last pointer P-PIF is recorded on the pointer Last PIF.

The character data in the form of the picture-information file are recorded on slots (00h) through (FFh) by applying "ASCII" code and other character codes. The kind of recordable character is prescribed by character code ("chara. code" is shown in FIG. 15) recorded at a predetermined byte position on the AUX-TOC sector 2.

Practical form of the invention defines available character code which, for example, includes the following: via the "ASCII" code; via modified ISO (International Organization for Standardization). 8859-1; via music-shifted JIS (Japanese Industrial Standards); via KS-C-5601-1989 (Korean language); and via GB2312-80 (Chinese language).

The pointers P-PIF1 through P-PIF99 designate specific parts tables recorded with the picture-information files bearing file numbers corresponding to respective pointer numbers. For example, such a character corresponding to a picture-image of the first picture file is recorded on a slot designated by the pointer P-PIF1. The eight bytes functioning as the slot (00h) are defined as an exclusive area for initiating recording of the picture-information file corresponding to the cover picture.

It is so arranged that, by way of linking respective slots with each other via linkage data, even when a certain picture-information file corresponding to a certain picture file is greater than 7 bytes, each slot can properly deal with recording.

The pointer P-EMPTY controls any of those slots being out of use via linkage.

It is also practicable to individually control the picture name, the date and the time of recording, and the URL by way of setting up corresponding AUX-TOC sectors being different from each other. However, as shown in FIG. 15 and FIG. 22, by way of integrally controlling a variety of character data related to the picture files provided by the AUX-TOC sector 2 as the picture-information files, amount of data (i.e., the number of TOC sectors) needed as control data becomes less than the case of individually controlling the picture name, the date and the time of recording, and the URL by way of setting up corresponding AUX-TOC sectors being different from each other, whereby enabling effective utilization of recording area of the disc 90.

1-2-5-4: AUX-TOC Sector 3

The AUX-TOC sector 3 shown in FIG. 16 is defined as a picture playback sequence table.

The picture playback sequence table makes up control data to execute output operation (in other words, display of picture image) in synchronization with reproduction of the programs comprising the musical pieces for example.

The header of the AUX-TOC sector 3 is recorded with the sector address (Sector)=03h and the mode information (MODE)=02h.

A total of 99 pointers comprising pointers P-TNP1 through P-TNP99 (where the number of the pointers can be expanded to a maximum of P-PIF255) are provided for the pointer portion in order to deal with the recorded picture files. These pointers P-TNP1 through P-TNP99 respectively correspond to track numbers of the audio data recorded per track unit on the program area. In other words, these pointers individually correspond to the first through ninety-ninth tracks.

The table portion is provided with 99 units of the parts tables (01h) through (63h) on the 8-byte unit basis and the other parts table (00h) based on 8-byte unit respectively being subject to designation by the pointers P-TNP1 through P-TNP99. Code ALL "0" is recorded on those parts tables (64h)~(FFh) being out of use. Among those pointers P-TNP1 through P-TNP99, the pointer First TNP and the other pointer Last TNP respectively following the maker code and the model code are recorded with the number of the initial pointer P-TNP being used and the number of the last pointer P-TNP being used.

Starting address and ending address are recorded on respective parts tables designated by the pointers P-TNP1 through P-TNP99 based on the form of offset address from the initial positional address of a corresponding track. In the AU-TOC sector 3, addresses up to the unit of the sound group are designated.

A specific picture file corresponding to a pointer P-PN0$j$ is shown at the fourth byte of the respective parts tables. The pointer P-PN0$j$ becomes such a value corresponding to those picture files (P-PN01 through P-PN99) controlled by the AUX-TOC sector 1. Further, the pointer P-PN0$j$ causes other parts tables to be linked with each other by applying linkage data. In other words, it is possible to rule that a plurality of picture files can be displayed in an identical track.

For example, when executing reproduction of a music piece corresponding to the first track, if a picture image of the first picture file should desirably be output based on specific timing during reproduction mode, the starting address and the ending address specifying the picture-image output duration are recorded on the parts table designated by the pointer P-TNP1 corresponding to the first track. Further, as the picture image that should be output, the pointer P-PN0$j$ shows a specific picture file. Considering such a case in which the picture image of the first picture file should be output for display during such a period from activation of reproduction of the first track to the point at which 90 seconds are past after elapsing 90 seconds from the start of reproduction of the first track, such an address point corresponding to 60 seconds from the start of reproduction of the first track and such an address corresponding to 90 seconds from the start of reproduction of the first track are respectively recorded on the parts table designated by the pointer P-TNP1 as the starting address and the ending address by means of offset address. In order to designate the first picture file, the pointer P-PN0$j$ assumes the value of the pointer P-PN01.

Further, in the case in which plural picture image data should be displayed via switching while reproduction of a single track goes on, the parts tables are linked with each other in order to control the picture files that should be output and also control the output duration as well.

The parts table (00h) shown in FIG. 16 deals with the cover picture. However, in principle, in the case of the cover picture, output of the picture image data synchronous with reproduction of the audio tack data is not executed, and thus, in this case, code ALL "0" is recorded as the starting address and the ending address of the parts table (00h).

In such a case in which the starting address and the ending address in a part table corresponding to a certain track respectively assume ALL "0", it is so arranged that a picture image of a picture file (shown by the pointer P-PN0j) being designated during output of the audio data signal of the track can be displayed.

If the ending address solely assumes ALL "0" code, it is so arranged that such a picture file designated by the pointer P-PN0j and being subject to the next display during a period of reproducing the corresponding track data can be output.

In the case in which both the starting address and the ending address are not designated as ALL "0", but both addresses are of an identical value, a picture file is inhibited from externally being displayed.

The above-referred AUX-TOC sector 3 also controls any of those parts tables being out of use by applying the linkage data fed from the pointer P-EMPTY.

1-2-5-5: AUX-TOC Sector 4

The AUX-TO sectors 4 and 5 individually control text files. The AUX-TOC sector 4 shown in FIG. 17 becomes a control center serving as the text allocation table by way of controlling recorded data files within the AUX data area, These AUX-TOC sector 4 controls the text files by conforming to the format identical to that is introduced to the U-TOC sector 4.

Assuming that the AUX data area is totally used for recording the text files, such a text data corresponding to 38 clusters×32 sectors×2324 bytes can be recorded. The recorded data can be controlled as a maximum of 255 units of files by the AUX-TOC sector 4. It should be noted however that, as will be described later on, it is so arranged that the AUX-TOC sector 4 can execute control of a maximum of 100 files including a piece of the cover picture. Length of each file of the text file is based on sector unit.

One of specific text files is positioned as the text file (Cover Text) that corresponds to the cover picture.

The header of the AUX-TOC sector 4 is recorded with the sector address (Sector)=04h and the mode information (MODE)=02h.

Pointers P-TXN01 through P-TXN099 (where pointers are expansible up to P-TXN0255) are formed inside of the AUX-TOC sector 4 to function as a pointer P-TXN0(x) used for controlling individual text files. These pointers P-TXN01 through P-TXN099 respectively correspond to the track numbers of the audio tracks. In other words, in the AUX-TOC sector 4, a maximum of 99 text files corresponding to the first through ninety-ninth audio tracks except for the cover picture can be controlled.

Further, pointers P-PFRA and P-EMPTY are also formed inside of the pointer portion.

A total of 99 units of parts tables (01h) through (63h) each being composed of 8 bytes corresponding to the above-referred pointers are provided for the table portion in order to record the starting address, the ending address, and the text mode thereon.

By defining that parts tables (63h) through (FFh) respectively remain out of use, code ALL "0" is memorized in the above-referred parts tables (01h) through (63h). Contents of the definition of the text mode are described later on.

The parts table (00h) is not subject to designation by pointers. In the AUX-TOC sector 4, the parts table (00h) is solely used for controlling addresses of the text files and the text mode positioned as the cover picture text.

By way of designating a specific part table, the pointers P-TXN01 through P-TXN099 respectively control such a domain recorded with a text file. For example, the parts table designated by the pointer TXN01 is recorded with the starting address, the ending address, and the text mode of the first file as the file number.

As described above, inasmuch as text file is based on sector unit, the above-referred starting address and the ending address are described based on sector unit. Code is set to the data position designating addresses based on the sound group unit.

The AUX-TOC sector 4 dispenses with control of file otherwise being executed by linking the parts tables with each other via the linkage data. In other words, no recording operation can be executed against a single text file by way of being split into physically discrete sections.

Those parts tables remaining out of use inside of the AUX-TOC sector 4 are controlled by the linked form that begins with the pointer P-EMPTY as the origin, where the eighth byte of each part table corresponds to the linkage data.

Pointer P-PFRA of the AUX-TOC sector 4 is recorded with data of such a text file corresponding to less than 1 cluster against 1-cluster domain in the AUX data area, and yet, the pointer P-PFRA controls the free area comprising such a domain on which no data has been recorded within one cluster (i.e., recording-enable domain). Concretely, address for sectioning the free area is recorded on such a parts table designated by the pointer P-PFRA. There may be such a case in which the eighth byte of this parts table functioning as the linkage data enables linkage of the parts tables, whereby enabling control of the free area comprising a plurality of discrete sections.

Referring now to FIG. 23, contents of definition of the text mode being set to individual part tables of the AUX-TOC sector 4 are described below.

The text mode corresponds to such a domain at the fourth-byte position in each parts table, where the text mode is formed with 8-bits (d1 through d8), i.e., being formed with 1 byte data. Among d1 through d8 bits, 2 bits comprising d1 and d2 designates a copy status. Inasmuch as the copy status is identical to the preceding copy status (S.Pict mode) related to the picture file previously described by referring to FIG. 21(a), further description is deleted.

On the other hand, 2 bits comprising d3 and d4 designates contents of the text file. In this case, if d3 and d4 correspond to, it means a lyrics text. In other words, this text file represents the text of the words of a musical piece of the corresponding audio track. If d3 and d4 correspond to, it means that the text describes artist information (including artist name and others) of the artist playing a musical piece of the corresponding audio track. If is identified, it means that the text describes so-called liner notes. If is identified, it means that the text relates to other information.

One bit comprising d5 designates whether time stamp has been inserted into the text file or not. If is identified, it means that the time stamp is absent. If is identified, it means that the time stamp is present. The time stamp will be described by referring to FIG. 24 later on.

Three bit comprising d6, d7, and d8 designates character code. For example, character code is defined as follows. Character code designates "ASCII" code, Character code ]1h] designates modified ISO 8859-1. Character code designates music-shifted JIS. Character code designates KS C 5601-1989 (Korean language). Character code designates GB2312-80 (Chinese language). Character codes and remain reserved. Character code designates "Plain Text", which enables character codes to be expansible by defining the text file as a plain text.

1-2-5-6: AUX-TOC Sector 5

FIG. 18 designates the format of the AUX-TOC sector 5. The AUX-TOC sector 5 functions as the text information table which forms such a data domain for recording a variety of character data comprising text information in the case of providing recorded text files with the text name, recording of the date and the time, and the URL information for internet communication. According to the invention, those data cited above are referred to as text information.

Composition of the text information file recorded on the table portion of the AUX-TOC sector 5 shown in FIG. 18 conforms to the picture information file shown in FIG. 22. In other words, the text information file of the AUX-TOC sector 5 is structurally identical to the picture information file shown in FIG. 22.

The header of the AUX-TOC sector 5 shown in FIG. 18 is recorded with the sector address (Sector)=05h and the mode information (MODE)=02h.

In order to deal with the recorded text files, pointer portion of the AUX-TOC sector 5 is provided with the pointers P-TXIF1 through P-TXEF99 (where pointers are expansible to a maximum of P-TXIF255). Further, slot portion of the AUX-TOC sector 5 is provided with 255 units per 8-byte basis of slots (01h) through (FFh) and an 8-byte slot (00h) totally being subject to designation by the pointers P-TXIF1 through P-TXIF99.

Among the above-referred pointers P-TXIF1 through P-TXIF99, number of the initial pointer P-TXIF being in use is recorded on the pointer First TXIF following the maker code and the model code. Number of the last pointer P-TXIF being in use is recorded on the pointer Last TXIF.

Character data comprising the text information files are recorded on the slots (00h) through (FFh) of the table portion by applying the "ASCII" code and other character codes. The kind of character to be recorded thereon is prescribed by the character code (chara. code) recorded on a predetermined byte position of the AUX-TOC sector 5.

As done for the AUX-TOC sector 2, the character code is also defined by way of the following: For example, conforms to the "ASCII" code, conforms to the modified ISO 8859-1, conforms to the music-shifted JIS, conforms to the KS C 5601-1989 (Korean language), and conforms to the GB2312-80 (Chinese language).

The above-referred pointers P-TXIF1 through P-TXIF99 respectively designate specific parts tables recorded with the text information files bearing file number corresponding to the number of the respective pointers. For example, such a slot designated by the pointer P-TXIF1 is recorded with character corresponding to picture image of the first text file. The 8 bytes for composing slot (00h) is defined as an exclusive area for initiating recording of the cover picture text information file corresponding to the cover picture text, where the slot (00h) is not subject to designation by the pointer P-TXIF(x).

By way of being linked with each other via the linkage data, even when the text information file corresponding to a single text file is greater than 7 bytes, it is so arranged that each slot can properly deal with the text information file.

Even in this case, it is also allowable to individually control the text name, the recording date and the time, and the URL by providing the AUX-TOC sectors being different from each other. As done for controlling the information files, by enabling the AUX-TOC sector 5 to integrally control delivered character data related to the picture files by way of treating the character data as text information file, consideration has been given in order to reduce the amount of data (i.e., the number of TOC sectors) required as control information.

1-2-6: Data file

Composition of two kinds of data files including the picture files and the text files respectively being the AUX data files controlled by respective AUX-TOC sectors is described below.

Regarding the picture files, optional length is provided for the file per piece of one still picture image. It is defined that image size of a still picture conforms to 640×480 dots, whereas a picture file conforms to the JPEG-format base line. In order to enable the AUX-TOC to control the picture files, it is defined that bit stream of each file ranges from a SOI (Start Of Image) marker prescribed by the JPEG to a EOI (End Of Image) marker.

Sector format conforms to mode-2. In order to delete the third layer ECC (Error Checking and Correction), it is so arranged that 2343 bytes are effective to suffice capacity of the picture-image data per sector. For example, assuming that the JPEG-format picture file comprises one cluster (=32 sectors), actual data size ranges from 72045 bytes (=2324× 31+1) to 74368 bytes (=2324×32).

Format of individual sector for composing the picture files is exemplified in FIG. 19 for example.

A 16-byte header comprising the synchronizing pattern, the cluster address (Cluster H, Cluster L), the sector address (Sector), and the mode information (02h) is provided at the foremost position. However, the ensuing 8-bytes still remain reserved.

Next, as is shown via data DP0 through DP2323, a domain functioning as data area is provided for recording 2324-byte picture image data thereon.

The last four bytes are respectively recorded with code. In addition, recording of error-detecting parity is also conceivable.

1-2-6-2: Text File Sector

In terms of text file, it is allowable to record the ASCII code, the modified ISO 8859-1 code, the music-shifted JIS code, and other text data prescribed by the text mode of the AUX-TOC sector 4.

Figure 20:
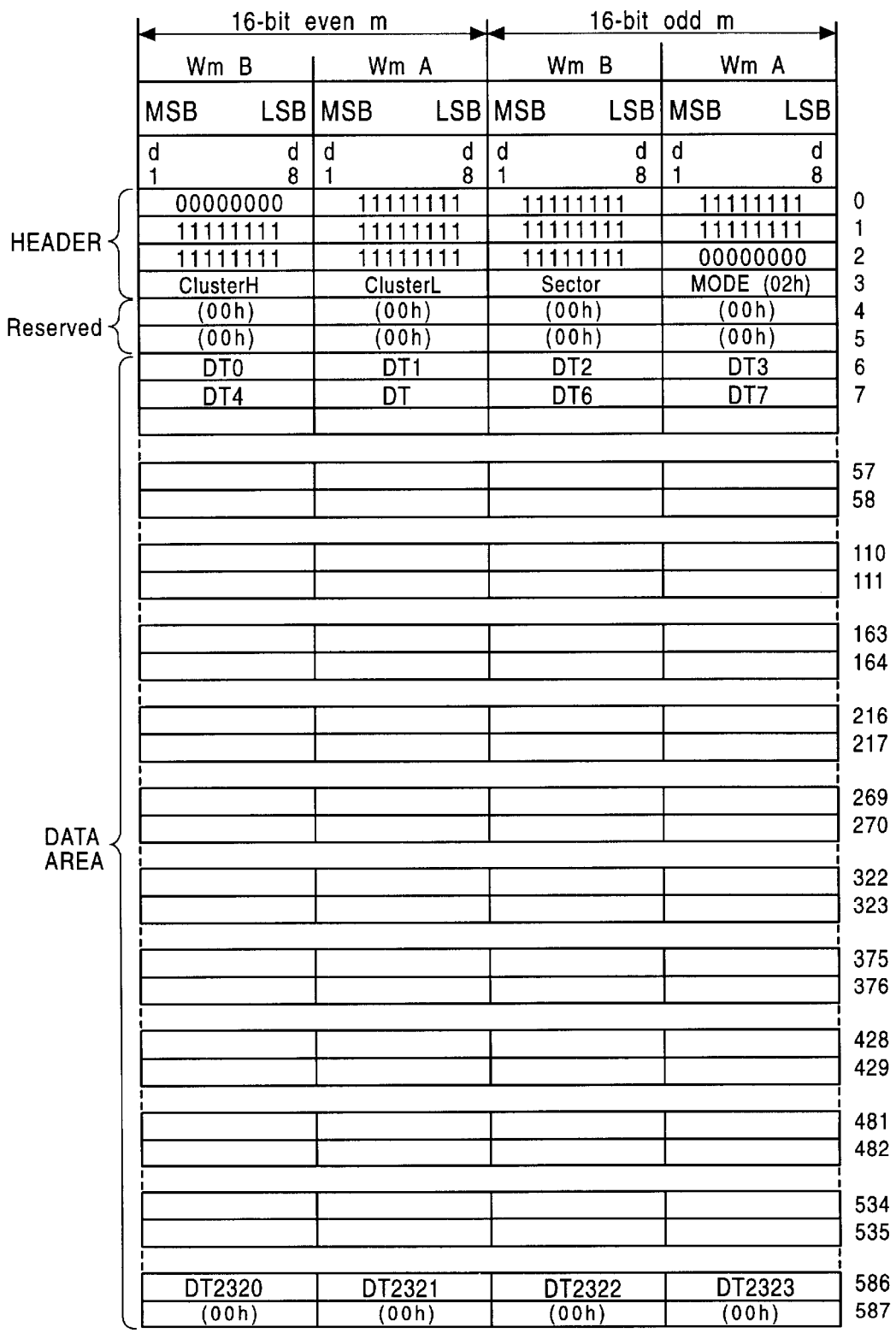
FIG. 20 is a block diagram illustrating a text file sector in accordance with an embodiment of the invention.

Format of sector for composing the text file is exemplified in FIG. 20. Like the case of the picture file, starting from the top, the header portion comprising 16 bytes, the reserved domains comprising 8 bytes, and data area for recording 2324 byte text files designated by way of data DT0 through DT2323, are respectively stored in the text file sector.

Code is recorded on the last 4 bytes. It is also conceivable to record error-detecting parity therein.

Figure 24:
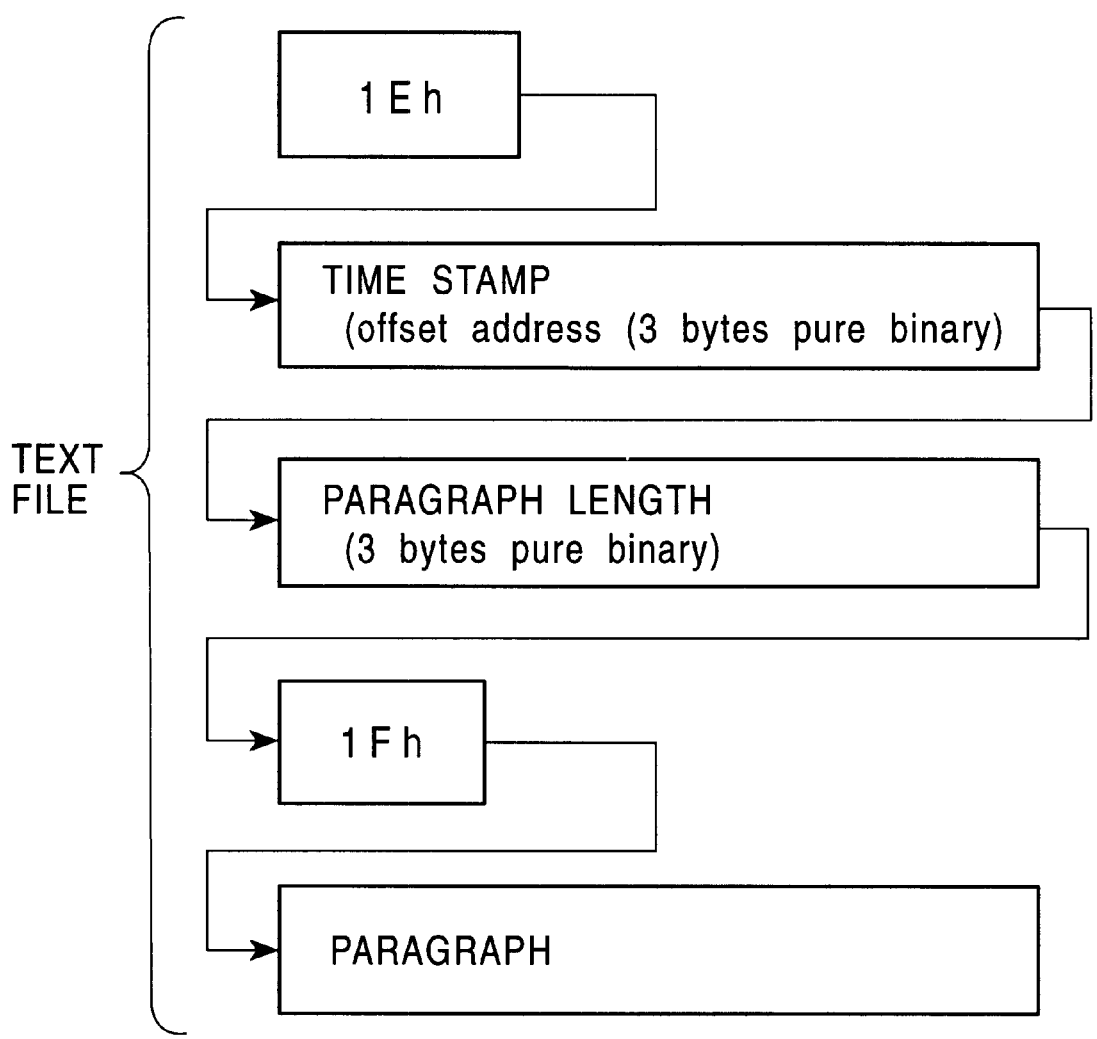
FIG. 24 is a block diagram illustrating a composition of data pertaining to a text file in such a case in which a time stamp is present.

FIG. 24 designates data composition of the text file recorded on the text file sector. Note that the text file shown in FIG. 24 comprises such a data structure capable of dealing with such a case in which "time-stamp is present (d5='1')" code is provided as one of the text modes of the AUX-TOC sector 4.

As shown in FIG. 24, in terms of the text file, initially, code for designating section per text file is provided, which is followed by a data unit (3-bytes pure binary) designating the time stamp.

The terms "time stamp" rules display output timing of the text files being synchronous with reproduction of corresponding audio track. The time stamp is designated by means of offset address of the corresponding audio track.

In succession, such a data unit (3-bytes pure binary) comprising paragraph length designating data length of data unit of paragraph (comprising substantial character data) is disposed. Finally, following 1Fh data, data unit of the paragraph is disposed.

1-3: Personal computer

Figure 25:
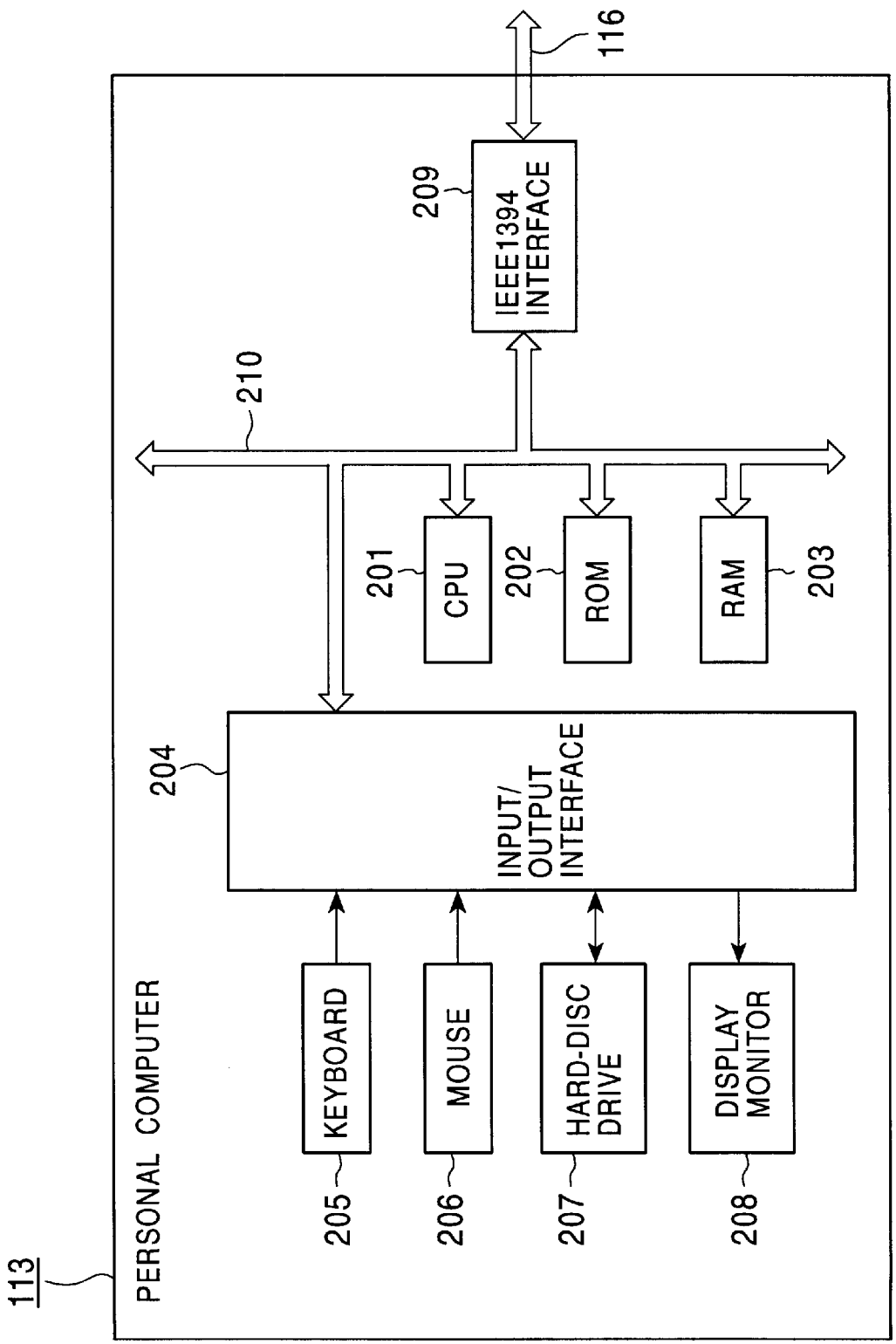
FIG. 25 is a block diagram exemplifying a structure of a personal computer.

Referring now to FIG. 25, internal structure of the personal computer 113 sharing part of the AV system 103 pertaining to practical form of the invention is described below.

The personal computer 113 shown in FIG. 25 incorporates a IEEE-1394-format interface 209 for transmitting and receiving data to and from external sources. By way of connecting the IEEE-1394-format interface 209 to the IEEE-1394-format data bus 116 serving as an external data bus, mutual communication with external equipment can be executed.

The IEEE-1394-format interface 209 demodulates packet received via the IEEE-1394-format data bus 116 to extract data from the demodulated packet. Next, by applying a data format compatible with internal data communication, the extracted data is converted into the data format before being output to a CPU 201 via an internal bus 210.

The IEEE-1394-format interface 209 receives output data via control of the CPU 201 and then executes demodulation process conforming to the IEEE-1394 format such as packeting process before eventually transmitting demodulated data to external sources via the IEEE-1394 data bus 116.

The CPU 201 executes a variety of processes in accordance with programs stored in a ROM 202 for example. In the embodiment of the invention, in order to enable transmission and reception of a variety of data in accordance with standard of the IEEE-1394 format, such a program needed for controlling the IEEE-1394-format interface 209 is stored in the ROM 202. The personal computer 113 is provided with hardware and software enabling transmission and reception of data conforming to the IEEE-1394-fomat.

Data and programs needed for enabling the CPU 201 to execute a variety of processes are stored in a RAM 203 as required.

An input/output interface 204 is connected to a keyboard 205 and a mouse 206 to deliver operating signal fed from the keyboard 205 and the mouse 206 to the CPU 201.

A hard-disc drive unit 207 incorporating a memory medium comprising a hard-disc is connected to the input/output interface 204. The CPU 201 records or reads data or program onto and from the hard-disc installed in the hard disc drive unit 207. A display monitor 208 is connected to the input/output interface 204 for displaying picture-image.

An internal bus 210 is composed of a PCI (Peripheral Component Interconnect) or a local bus for example, which connects a variety of built-in functional circuits to each other.

Even in the case of the IRD (Integrated Receiver Decoder) 112 and the MD recorder/player 1 described earlier, basically, both units 112 and 1 incorporate the IEEE-1394-format interface composition identical to that is provided for the personal computer 113.

Concretely, in the case of the MD recorder/player 1 shown in FIG. 3 for example, a program is stored in a program ROM 28 to enable the system controller 11 to control the IEEE-1394-format interface 25.

2: Data communication via IEEE-1394 standard according to practical mode of the Invention 2-1: Summary Data communication conforming to the IEEE-1394 standard according to practical mode of the invention is briefly described below.

The IEEE-1394 format is prescribed as one of the standards of serial-data communication system. Data transmission system conforming to the IEEE-1394 format comprises the "isochronous" communication system which periodically executes communication and the other "asynchronous" communication system which asynchronously executes communication irrelevant to period. Generally, the isochronous communication system is applied to transmission and reception of data, whereas the asynchronous communication system is applied to transmission and reception of a variety of control commands. It is so arranged that data can be transmitted and received via a single cable by way of utilizing the above-referred two kinds of communication system.

As described earlier, according to the AV system 103 conforming to practical mode of the invention, it becomes practicable to transmit or receive a variety of user data including audio data (including compressed audio data) and auxiliary data accompanying audio data via the IEEE-1394-format data bus, where the auxiliary data comprises the picture files (i.e., the JPEG-format still picture data) and the text files.

The audio data comprises time-series data that should audibly be output in accordance with reproduction time axis, whereby real-time characteristic is demanded, and yet, data volume is greater than that of the auxiliary data. On the other hand, the auxiliary data contains such a data volume being less than that of the audio data. Although there is such a case in which the auxiliary data should be reproduced by way of being synchronous with reproduction of the audio data, real-time characteristic is not critically demanded for the auxiliary data unlike the audio data.

Accordingly, in the transmission and reception of the audio data and the auxiliary data via the IEEE-1394 interface and the data bus, practical form for embodying the invention thus prescribes that the audio data signal be transmitted and received by applying the above-referred "isochronous" communication system and all the auxiliary data signals be transmitted and received by applying the "asynchronous" communication system via the IEEE-1394-format interface and the data bus.

According to the practical form of the invention, it is also possible to discretely transmit the audio data signal and the auxiliary data signal via the IEEE-1394 interface. Further, it is also possible to apparently simultaneously transmit the audio data signal and the auxiliary data signal based on isochronous cycle by way of transmitting both the signals via a time-division multiplex communication system.

2-2: Transaction Rule

Figure 26:
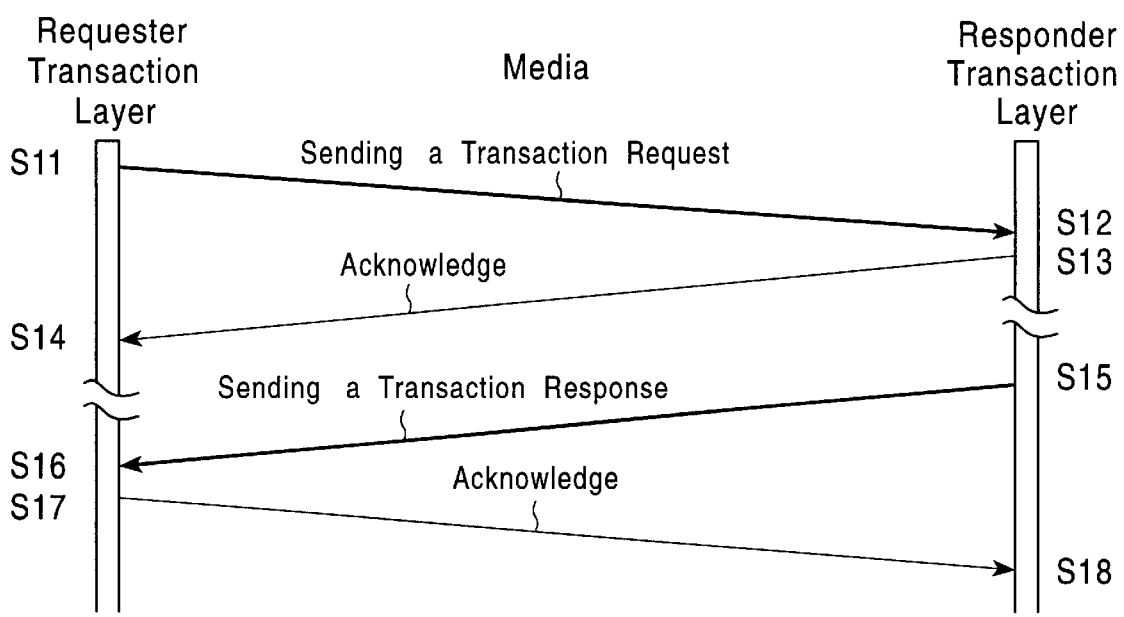
FIG. 26 is a process transition chart designating a basic transaction rule in the course of asynchronous communication.

A process transition chart shown in FIG. 26 specifies a basic transaction rule in the execution of the asynchronous communication. This transaction rule is prescribed by a FCP (Function Control Protocol).

In the utilization of the IEEE-1394 format, it is so arranged that the FCP can execute control of commands against a variety of AV equipments by way of utilizing control command prescribed as an AV/C Command "AV/C Digital Interface Command set".

As is shown-in FIG. 26, when step S11 is entered, a requester (transmitter) transmits a request signal to a responder (receiver). Next, step S12 is entered, in which the responder receives the request. In the next step S13, responder sends an acknowledge signal back to the requester. Upon receipt of the acknowledge signal, step S14 is entered, in which the transmitter identifies that the request has been received by the receiver.

Next, step S15 is entered, in which, in response to the request received in the course of step S12, the receiver transmits response to the transmitter. Next, step S16 is entered, in which the transmitter receives the response. Next, step S17 is entered, in which the transmitter transmits the acknowledge signal to the receiver in reply. Finally, upon receipt of the acknowledge signal, the receiver identifies that the response signal has been received by the transmitter.

Subject 3: Edit Window
3-1: Display Form

As is clear from the foregoing description, it is so defined that the MD recorder/player 1 conforming to a practical form of the invention can execute various editing operations against tracks recorded on the mini-disc by way of rewriting contents of the U-TOC.

In the case of the AV system 103 conforming to a practical form of the invention shown in FIG. 2, it is possible to compose the AV system 103 in order that a variety of operations pertaining to editing, recording, and reproduction of tracks can properly be executed via the personal computer 113, concretely, by means of remote control via the IEEE-1394-format data interface 25.

To realize this, an operation application software enabling control of the MD recorder/player 1 is installed in the personal computer 113. This application software enables various operations to be executed via GUI for example. In other words, a variety of operations can be executed via drag and drop operation and click operation with a mouse. Depending on pictures, characters can be input via keyboard operation. Next, in correspondence with an operation executed using a GUI of the above-referred operation application software, a relevant command is generated. Then, the command is transmitted to the MD recorder/player 1 via the IEEE-1394-format data bus 116 in accordance with the IEEE-1394 format.

The system controller 11 on the part of the MD recorder/player 1 executes a variety of control operations in response to the contents of the received command. For example, when a user executes operations needed for reproduction on the GUI of the operation application software, based on the processing operation of the CPU 201 built in the personal computer 113, a PLAY command is generated, and then the command is transmitted to the MD recorder/player 1. In response to the received command, the system controller 11 activates operations to control the MD recorder/player 1 to start playback of the disc 90, thus realizing remote control operation.

An example of the operation of application software for displaying a GUI picture when executing a remote-controlled operation and a remote-controlled editing operation is described below.

When the personal computer 113 executes the application software program, the CPU 201 built in the personal computer 113 demands transmission of the U-TOC and the P-TOC data from the MD recorder/player 1 to cause the TOC data sent from the MD recorder/player 1 to be retained in the RAM 203 for example. Next, by referring to the contents of the TOC data held in the RAM 203, the CPU 201 causes a MD control window shown in FIG. 27 to be displayed on the display monitor 208 for example.

A main bar area A1 is displayed at the upper portion of the MD control window WD1, in which a dozen of buttons BT1 through BT12 are disposed for example. These buttons individually function as operating keys needed for executing remote control operations on the MD recorder/player 1.

The POWER button BT1 executes ON/OFF operation of power source being fed to the MD recorder/player 1. The EJECT button BT2 ejects the mini-disc 90 from the MD recorder/player 1. The PLAYBACK button BT3 activates playback operation of the MD recorder/player 1. The PAUSE button BT4 provisionally halts recording and playback operations. The STOP button BT5 halts recording and playback operations. The REC button BT6 activates recording of the audio data signal.

The INDEX button BT7 detects initial position of a specific track out from the recorded audio data signal. The FF/RWD button BT8 executes fast-forwarding and fast-reversing of audio data signal for playback operation.

The SET-UP button BT9 sets up a variety of items needed for setting the MD recorder/player 1. For example, when the SET-UP button BT9 is operated, a set-up window (not shown in the drawing) is displayed independent of the above-referred MD control window WD1, and then, any of the required items can be set via operations in the set-up window.

The PLAY-MODE button BT10 sets playback mode of recorded audio data signal. For example, when the PLAY-MODE button BT10 is operated, play-mode-setting window (not shown in the drawing) is displayed, and then, the playback mode can be set via operations in the play-mode setting window. The playback mode includes repeated playback per tune, repeated playback of all tunes, program playback, and shuffle playback for reproducing any of track numbers based on random selection, for example.

The REPEAT button BT11 sets repeat-playback mode. For example, when the REPEAT button BT11 is operated, the repeat playback mode can be shifted via toggle per click operation by way of the sequence exemplified as for example.

When a click operation is executed on the LABEL button BT12, a label-forming window for making addable labels per track basis or per disc basis is displayed. For example, by utilizing the label-forming window, formation and editing of labels can be implemented.

Further, along with the buttons BT9 through BT12, text-file editing icon Ic1 and AUX-data viewer icon Ic2 are disposed.

Among those AUX-data recorded on a disc loaded in the MD recorder/player 1, the text file editing icon Ic1 is operated for editing text files. For example, when a click operation is executed on the text-file editing icon Ic1, although not illustrated, a text-file editing window is displayed independent of the MD control window WD1. Then, by executing an operation on the text-file editing window, editing process such as entry and rewriting of the text file relevant to a certain track presently being selected can be executed.

On the other hand, when a click operation is executed on the AUX-data viewer icon Ic2, the AUX-data viewer window is displayed independently of the MD control window WD1. Auxiliary data including the picture file and the text file pertaining to a certain track presently being selected or played back is displayed on the AUX-data viewer window.

A reproduction data area A2 is displayed in the main-bar area A1. A variety of data pertaining to the audio data track presently selected by the MD recorder/player 1 are rendered to the reproduction data area A2.

For example, in this case, actually selected track number and track title are displayed in the main-bar area A1. In addition, data on the playback time is also displayed. Further, a repeat-playback mode and a shuffle playback mode actually being set by the MD recorder/player 1 are also displayed in the main-bar area A1. The left-side area of the reproduction-data area A2 enables display of the auxiliary data including the picture file and the text file to be reproduced synchronous with the audio data signal being reproduced thereon.

While reproducing the audio data, along with progress of the reproducing process, the actual playback condition of the recorded track is displayed on the reproduction-data area A2. In this case, the actual level of the audio data signal under playback mode is indicated via the horizontal cell display meter. Time display is shifted along with progress of the playback mode.

Display contents of the above-referred reproduction-data area A2 and the track monitor area A10 (this will be described later on) are variable along with actual playback condition of the MD recorder/player 1. To realize this, while playing back audio data signal via the MD recorder/player 1, it is so arranged that data needed for indicating actual playback conditions can be transmitted to the personal computer 113 from the MD recorder/player 1 via the IEEE-1394-format data bus 116. After receiving data indicating actual playback conditions, by referring to the received data contents, and yet, by way of utilizing the TOC data held in the RAM 203 for example as required, in order that display contents in the reproduction area A2 can be shifted, the personal computer 113 executes a picture-drawing process, i.e., process for generating picture-image data for display.

Disc editing tab TB1 and track editing tab TB2 are respectively displayed below the left side of the main-bar area A1.

In the MD control window WD1, it is so arranged that picture indicating disc editing area and the other picture indicating track editing area A3 (this will be described later on) can be displayed against the lower portion of the main-bar area A1. When click operation is executed against the disc editing tab TB1, although not being illustrated, picture of the disc editing area is displayed. Editing operation per disc unit can be executed on the picture designating disc editing area. On the other hand, by executing click operation against the track editing tab TB2, track editing area A3 is displayed.

A variety of icons are displayed on the upper rank of the track-editing area A3, which include picture-file synchronization setting icon Ic11, text-file synchronization setting icon Ic12, A-B section erasing icon Ic13, and tack division icon Ic14.

The picture-file synchronization setting icon Ic11 sets such a mode for setting synchronization with audio data signal comprising a track. When click is operated against the picture-file synchronization setting icon Ic11, flag A16 designating synchronizing position of picture file is newly displayed in picture-sync. area A14 formed inside of track-monitor area A10 which will be described later on.

The text-file synchronization setting icon Ic12 sets such a mode for setting synchronization of text file with audio data signal comprising a track. When click is operated against the text-file synchronization setting icon Ic12, flag A16 designating synchronizing position of text file is newly designated in text-sync. area A15 inside of track monitor A10 which will also be described later on.

The A—B section erasing icon Ic13 is used for erasing part of audio data signal comprising a track. When click is operated against the A-B section erasing icon Ic13, an operating window for erasing A-B section is displayed. By executing operation against the operating window, erasure between two points A and B specified by a user can be executed.

The track division icon Ic14 is used for editing in order to control two tracks being divided into two parts from the original single track.

Actual condition of a specific track under playback mode is displayed in the track monitor area A10 inside of the track editing area A3.

Data reproduction time area A11 is displayed at the upper rank of the track monitor area A10. Data reproduction time is displayed on this area A11. It is so arranged that reproduction time proceeds in the horizontal direction from the left to the right.

Level meter A13 is displayed below the upper rank of the track monitor area A10. Actual level of audio data signal is indicated by vertical-directional bar of the level meter A13 during reproduction of audio data signal.

Picture-sync. area A14 and text-sync. area A15 are respectively shown below the portion at which the level meter A13 is displayed.

The picture-sync. area A14 displays synchronized reproduction timing of a picture file against the audio data signal, and in addition, synchronized reproduction timing is also set in this area. For example, as described earlier, by way of operating the picture-file synchronization setting icon Ic11, a novel flag A16 is displayed within the picture-sync. area A14, and, a vacant frame is displayed in the picture display area A18. Further, for example, by way of executing pasting via drag and drop operation after selecting a picture shown in a picture-pallet window not being illustrated, such a picture file corresponding to the novel flag A16 is set. Thenceforth, by executing drag and drop operation against the flag A16 along reproduction time axis, synchronization timing can optionally be set. Position (time) shown by the flag A16 designates the time at which an AUX-data file corresponding to the flag A16 is output.

Text-sync. area A15 displays synchronized reproduction time of a picture file against the audio data signal, and in addition, synchronized reproduction timing is also set in this area.

By way of operating the text-file synchronization setting icon Ic12, a novel flag A16 is displayed against the text-sync. area A15. Further, such a text synchronization point is displayed in correspondence with a text-editing window not being illustrated. By way of setting the text synchronization point on the text-editing window against an optional text portion, the optional text portion can be set as the text portion corresponding to the newly displayed flag A16. Like the above case, by way of executing drag and drop operation against the flag A16, optional synchronizing timing can be set.

Position (time) displayed by the flag A16 designates the time at which an AUX-data corresponding to the flag A16 is output.

Reproduction position designating bar A12 displayed as vertical-directional broken line in the track-monitor area A10 enables the track-editing area A3 to be shifted in the time direction (horizontal direction) in correspondence with the actual reproduction position.

For example, when reproducing track via the MD recorder/player 1, along with progress of reproduction time, the reproduction position designating bar A12 proceeds itself from the right to the left of the drawing. Simultaneously, along with movement of the reproduction position designating bar A12, the level meter A13 sequentially displays actual level of the reproduced data signal.

Scroll bar A17 scrolls display contents of the track-monitor area A10 along time-direction, i.e., in the horizontal direction.

Picture display area A18 is disposed below the track-monitor area A10. Picture files accompanying the actually selected track are displayed in a picture display area A18 in array by means of a so-called "thumb-nail" picture-image pct. It is so arranged that display contents of the picture display area A18 can be scrolled by operating scroll bar disposed to the right of this display area A18.

A variety of icons are disposed for display on the external left side of track-editing area A3 (or disc-editing area), which include the following: a picture pallet icon Ic3, an AUX-data reading icon Ic4, an undo icon Ic5, a move icon Ic6, a combine icon Ic7, a track erase icon Ic8, and a sync. point erase icon Ic9.

Picture-pallet icon Ic3 executes operation for calling picture pallet window for display.

The AUX-data reading icon Ic4 is operated when reading the AUX-data recorded on the MD disc 90 loaded in the MD recorder/player 1 into the personal computer 113. Operation for reading the AUX-data recorded on the mini disc 90 into the personal computer 113 will be described later on.

By operating the undo icon Ic5, any preceding operation which has just been executed can be cancelled.

The move icon Ic6, the combine icon Ic7, and the track erase icon Ic8, are respectively operated to edit tracks comprising audio data signal.

By operating the move icon Ic6, dialog box for shifting track is displayed. Track can be shifted by executing operation of the dialog box.

By operating the combine icon Ic7, dialog box for linking tracks is displayed. By operating the dialog box, such an edit operation for combining a plurality of linked tracks into a single track can be executed.

By operating the track erase icon 18, dialog box for erasing track is displayed. By operating the dialog box, designated track can be cancelled.

By operating the sync. point erase icon Ic9, it is possible to erase sync. point (the above-referred flag A16) in the picture sync. area A14 or in the text sync. area A15 within the track editing area A3.

It is possible for a user to optionally select sync. point (the flag A16) in the picture-sync. area A14 or in the text-sync. area 15 and then execute click operation against the sync. point erase icon Ic9. As a result, dialog box for erasing synchronizing point is displayed to enable the selected synchronizing point to be erased.

In actual practice, in such a case in which track editing area A3 is displayed via selection of the track editing tab TB2, in other words, when operating screen remains on display for editing a track unit, among those icons Ic3 through Ic9, the picture pallet icon Ic3, the undo icon Ic5, and the sync. point erase icon Ic9, are displayed.

On the other hand, in such a case in which disc editing area is displayed via selection of the disc editing tab TB1, in other words, when operating screen remains on display for editing whole contents recorded on the disc 90, among the above-referred icons Ic3 through Ic9, the picture pallet icon Ic3, the AUX-data reading icon Ic4, the undo icon Ic5, the move icon Ic6, the combine icon Ic7, and the track erase icon Ic8, are respectively displayed.

Figure 28:
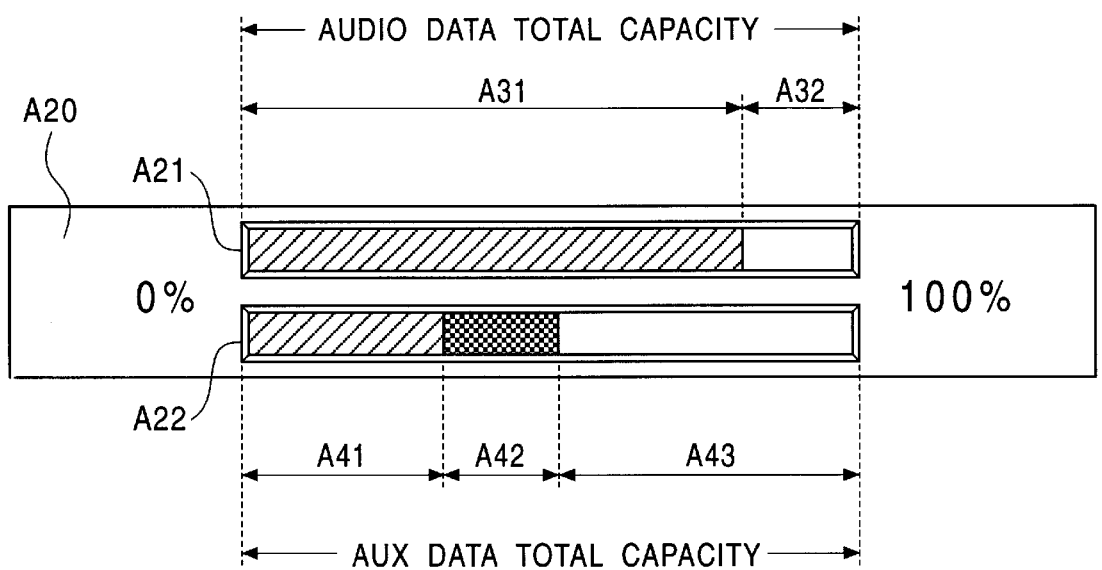
FIG. 28 is a chart exemplifying practical display mode of recording capacity display area.

Recording capacity display area A20 is disposed for display on the external lower side of the track editing area A3. The recording capacity display area A20 displays capacity of data recorded on a disc 90 loaded in the MD recorder/player 1 by way of the following:

FIG. 28 is an enlarged view of the recording capacity display area A20. As shown in FIG. 28, audio data area A21 is disposed in the recording capacity display area A20 for designating actual capacity pertaining to audio data signal. In addition, the AUX-data area A22 for designating actual data capacity pertaining to the auxiliary data is disposed below the audio-data area A21.

The audio-data area A21 and the AUX-data area A22 are respectively designated in the form of bar with a substantial horizontal-directional length.

In the audio-data area A21, it is so arranged that total horizontal-directional length of the bar-shaped display corresponds to total capacity of audio data signal that can be recorded on the disc 90. In actual practice, capacity complete with recording of audio data is designated by recorded capacity indicating bar A31 via predetermined coloring effect against bar-shaped audio-data area A21 for example. In this case, by way of enabling the recorded capacity indicating bar A31 to internally extend itself from the left end to the right inside of the bar-shaped audio-data area A21, actual capacity can be designated by the extended length.

The left side of the recorded capacity indicating bar A31 is marked with, whereas the right side is marked with. This in turn means that actual capacity shown by the recorded indicating bar A31 is represented by proportional rate (share) against total capacity for recording audio data signal.

Such a portion remaining unoccupied by the recorded capacity indicating bar A31 is designated as vacant capacity indicating bar A32, whereby designating vacant capacity via proportional rate against total capacity for recording audio data. In actual practice, the vacant capacity indicating bar A32 is displayed by such a color being different from that of the recorded capacity indicating bar A31.

The auxiliary data comprises picture files and text files. Accordingly, capacity complete with recording of picture files and the other capacity complete with recording of text files are respectively designated against the bar-shaped AUX-data area A22 by way of the following:

In FIG. 28, total length of the bar-shaped AUX-data area A22 corresponds to total capacity being capable of recording auxiliary data on the disc 90, i.e., total capacity of the AUX-data.

Picture-file recorded capacity indicating bar A41 is shown inside of the bar-shaped AUX-data area A22 by way of extending itself from the left end to the right. In succession to the end position at the right end of the picture-file recorded capacity indicating bar A41, text-file recorded capacity indicating bar A42 is designated. Such a portion remaining unoccupied inside of the AUX-data area A22 is represented as vacant capacity indicating bar A43. In actual practice, the picture-file recorded capacity indicating bar A41, the text-file recorded capacity indicating bar A42, and the vacant capacity indicating bar A43, are individually displayed in order that each of them can visually be distinguished via different colors.

Individual length of the picture-file recorded capacity indicating bar A41 and the text-file recorded capacity indicating bar A42 designates such a capacity complete with recording of the picture file and recording of the text file. The recorded capacity is commonly shown as the proportional rate against total capacity of the AUX-data.

In terms of the form of display in the AUX-data area A22, no problem can be generated even when the picture-file recorded capacity indicating bar A41 is disposed in the sequence inverse from the text-file recorded capacity indicating bar A42.

As described above, by enabling a user to watch the recording capacity area A21 shown in the MD control window WD1, a user can visually be aware of the capacity complete with recording of audio and auxiliary data on the disc 90 loaded in the MD recorder/player 1.

According to the mini-disc system conforming to the invention, the audio data signal and the auxiliary data signal including the picture file and the text file are recorded. As described by referring to FIG. 28, inasmuch as the capacity of audio data and auxiliary data can respectively be displayed by means of discrete bars in the recording-capacity area A21 pertaining to the invention, it becomes possible to more readily identify respective capacity of the audio and the auxiliary data signals.

Further, regarding the auxiliary data, inasmuch as the capacity of the picture file and the text file can be displayed via different bars, a user can visually identify the capacity of the picture file and the text file.

3-2: Reading of the AUX-data

Figure 27:
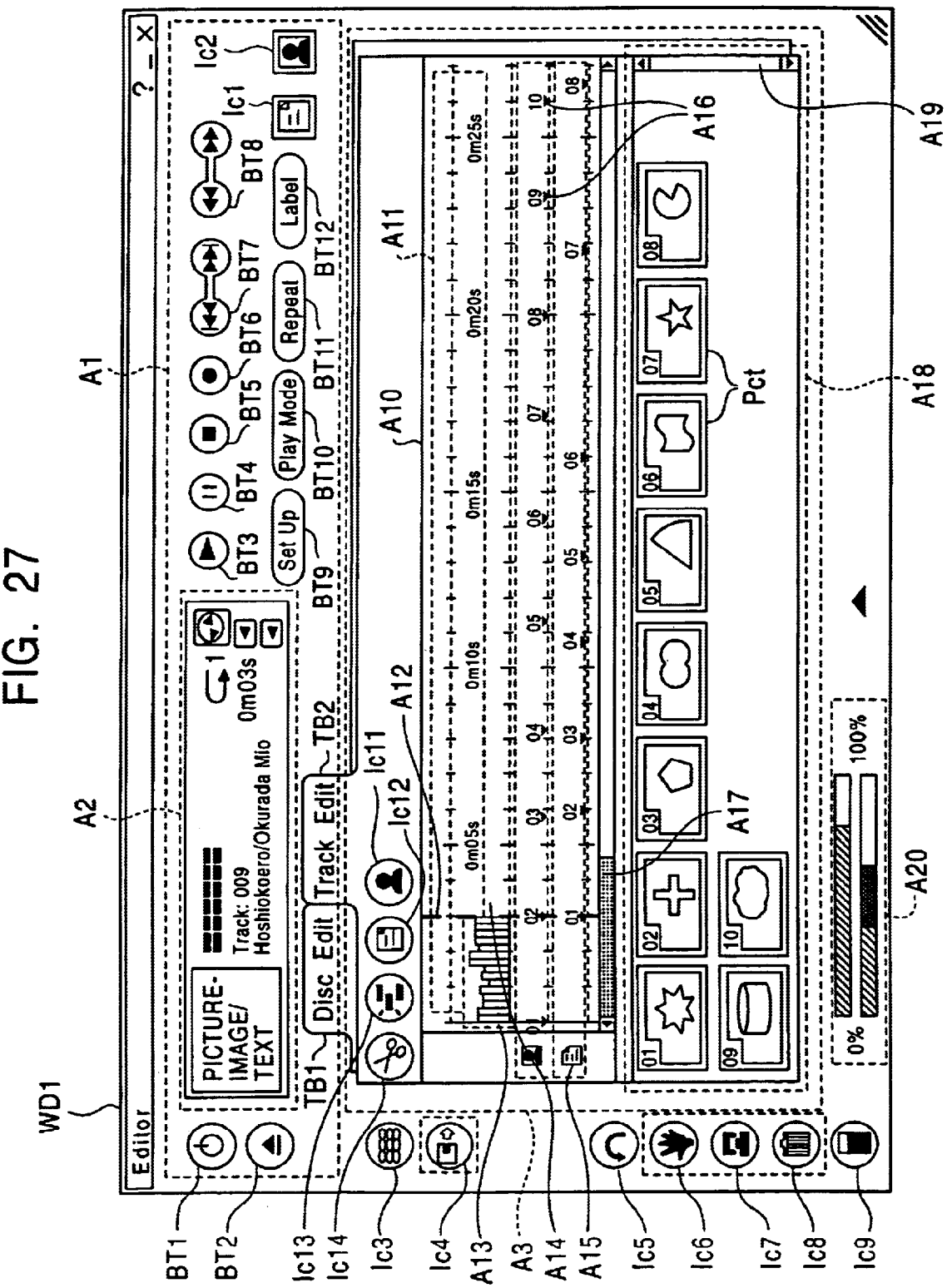
FIG. 27 is a concrete block diagram exemplifying practical display mode of a mini-disc™ (MD) control window.

As is clear from the above description, according to a practical form of the invention, by way of executing a predetermined operation on the MD control window WD1 described by referring to FIG. 27, it is possible to execute a variety of editing operations based on data recorded on the mini disc™ 90.

For example, as was described earlier by referring to FIG. 27, like the case of editing synchronized reproduction timing of a picture file synchronized with audio data signal by utilizing the picture-sync. area A14 and the case of editing synchronized reproduction timing of the text file against the audio data signal by utilizing the text sync. area A15, when executing an edit operation by way of dealing with the auxiliary data comprising the picture file and the text file, it is essential that the auxiliary data be previously secured in the personal computer 113.

For example, regarding picture file, such a picture file accompanied with a related track actually being selected is displayed in the picture display area A18 shown in FIG. 27 as "thumb-nail" picture-image. In this case, for example, availing of such a picture file stored in the RAM 203 or in the hard-disc loaded in the personal computer 113, the picture file is displayed on the picture display area A18.

According to practical form of the invention, in order to transmit the above-described auxiliary data from the mini-disc 90 loaded in the MD recorder/player 1 to the personal computer 113, click operation is executed against the AUX-data reading icon Ic4 inside of the MD control window WD1 previously being described by referring to FIG. 27.

Next, operation needed for selecting the AUX-data and relevant display on a display monitor 208 are described below.

Figure 29:
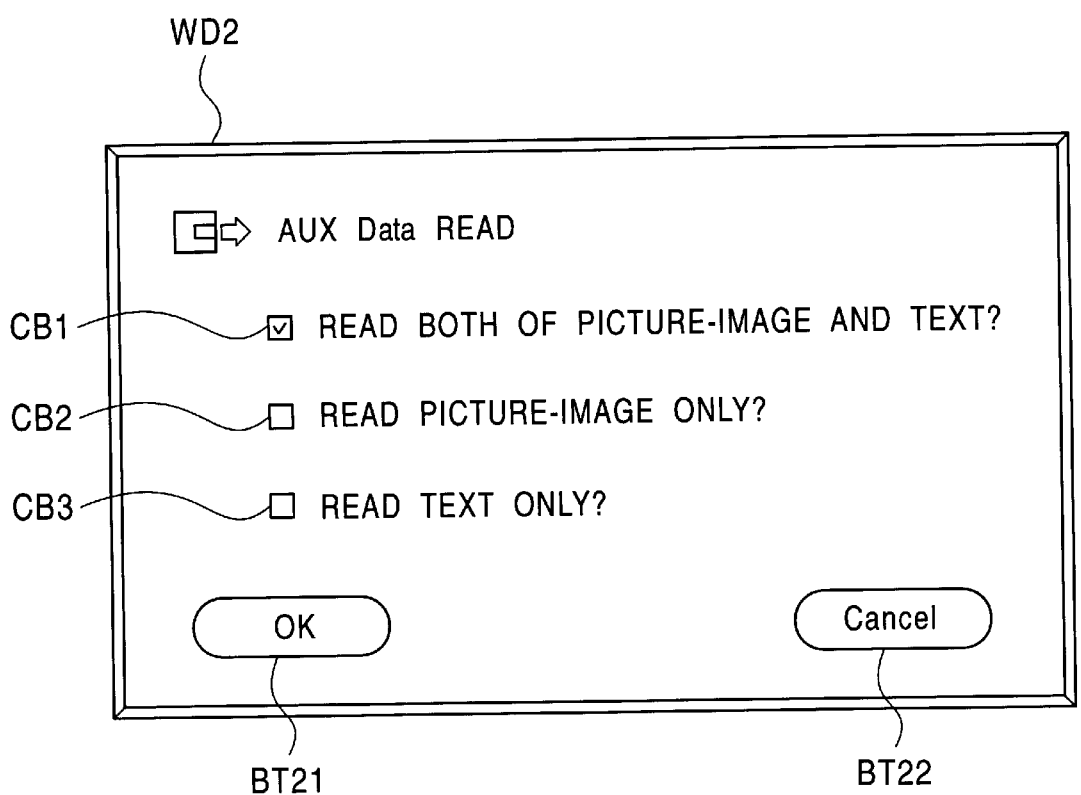
FIG. 29 is a chart exemplifying practical display mode of reading setting status designating window.

When click operation is executed against the AUX-data reading icon Ic4, reading-setting window WD2 is displayed as shown in FIG. 29. The window WD2 functions as a dialog box which determines the auxiliary data that should be read into the personal computer 113.

As dialog, the reading-setting window WD2 displays three choices including "Do you read both the picture-image and text?", or "Do you read picture-image alone?", or "Do you read text alone?". In correspondence with three choices, check boxes CB1, CB2, and CB3, are displayed. The terms "picture-image" designates the picture file, whereas the terms "text" designates the text file. In other words, a user can optionally select any of the above three dialogs to define to (1) read both the picture file and the text file; (2) read picture-file alone; or (3) read text-file alone.

A user can operate any of the check boxes CB1, CB2, and CB3 corresponding to an optional dialog among the three choices. When he operates OK button BT21, among the AUX-data group recorded on the disc 90 being loaded in the MD recorder/player 1, a specific file selected via operation of any of the check boxes CB1, CB2, and CB3 is transmitted to the personal computer 113.

In other words, when a user operates the check box CB1 corresponding to dialog "Do you read both the picture-image and the text?", and then both the picture files and the text file are simultaneously output from the MD recorder/player 1.

On the other hand, when a user operates the check box CB2 corresponding to dialog "Do you read the picture-image alone?", and then only the picture file is output from the MD recorder/player 1 except the text file.

On the other hand, when a user operates the check box CB3 corresponding to dialog "Do you read the text alone?", and then only the text file is output from the MD recorder/player 1 except the picture file.

Figure 30:
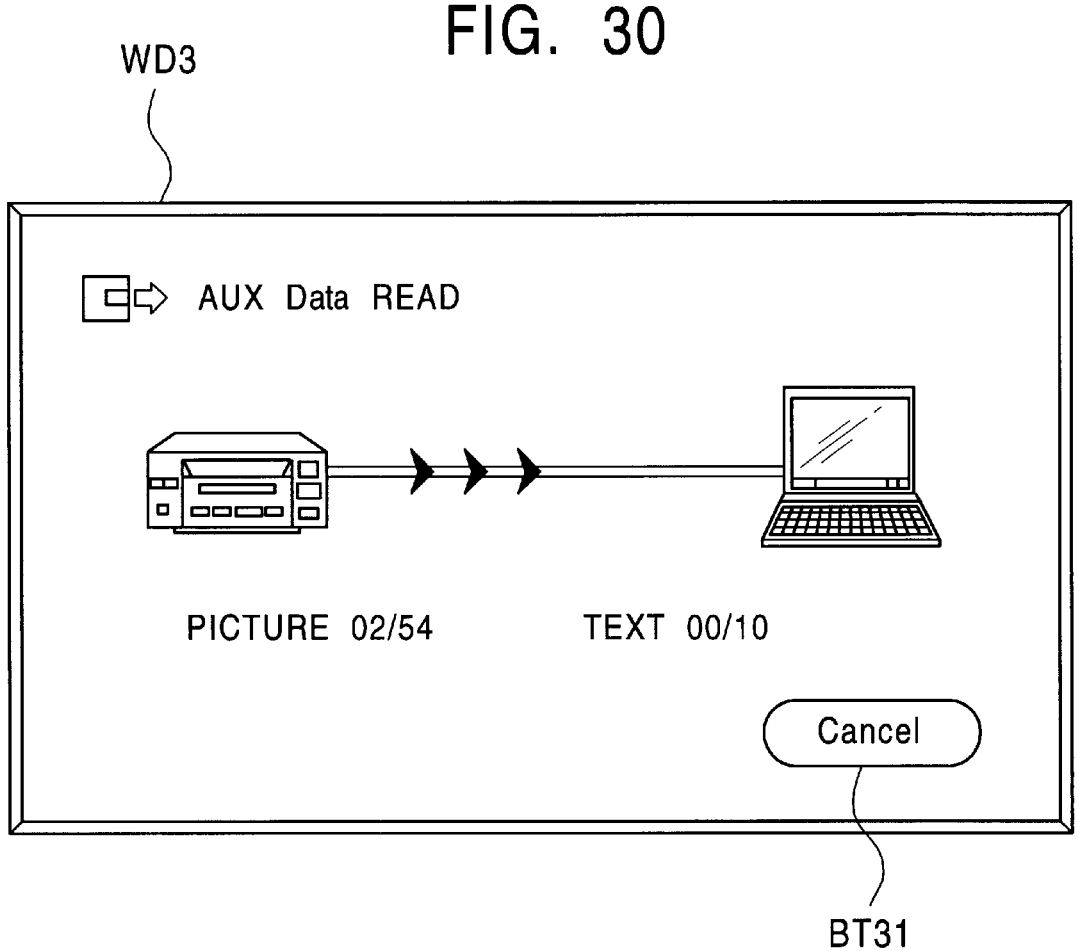
FIG. 30 is a chart exemplifying practical display mode of reading status designating window.

As described above, during the serial process in which the AUX-data is transmitted from the MD recorder/player 1 to the personal computer 113 and then the personal computer 113 writes the received AUX-data into the RAM 203 for example, as shown in FIG. 30, a reading status display window WD3 showing the state of reading the AUX-data is displayed. When this condition is entered, display of the reading-setting window WD2 shown in FIG. 29 is erased.

When a cancel button BT22 of the reading-setting window WD2 shown in FIG. 29 is operated, display of the reading-setting window WD2 is erased, whereby deleting transmission of the AUX-data.

The reading-status display window WD3 shown in FIG. 30 also displays the state in which the auxiliary data is on the way of transmission from the MD recorder/player 1 to the personal computer 113 by applying any pattern for example. Just below this display, there is another display for designating proceeding state of files delivered to the personal computer 113.

FIG. 30 exemplifies display designating picture image 02/54 and text 00/10. Of these, picture image 02/54 desisgnates such a condition in which a total of 54 picture files are recorded on the disc 90, whereas 2 of them are delivered to the personal computer 113. The other display denotes such a condition in which a total of 10 text files are recorded on the disc 90, whereas none of them is delivered to the personal computer 13.

Note that, when the cancel button BT31 displayed in the reading-status display window WD3 is operated, file-reading operation is brought to a halt.

Practical form of the invention enables a user to optionally select the kind of the AUX-data files that should be delivered to the personal computer 113.

Such a conventional case is exemplified in which, when drawing out the AUX-data, assuming that all kinds of the AUX-data comprising the picture file and the text file are fixedly set, even if a user desires to solely read the picture file, the text file is simultaneously read out. This in turn causes a longer time to be spent for reading files for example.

On the other hand, according to practical form of the invention, since a user can optionally and solely select the needed AUX-data, it is possible to contract time needed for reading file, i.e., time needed for transferring the AUX-data files.

3-3: Process Operation
3-33-1: Display of Recorded-capacity Display Area As described above, practical form of the invention features the following: Availing of the recorded capacity display area A20, the MD control window WD1 enables recorded capacity of the picture-files and the text-files of the audio-data and the AUX-data to be visually displayed. Further, the picture files and the text files per kind can optionally be selected in the course of reading the AUX-data into the personal computer 113.

Henceforth, process needed for the display of the recorded capacity display area A20 and process needed for realizing file-reading operation in response to operation for selecting files per kind are individually described below. Initially, process for the display of the recorded capacity display area A20 is described below.

Prior to the description of processing operation for the display of the recorded capacity display area A20, prerequisites are described below.

In order to display recorded capacity of picture files and text files of the audio data and the auxiliary data signals in the recorded capacity display area A20, it is necessary for the personal computer 113 to secure those data pertaining to the disc loaded in the MD recorder/player 1 including the following:

| | |
|---|---|
| (A) Audio-data recordable total capacity | a1 |
| (B) Audio-data recorded capacity | a2 |
| (C) AUX-data recordable total capacity | a3 |
| (D) Picture-file data recorded capacity | a4 |
| (E) Text-file data recorded capacity | a5 |

Note that, henceforth the above-referred data are integrally called "disc-capacity data".

In the practical form for embodying the invention, it is so arranged that the above-referred disc-capacity data is computed by the MD recorder/player 1 into a specific numerical value, which is transmitted on demand from the personal computer 113.

Next, method of computing the disc-capacity data is described below.

(A) Audio-data Recordable Total Capacity a1

The audio-data recordable capacity al designates "size" of such an area on which audio data can be recorded. This corresponds to the size of program area shown in FIG. 7(*b*).

For example, data of recordable user area starting address corresponding to read-out starting address and program-area starting address is recorded in the P-TOC sector 0 being recorded on the read-in portion of the disc 90.

Whenever computing the audio-data recordable total capacity al, by way of designating the read-out starting address=ALOS and the recordable user area starting address=ARUS, computation according to equation (1) is executed.

$$a1 = ALOS - ARUS \tag{1}$$

The computed value al represents the total number of addresses occupied by the program area. As was described earlier by referring to FIG. 5, inasmuch as addresses are designated per unit of cluster, sector, and sound-group, it is thus conceivable that total number of address can be dealt as data size per unit of cluster, sector, and sound-group.

When actually computing data size, it is suggested that data size per cluster, data size per sector, and data size per sound group, should respectively be multiplied by the number of cluster, the number of sector, and the number of sound group as the total number of addresses computed via the above equation (1) before summing up the grand total. The same method applies to the case of computing actual data size in regard to other capacities to be described henceforth.

It should be noted however that, in the practical form of the invention, inasmuch as the recorded capacity in the recorded capacity display area A20 is displayed by proportional rate against recordable capacity, it is suggested that proportional computation be executed by way of dealing the number of addresses as the data capacity as will be described later on.

(B) Audio-data Recorded Capacity a2

The audio-data recorded capacity a2 becomes total capacity of such a domain of program area on which data being controlled as recording data is recorded. By referring to parts tables of individual tracks shown in the pointer portion of the U-TOC sector 0 shown in FIG. 8, total number of addresses occupied by respective tracks is computed to sum up total number of addresses of respective tracks. In other words, total number of addresses of respective tracks is dealt as the audio-data recorded capacity a2.

In such a case in which recording is executed across a plurality of discrete parts, as was described by referring to FIG. 8 and FIG. 9, a plurality of parts tables are linked with each other via the linkage data, whereby designating recording area per track. In this case, by way of summing up total number of addresses per parts table by following up linkage data, total number of addresses per track can be counted.

(C) AUX-data Recordable Total Capacity a3

The AUX-data recordable total capacity a3 corresponds to total capacity of such a domain of the AUX-data area shown in FIG. 7(*b*) on which the AUX-data can actually be recorded. As of now, this is commonly recognized irrelevant to difference in terms of disc-recordable time.

As shown in FIG. 7(*b*), the AUX-data area comprises such a domain corresponding to 35 clusters. Inasmuch as a single cluster corresponds to 32 sectors, and yet, inasmuch as size of effective data per sector in the AUX-data corresponds to 2324 bytes, the AUX-data recordable total capacity a3 is expressed by equation (2) shown below.

$$a3 = 35 \times 32 \times 2324 \tag{2}$$

It is defined that the MD recorder/player 1 internally retains the AUX-data recordable total capacity a3. Note that, inasmuch as the AUX-data recordable total capacity value a3 designates actual data size, in the practical form of the invention, the MD recorder/player 1 converts the data-size value a3 into the number of addresses. It is thus defined that the AUX-data recordable total capacity a3 designated by the number of addresses is dealt as the disc-capacity data.

(D) Picture-file Data Recorded Capacity a4

Among the AUX-data in the AUX-data area, the picture-file data recorded capacity a4 is dealt as the capacity consumed by recording of the picture-file data.

By referring to the AUX-TOC sector 1 pertaining to picture allocation table shown in FIG. 14, the audio-data recorded capacity is computed. Based on this computation, the picture-file data recorded capacity can be calculated as well.

More particularly, by referring to parts tables of corresponding picture files shown by the pointer portion of the AUX-TOC sector 1, the total number of addresses occupied by individual picture files is computed, and then, the number of addresses occupied by individual picture files is added. In other words, the total number of addresses occupied by respective picture files is dealt as the audio-data recorded capacity a4.

As described earlier by referring to FIG. 14, it is prescribed for the picture-file data for the present that a single file should not be recorded on a plurality of physically discrete parts. Accordingly, unlike the case of the U-TOC sector 0, in order to seek total amount of addresses per file, such a process for adding up total number of addresses of individual parts tables by way of following up linkage data is not executed.

(E) Text-file Data Recorded Capacity a5

Among the AUX-data in the AUX-data area, the text-file recorded capacity a5 is defined as the capacity of the text-file data.

By referring to the AUX-TOC sector 4 pertaining to the text allocation table shown in FIG. 17, the audio-data recorded capacity is computed. Based on this computation, the text-file data recorded capacity a5 can be calculated as well.

More particularly, by referring to parts tables of individual text files shown in the pointer portion of the AUX-TOC sector 4, total number of addresses is computed, and then, total number of addresses occupied by respective text files is added. In other words, total number of addresses occupied by individual text files is dealt as the audio-data recorded capacity a5.

It is also prescribed for the text-file data that a single file should be recorded as is shown in FIG. 24 for the present without being recorded on a plurality of physically discrete parts. Accordingly, in order to seek total amount of addresses per file, even in this case, such a process for adding total number of addresses of individual parts table by way of following up linkage data is not executed.

The above-referred five kinds of disc-capacity data can be sought by way of implementing the above processes. The disc-capacity data can be computed by way of the following: Initially, the TOC (table of contents) data comprising the P-TOC data, the U-TOC data, and the AUX-TOC data, are read out of a mini-disc 90 loaded in the MD recorder/player 1. The read-out data is then stored in the buffer memory 13. Next, by way of referring to the needed data from the TOC data stored in the buffer memory 13, the disc capacity data is computed by the system controller 11. Next, computed disc capacity data is retained in the work RAM 29 or in the buffer memory 13 for example. Finally, as described earlier, whenever transmission of the disc capacity data is demanded by the personal computer 113, the disc capacity data is delivered to the personal computer 113.

Based on the description pertaining to the above-referred disc-capacity data, operation for the display of the recorded-capacity is described below.

When the personal computer 113 receives the disc-capacity data from the MD recorder/player 1, the personal computer communicates with the MD recorder/player 1 via the IEEE-1394 data bus 116. Inasmuch as this communication is executed via transmission and reception of command and response, communication is asynchronously executed.

Figure 31:
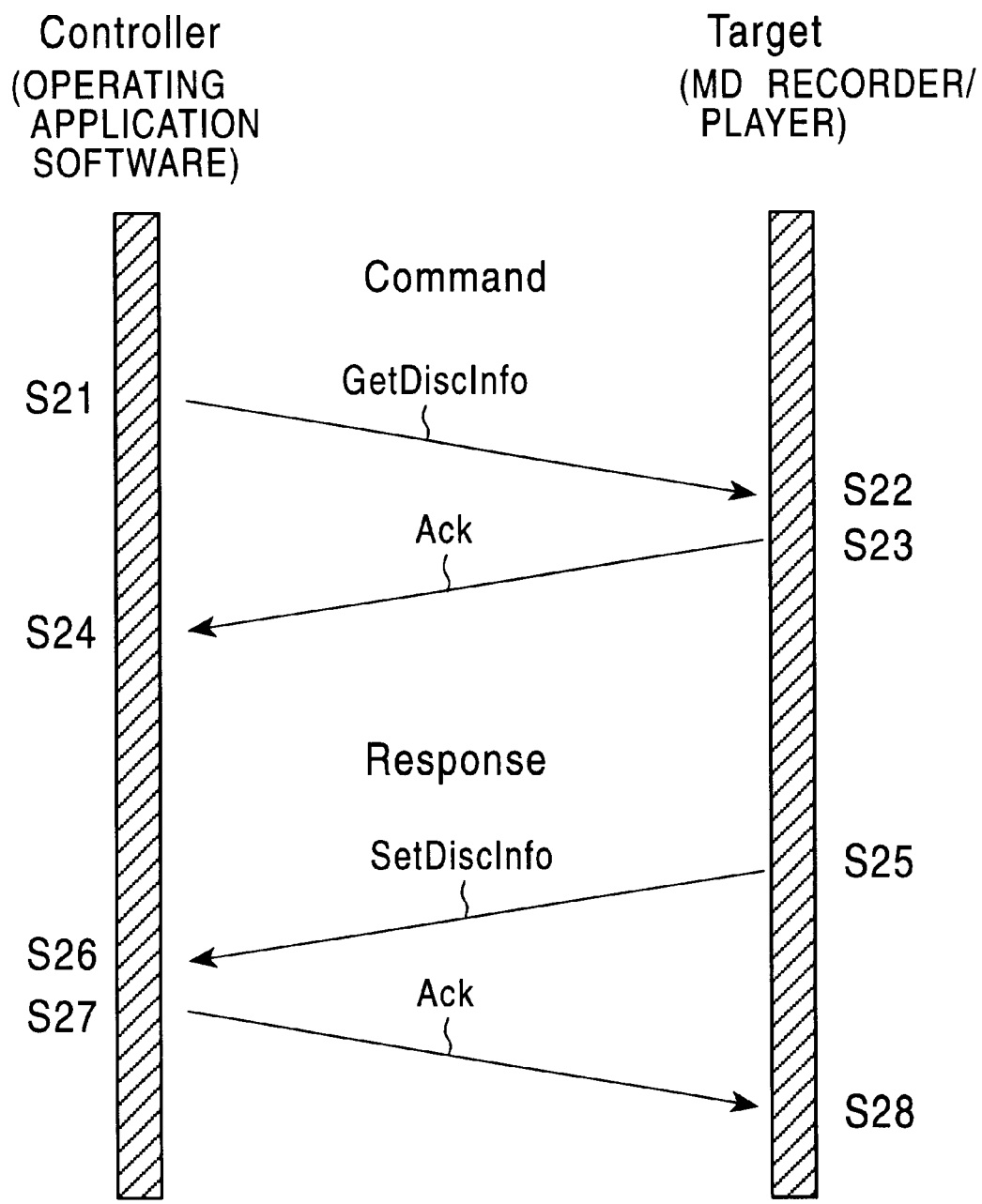
FIG. 31 is a process transition chart designating transaction between an MD recorder/player when a personal computer acquires the DiscInfo.

FIG. 31 designates sequence of transaction between the personal computer 113 and the MD recorder/player 1 in the course of acquiring the disc-capacity data. Transaction shown in FIG. 31 is executed in conformity with the transaction rule prescribed for the asynchronous communication shown in FIG. 26.

The IEEE-1394 format defines the transmitter party as the controller and the receiver party (being subject to control) as target. However, according to this embodiment of the invention, the requester (transmitter) is defined as the controller, whereas the responder (receiver) is defined as the target.

In this case, MD-operating application software being activated on the part of the personal computer 113 is defined as the controller, whereas the MD recorder/player 1 is defined as the target. Henceforth, description by referring to FIG. 31 refers to the MD-operating application software as the controller, whereas the MD recorder/player 1 is referred to as the target.

In order to deal with the AV system according to the practical form of the invention, it is assumed that use of "Getdiscinfo" is defined as the AV/C command transmissible via the IEEE-1394 data format. The command "Getdiscinfo" is needed for requesting "Discinfo" comprising such a data pertaining to the disc needed for initially displaying the MD control window WD1 for example. It is also defined that the data "Discinfo" comprises the five disc-capacity data described earlier.

For example, in the event that display of the MD control window WD 1 needs to be activated initially by way of activating the MD operating application software, operating step S21 is entered to enable the controller to transmit the "Getdiscinfo" command. Next, step S22 is entered, in which the target receives the command "Getdiscinfo". Then, step S23 is entered, in which the target sends back the "acknowledge" signal to the controller. When the controller receives the "acknowledge" signal, the controller identifies that the target receives the command.

Thenceforth, the target party fabricates data contents ruled as "Discinfo" by way of including the above-described disc-capacity data as well.

Next, step S25 is entered, in which the target party transmits the prepared "Discinfo". In other words, the target party transmits "Setdiscinfo" in response to the command "Getdiscinfo".

Next, step S26 is entered, in which the controller receives the response. In the ensuing step S27, in reply to the received response, the controller transmits "acknowledge" signal to the target party. Upon receipt of the "acknowledge" signal, the target party identifies that the response has been received by the controller.

Figure 32:
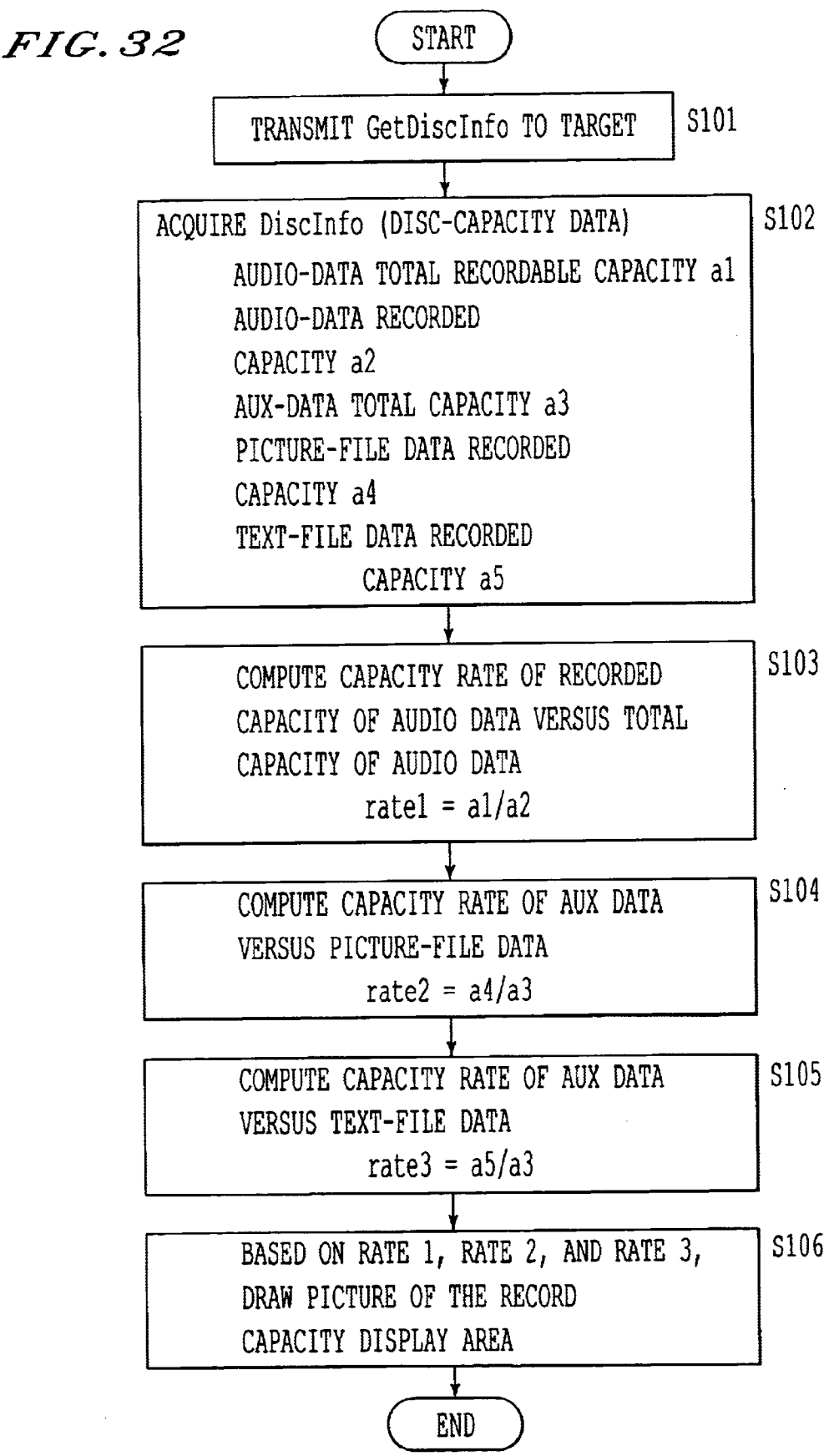
FIG. 32 is a flowchart designating processing operation for displaying recording-capacity display area.

Referring now to FIG. 32, process operation needed for displaying the recorded-capacity display area A20 executed by the personal computer 113 is described below.

It is defined that the process operation shown in FIG. 32 is executed by the CPU 201 based on program of the operating application software. In actual process operation, display is executed by way of generating whole picture-image data of the MD control window WD1. However, for explanatory convenience, the description solely refers to picture-drawing process (i.e., generation of the picture-image data) for displaying the recorded-capacity display area A20 inside of the MD control window WD1.

The picture-drawing process is initiated via step S101 by causing the personal computer 113 to transmit the command "Getdiscinfo" to the target party, i.e., to the MD recorder/player 1. This process corresponds to step S21 shown in FIG. 31.

In response to the process step S101, the MD recorder/player 1 transmits the data contents "Discinfo" to the personal computer 113. Simultaneous with the receipt of data contents "Discinfo", step S102 is entered, in which the personal computer 113 secures the data contents "Discinfo" including disc-capacity data comprising "the audio-data recordable total capacity a1", "the audio-data recorded capacity a2", "the AUX-data recordable total capacity a3", "the picture-file recorded capacity a4", and "the text-file recorded capacity a5", as shown in FIG. 32 via step S102.

In the recorded capacity display area A20 described by referring to FIG. 28, audio data is designated by proportional display of the recorded capacity against the audio-data recordable total capacity. On the other hand, the AUX-data is designated by proportional display of the capacity complete with recording of data comprising the picture-file data and the text-file data against the AUX-data recordable total capacity.

It is so arranged that, in order to realize proportional display described above, the share of the recorded capacity against the recordable total capacity is computed in relation to the audio data and the auxiliary data by executing processes beyond step S103.

When step S103 is entered, actual share of the recorded capacity against the audio-data recordable total capacity is computed. In order to compute the share of the recorded capacity, among the five disc-capacity data, availing of the audio-data recordable total capacity a1 and the audio-data record-completed capacity a2, the share (rate 1) is computed by applying equation (3) shown below.

$$\text{rate } 1 = a1/a2 \tag{3}$$

When the ensuing step S104 is entered, in order to compute actual share of the picture-file-data recorded capacity against the AUX-data recordable total capacity, availing of the AUX-data recordable total capacity a3 and the picture-file-data recorded capacity a4, the share (rate 2) is computed by applying equation (4) shown below.

$$\text{rate } 2 = a4/a3 \quad (4)$$

When the ensuing step S105 is entered, in order to compute actual share of the text-file-data recorded capacity against the AUX-data recordable total capacity, availing of the AUX-data recordable total capacity a3 and the text-file-data recordted capacity a5, the share (rate 3) is computed by applying equation (5) shown below.

$$\text{rate } 3 = a5/a3 \quad (5)$$

Shares "rate 1", "rate 2", and "rate 3" identified by the above computing processes are respectively stored in the RAM 203 for example.

When the ensuing step S106 is entered, availing of the values of the shares "rate 1", "rate 2", and "rate 3", process needed for generation of display picture-image data on the recorded-capacity display area A20 inside of the MD control window WD1 is executed.

Next, referring to the share "rate 1" pertaining to audio data capacity, assuming that length of the audio-data area A21 in the recorded capacity display area A20 is "1", the length "1" corresponds to the length of the recorded capacity indicating bar A31. Accordingly, after determining actual length of the recorded capacity indicating bar A31 by referring to the value of the share "rate 1", by way of generating picture-image portion in the audio-data area A21 via drawing, actual capacity in the audio-data area A21 reflected by the share "rate 1" can be displayed.

The same applies to the case of the AUX-data by way of determining respective length of the picture-file recorded capacity indicating bar A41 and the text-file recorded capacity indicating bar A42 by referring to the values of the shares "rate 2" and "rate 3" before eventually drawing picture-image of the above-referred bars in the audio-data area A21.

3-3-2: Selection of Read File

Next, process for realizing file-reading operation in response to the selective operation between the picture file and the text file of the AUX-data described earlier by referring to FIG. 29 and FIG. 30 is described below.

Figure 33:
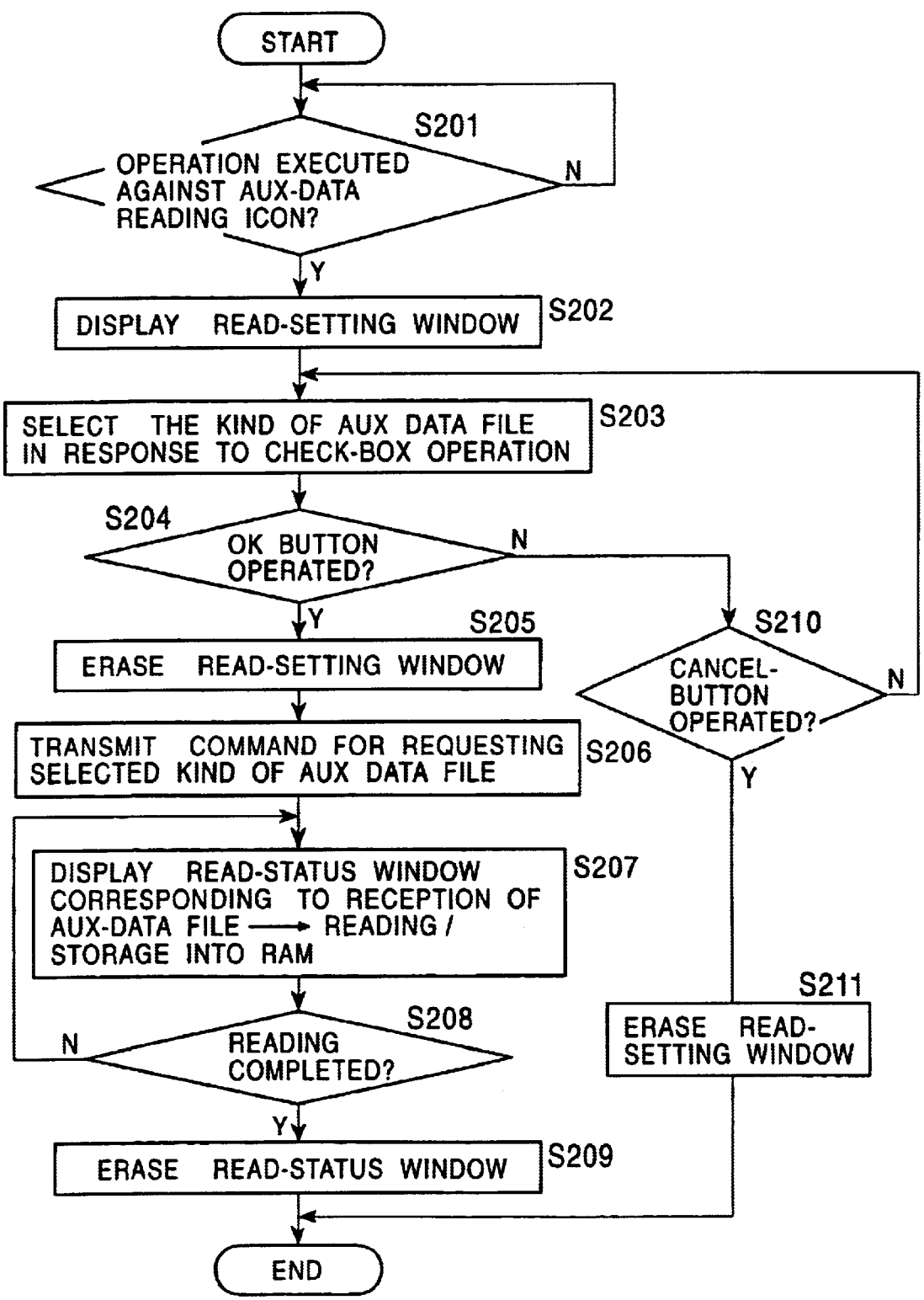
FIG. 33 is a flowchart designating processing operation on the part of the personal computer for reading the AUX-data.
Figure 34:
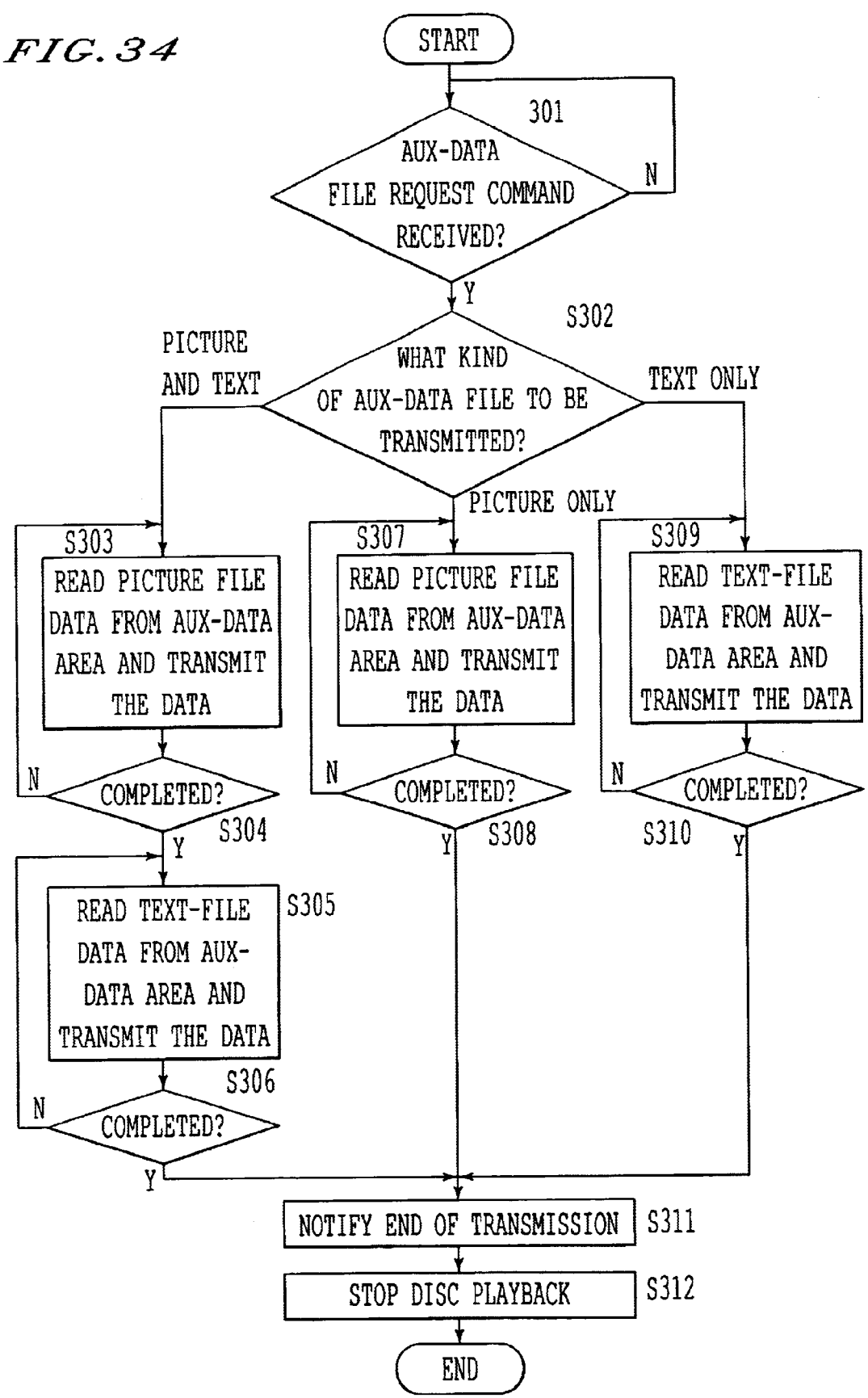
FIG. 34 is a flowchart designating processing operation on the part of the MD recorder/player in response to request for transmitting the AUX-data from the personal computer.

Flowcharts shown in FIG. 33 and FIG. 34 respectively describe processes on the part of the personal computer 113 and processes on the part of the MD recorder/player 1 in the course of reading the AUX-data. Processes described in FIG. 33 are executed by the CPU 201 in accordance with program of application software. On the other hand, processes shown in FIG. 34 are executed by the system controller 11 built in the MD recorder/player 1.

When executing processes shown in FIG. 33, while the MD control window WD1 remains being displayed, standby mode goes on while awaiting click operation against the AUX-data reading icon Ic4. When execution of click operation against the AUX-data reading icon Ic4 is identified, step S202 is entered, in which display of the reading-mode setting window WD2 shown in FIG. 29 is executed.

When the ensuing step S203 is entered, depending on the operation to be executed against any of the check boxes CB1, CB2, and CB3 displayed in the reading-mode setting window WD-2, in other words, in response to selective operation needed for combining files to be read, selection per file subject to reading is internally executed. Simultaneously, in correspondence with operation against any of the check boxes CB1, CB2, and CB3, picture-drawing process needed for the display and erasure of check mark in the relevant check box is executed as well.

When the ensuing step S204 is entered, it is identified whether operation against the OK button BT21 displayed on the reading-mode setting window WD2 is executed or not. If the answer is negative, then, step S210 is entered to identify whether the cancel button BT22 is operated or not.

If it is identified that the cancel button BT22 has been operated, then, step S211 is entered to erase display of the reading-mode setting window WD2 to be through with the routine processes. Conversely, if it is identified that the cancel button BT22 is not operated, the routine is brought back to step S203.

Next, step S204 is entered, in which if it is identified that the OK button BT21 is operated, step S205 is entered to erase display of the reading-mode setting window WD2.

Next, step S206 is entered, in which the personal computer 113 transmits a command for requesting a specific AUX-data file selected via step S203 to the MD recorder/player 1 via the IEEE-1394 data bus 116. Concretely, in such a case in which both the picture file and the text file are selected as reading file via the operation against the reading-mode setting window WD2, the personal computer 113 transmits such a command for requesting transmission of data solely comprising the picture file. Conversely, in the case in which text file is solely selected, the personal computer 113 transmits such a command for requesting transmission of data solely comprising the text file.

In this case, the personal computer 113 asynchronously communicates with the MD recorder/player 1. Concretely, in conformity with the transaction rule specified in FIG. 26, communication is executed via the form in which the personal computer 113 functions as the controller (requester) and the MD recorder/player 1 as the target party (responder).

Upon receipt of the command transmitted via the process pertaining to the above-referred step S206, as will be described later on by referring to FIG. 34, the MD recorder/player 1 transmits such an AUX-data corresponding to the kind specified by the received command.

On the other hand, the personal computer 113 receives the transmitted AUX-data file and then writes the received AUX-data file into the RAM 203 for storage.

In this case, it is defined that, in correspondence with data-file reception status, such a process is also executed, which draws picture-image and displays the drawn picture image for the reading-condition display window WD3 described by referring to FIG. 30.

Reception and reading of the AUX-data being processed via step S207 are continuously executed until the end of data-reading, in other words, until it is identified that all the data files subject to reading have been written into the RAM 203. In this case, it is defined that an advising information notifying completion of the data-file transmission from the MD recorder/player 1 is also transmitted to the personal computer 113. When identifying completion of the data-reading via the above-referred step S208, on receipt of the advising information for notifying completion of data transmission, the CPU 201 identifies that receivable data file will no longer be transmitted thereto. Simultaneous with completion of the writing of the finally transmitted data file into the RAM 203, the CPU 201 secures affirmative result via step S208.

It is defined that, at the moment at which affirmative result is secured via step S208, all kinds of AUX-data files selected by a user is already read into the personal computer 113. Next, step S209 is entered, in which display contents of the reading-condition display window WD are turned OFF to terminate execution of the routine processes.

FIG. 34 designates operation of the MD recorder/player 1 executed for transmitting AUX-data file in response to the received command requesting for the AUX-data transmitted from the personal computer 113.

To implement the process shown above, in the initial step S301, standby mode remains until receiving the command requesting for transmission of the AUX-data file transmitted via step S206 shown in FIG. 33. After receiving the command, process mode proceeds to step S302.

While step S302 is processed, by referring to the contents of received command, the kind of AUX-data file subject to transmission is identified. If the command request for transmission of both the picture file and the text file, process mode proceeds to step S303.

While step S303 is processed, playback operation is executed via the mini disc 90 loaded in the MD recorder/player 1. First, the picture-file data are sequentially read out of the AUX-data area, and then control process needed for transmitting the picture-file data to the personal computer 113 via the IEEE-1394 data bus 116 is executed.

For example, the system controller 11 of the MD recorder/player 1 refers to the AUX-TOC sector 0 (i.e., area-allocation table) and the AUX-TOC sector 1 (i.e., picture-allocation table) and then sequentially accesses the picture-file data in the AUX-data area to read them, whereby realizing the processes shown in step S303.

The above process is continuously executed in step S303 until being identified in step S304 that all the picture-file data in the AUX-data area are read out.

Simultaneous with completion of the reading of all the picture-file data, process mode proceeds to step S305.

While step S305 is processed, text data files are sequentially read out of the AUX-data area, and then, the system controller 11 executes control operation needed for transmitting the text-file data to the personal computer 113 via the IEEE-1394 data bus 116.

While executing the above process, the system controller 11 refers to the AUX-TOC sector 0 (i.e., area-allocation table) and the AUX-TOC sector 4 (i.e., text-allocation table) and then sequentially accesses the text-file data in the AUX-data area to read them, whereby realizing the process shown in step S305.

The process specified in step S305 is continuously executed until the system controller 11 identifies via the following step S306 that the reading of all the text-file data in the AUX-data area out from the disc 90 and transmission of all the text-file data to the personal computer 113 are completed. When affirmative result is secured via step S306, process mode proceeds to step S311.

While step S302 is processed, if the command requests for transmission of the picture-file data alone among the AUX data files that should be subject to transmission, process mode then proceeds to step S307.

Process routine of step S307 is substantially similar to that is described earlier by referring to step S303, and thus, description is deleted. In the ensuing step S308, the system controller 11 identifies whether reading of all the picture-file data recorded on the AUX-data area and transmission of the read-out picture-file data to the personal computer 113 are respectively completed or not. While negative answer remains, processes specified in step S307 are repeated. When affirmative answer is secured, process mode proceeds to step S311.

While step S302 is processed, if the kind of the AUX-data to be subject to transmission corresponds to the text file solely needed for transmission, process mode proceeds to step S309.

Since processes in the course of executing steps S309 and S310 are similar to that is described earlier in relation to steps S305 and S306, description is deleted. If no affirmative result are generated in the course of executing step S310, process mode proceeds to step S311.

While step S311 is processed, such a communication process is executed, which notifies completion of the transmission of specific AUX-data file demanded against the personal computer 113. This communication process is also executed via the IEEE-1394 data bus 116 asynchronously.

When the ensuing step S312 is entered, playback of the disc 90 is brought to a halt to terminate the routine process.

While executing the above-referred processes, it is so arranged that the data file to be subject to transmission is read out of the disc 90 in the course of externally transmitting the AUX-data file. For example, it is also possible to compose such a system which reads a specific AUX-data file corresponding to the kind requiring transmission out from the AUX-data files retained in the buffer memory 13 without reading data out from the disc. This system applies to such a case in which the buffer memory 13 of the MD recorder/player 1 contains substantial capacity, and yet, all the files recorded on the AUX-data area can be read out and stored in the buffer memory 13. When introducing this system, reading data from the disc 90 can be dispensed with, and thus, it is possible to contract time needed for the transmission of the AUX-data file.

It should be understood that the mode for displaying GUI picture as an operating application software is not solely limited to those which are shown in FIG. 27, FIG. 28, and FIG. 29. In particular, in terms of the form for displaying the recorded-capacity display area A20, it is permissible to provide such a form enabling a user to visually identify the recorded capacity of audio data and recorded capacity per kind of the AUX-data. Applicable form is not solely defined to be the one shown in FIG. 28. For example, it is conceivable to arrange the bar display in the vertical direction. It is also conceivable to provide a circle to express a total capacity for recording to enable decremental recording capacity to be expressed by fan-out image in the circle. Further, it is not always necessary to effect display by means of proportional rate of the recorded capacity against the total recording capacity. For example, depending on cases, it is also conceivable to numerically designate data size. However, it is true that the method of displaying the recorded-capacity display area A20 by means of proportional rate of the recorded amount against total recording capacity is better identifiable from the viewpoint of visual sense and perception.

The above description pertaining to practical form for embodying the invention has exemplified display of the recorded disc capacity by means of the recorded-capacity display area A20 on the GUI screen functioning as operating application software on the part of the personal computer 113. It should be understood that the scope of the invention is not solely limited to this method, but the scope of the invention also includes execution of a display of the recorded capacity of relevant data based on the actual display mode of the recorded-capacity display area A20 on the display provided for the MD recorder/player 1. In this case, even when the personal computer 113 is not assumedly provided with such a device for remotely controlling the MD recorder/player 1, it is possible for the MD recorder/player 1 to identify an actual amount of individual data recorded on the mini-disc 90 by itself.

The above description has referred to the MD recorder/player 1 as the one solely being subject to remote control of the personal computer 113. It should also be understood that the invention is also applicable to such a drive system capable of dealing with a specific recording medium which contains main data comprising the audio data and other auxiliary data being recorded thereon and also contains control data needed for controlling recording and playback of the audio data and the auxiliary data.

The invention does not solely specify the kind of usable data processor for controlling an objective data reproduction apparatus within the scope of a personal computer. For example, it is also conceivable to remotely control the MD recorder/player 1 by way of providing any of those AV equipment including IRD (Integrated Receiver Decoder) with specific function like the operating application software for example.

In the above-described practical form of the invention, it is so defined that communication between the data reproduction apparatus and the corresponding data processor is executed via the IEEE-1394 format data bus. However, the scope of the communication format is not solely limited to the IEEE-1394 format, but the communication format may also be replaced with any corresponding format such as RS232C-format for example.

As has thus been described in detail, when implementing the invention, in such a data-communication system comprising a data-reproduction apparatus compatible with a recording medium containing the main data (comprising the audio data) and the auxiliary data (the AUX-data) respectively being controlled by control data or in such a data-communication system comprising the above data reproduction apparatus being connected to a data processor by way of enabling them to communicate with each other, it is so arranged that the recorded consumed capacity of the main data and the auxiliary data can individually be displayed for visual inspection.

Enabling a user to visually inspect not only the capacity actually consumed by main audio data, but also the capacity actually consumed by auxiliary data, promotes increased user utility.

Further, in the data communication system comprising a data reproduction apparatus and a data processor, when it is so arranged that the recorded capacity can externally be displayed on the part of the data processor, it is possible to externally display the recorded data capacity as part of operational picture-image in the case of executing operation of the data reproduction apparatus by utilizing the data processor for example, and thus, this will also promote utility for a user while operating the system by watching the operational picture-image.

In order to display the consumed capacity of recorded main data, display is executed in order that proportional rate (share) of the recorded capacity against the recordable capacity for the main data can be displayed, and yet, by way of simultaneously displaying the proportional rate (share) of the recorded capacity against the recordable capacity for the auxiliary data, a user can more readily be aware of the recorded capacity against vacant capacity via visual comparison.

Further, in such a case in which a plurality of different kinds of data files of auxiliary data comprising picture-image files and text files are present, by way of displaying recording capacity so that recorded capacity per kind can be designated, a user can identify the recorded capacity for auxiliary data per kind of file, thus securing easiness to identify the actually recorded amount and operational convenience.

In the invention pertaining to a data communication system in particular, in the case in which prescription rules that a plurality of different kinds of data files are present in the auxiliary data recorded on a recording medium such as the picture-image file and the text file for example, it is so arranged that the data processor can select the kind of auxiliary data file transmitted from the data reproduction apparatus.

Based on this arrangement, when delivering the auxiliary data file to the data processor, it is possible to select such a specific kind of data file compatible with the need on the part of a user. This in turn promotes utility in the operation to fetch the auxiliary data. Further, in contrast with the case in which all kinds of the auxiliary data are fixedly delivered to the data processor, when selecting a specific kind of data file from plural kinds of data files, communication time needed for delivering the relevant data file to the data processor can be saved to help reduce mental annoyance of a user.

What is claimed is:

1. A data recording and/or reproducing apparatus for recording and/or reproducing main data and auxiliary data to and/or from a recording medium, wherein said main data includes at least a single audio program and main data control information which controls recording, reproducing, or an editing operation pertaining to said single program; and said auxiliary data includes at least a picture image data file and a text data file being independent of said program included in said main data, and auxiliary data control information which controls recording, reproducing or editing operation pertaining to said picture image data file and the text data file, said data recording and/or reproduction apparatus comprising:
　a first capacity computing means for computing a main data recorded capacity substantially being a capacity of said main data recorded on said recording medium based on said main data control information;
　a second capacity computing means for computing an auxiliary data recorded capacity substantially being a capacity of the auxiliary data recorded on said recording medium based on said auxiliary data control information; and
　a display means for discernibly displaying said main data recorded capacity and said auxiliary data recorded capacity in accordance with a predetermined display format which separately indicates a recorded capacity of said picture image data file and the text data file as said auxiliary data recorded capacity based on said main data recorded capacity computed via said first capacity computing means and said auxiliary data recorded capacity computed via said second capacity computing means.

2. The data recording and/or reproduction apparatus set forth in claim 1, further comprising:
　a third capacity computing means for computing, based on said main data control information, computes a main data recordable capacity on said recording medium; and
　said display means discernibly displays an actual share of said main data recorded capacity against said main data recordable capacity based on said main data recorded capacity computed via said first capacity computing means and also based on said main data recorded capacity computed via said third capacity computing means.

3. The data recording and/or reproduction apparatus set forth in claim 1, further comprising:
　a third capacity computing means for computing, based on said auxiliary data control information, an auxiliary data recordable capacity on said recording medium; and said display means discernibly displays an actual share of said auxiliary data recorded capacity against the auxiliary data recordable capacity based on said auxiliary data recorded capacity computed via said second capacity computing means and also based on said auxiliary data recorded capacity computed via said third capacity computing means.

4. The data recording and/or reproduction apparatus set forth in claim 1, wherein plural kinds of auxiliary data files being different from each other are provided for said auxiliary data;
said plural kinds of auxiliary data files are individually controlled by said auxiliary data control information;
said second capacity computing means computes a recorded capacity per kind of said auxiliary data files; and
said display means discernibly displays a recorded capacity per kind of said auxiliary data files when displaying the recorded capacity for the auxiliary data.

5. The data recording and/or reproduction apparatus set forth in claim 4, wherein said auxiliary data files comprise at least a picture-image file and a text file as the plural kinds of auxiliary data files.

6. A data communication system which enables data communication between a data recording and/or reproducing apparatus and a data processing unit by connecting said data recording and/or reproducing apparatus to said data processing unit via a data bus conforming to a predetermined communication format, said data recording and/or reproducing apparatus for recording and/or reproducing main data and auxiliary data to and/or from a recording medium, wherein said main data includes at least a single audio program, and main data control information which controls recording, reproducing, or an editing operation pertaining to said single program; and said auxiliary data includes at least a picture image data file and a text data file being independent of said program included in said main data, and auxiliary data control information which controls recording, reproducing or editing operation pertaining to said picture image data file and the text data file,
said data communication system comprising:
a first capacity computing means for computing a main data recorded capacity substantially being a capacity of said main data recorded on said recording medium based on said main data control information;
a second capacity computing means for computing an auxiliary data recorded capacity substantially being a capacity of said auxiliary data recorded on said recording medium based on said auxiliary data control information; and
a display means for discernibly displaying said main data recorded capacity and said auxiliary data recorded capacity in accordance with a predetermined display format which separately indicates a recorded capacity of said picture image data file and the text data file as said auxiliary data recorded capacity based on said main data recorded capacity computed via said first capacity computing means and said auxiliary data recorded capacity computed via said second capacity computing means.

7. The data communication system set forth in claim 6, further comprising:
a third capacity computing means for computing, based on said main data control information, a main data recordable capacity on said recording medium; and
said display means discernibly displays a proportional share of said main data recorded capacity against said main data recordable capacity based on said main data recorded capacity computed via said first capacity computing means and also based on said main data recordable capacity computed via said third capacity computing means.

8. The data communication system set forth in claim 6, further comprising:
a third capacity computing means for computing, based on said auxiliary data control information, an auxiliary data recordable capacity on said recording medium; and
said display means discernibly displays a proportional share of said auxiliary data recorded capacity against the auxiliary data recordable capacity based on said auxiliary data recorded capacity computed via said second capacity computing means and also based on said auxiliary data recordable capacity computed via said third capacity computing means.

9. The data communication system set forth in claim 6, wherein plural kinds of auxiliary data files being different from each other are provided for said auxiliary data;
said plural kinds of auxiliary data files are individually controlled by said auxiliary data control information;
said second capacity computing means computes a recorded capacity per kind of said auxiliary data files; and
said display means discernibly displays a recorded capacity per kind of said auxiliary data files when displaying the recorded capacity for the auxiliary data.

10. The data communication system set forth in claim 9, wherein said auxiliary data files comprise at least a picture image file and a text file as the plural kinds of auxiliary data files.

11. The data communication system set forth in claim 6, further comprising:
a file selecting means which is built in said data processing unit and for executing sequential processes including:
arranging transmission of the auxiliary data recorded on said recording medium from said data recording and/or reproduction apparatus to said data processing unit via said data bus in response to a request from said data processing unit;
arranging a data file of said auxiliary data recorded on said recording medium into plural kinds of auxiliary data files being different from each other enabling said auxiliary data control information to control said auxiliary data files; and
selectively setting at least one kind of data file from said plural kinds of auxiliary data files transmitted from said data recording and/or reproduction apparatus into said data processing unit.

12. The data communication system set forth in claim 11, wherein said auxiliary data comprises at least a picture image file and a text file as the plural kinds of auxiliary data files.

13. A method for displaying information of a recording medium storing main data including at least a single audio program, and main data control information which controls recording, reproducing, or editing operation pertaining to said single program and auxiliary data including at least a picture image data file and a text data file being independent of said program included in said main data; and auxiliary data control information which controls recording, reproducing or editing operation pertaining to said picture image data file and the text data file, said method for displaying information comprising:
- computing a main data recorded capacity substantially being a capacity of main data recorded on said recording medium based on said main data control information;
- computing an auxiliary data recorded capacity substantially being a capacity of said auxiliary data recorded on said recording medium based on said auxiliary data control information; and
- displaying said main data recorded capacity and said auxiliary data recorded capacity in accordance with a predetermined display format which separately indicates a recorded capacity of said picture image data file and the text data file as said auxiliary data recorded capacity based on said main data recorded capacity computed via said first capacity computing means and said auxiliary data recorded capacity computed via said second capacity computing means.

14. A method for displaying information of a recording medium set forth in claim 13, further comprising:

- computing a main data recordable capacity on said recording medium based on said main data control information; and
- displaying actual share of said main data recorded capacity against said main data recordable capacity.

15. A method for displaying information of a recording medium set forth in claim 13, further comprising:

- computing an auxiliary data recordable capacity on said recording medium based on said auxiliary data control information; and
- displaying actual share of said auxiliary data recorded capacity against the auxiliary data recordable capacity.

* * * * *

UNITED STATES PATENT AND TRADEMARK OFFICE
CERTIFICATE OF CORRECTION

PATENT NO. : 6,658,527 B1
DATED : December 2, 2003
INVENTOR(S) : Shoko Hiroyasu

It is certified that error appears in the above-identified patent and that said Letters Patent is hereby corrected as shown below:

Column 25,
Line 22, insert -- [00h] -- after "following:";
Line 23, insert -- [01h] -- after "code;";
Line 24, insert -- [02h] -- after "8859-1;";
Line 25, insert -- [03h] -- after "standards);";
Line 26, insert -- 04h] -- after "; and".

Column 27,
Line 26, "clusterx32 sectors x2324 bytes" to -- cluster x 32 sectors x 2324 bytes --.

Column 28,
Line 3, change "Code is" to -- Code [0h] is --;
Line 41, change "to, it" to -- [0h], it --;
Line 43, change "to, it" to -- to[1h], it --;
Line 46, change "If is" to -- If [2h] is --;
Line 47, change "If is" to -- If [3h] is --;
Line 50, change "If is" to -- If [0] is --;
Line 51, change "If is" to -- If [1] is --;
Line 56, change "code designates" to -- code [0h] designates --;
Line 57, change "]1h]" to -- [1h] --
Line 57, change "code designates-" to -- code [2h] designates --;
Line 58, change "code designates" to -- code [3h] designates --;
Line 59, change "code designates" to -- code [4h] designates --;
Line 60, change "codes and" to -- codes [5h] and [6] --;
Line 61, change "code designates" to -- code [7h] designates --.

Column 29,
Line 35, change "example, conforms -" to example [00h] conforms --;
Line 36, change ", conforms" to -- , [01h] conforms --;
Line 37, change ", conforms" to -- , [02h] conforms --;
Line 37, change " , conforms to" to -- , [03h] conforms to --;
Line 38, change "and conforms" to -- and [04h] conforms --.

Column 30,
Line 28, change "code" to -- code [00h] is --;
Line 42, change "Code is" to -- Code [00h] is --;
Line 51, change "code for" to -- code [1Eh] for --.

UNITED STATES PATENT AND TRADEMARK OFFICE
CERTIFICATE OF CORRECTION

PATENT NO. : 6,658,527 B1
DATED : December 2, 2003
INVENTOR(S) : Shoko Hiroyasu

It is certified that error appears in the above-identified patent and that said Letters Patent is hereby corrected as shown below:

Column 38,
Line 7, change "with," to -- with [0%], --;
Line 7, change "with." to -- with [100%]. --.

Column 40,
Line 21, change "desisgnates" to -- designates --;
Line 24, change "display denotes" to -- display [test 00/10] denotes --;
Line 47, remove bold font from "3-33-1".

Signed and Sealed this

Twenty-sixth Day of July, 2005

JON W. DUDAS
*Director of the United States Patent and Trademark Office*